US010334839B2

(12) United States Patent
Deurloo

(10) Patent No.: US 10,334,839 B2
(45) Date of Patent: Jul. 2, 2019

(54) REMOVABLE CATCH BASIN FILTER INSERT AND LIFTING APPARATUS

(71) Applicant: Frog Creek Partners, LLC, Casper, WY (US)

(72) Inventor: Brian Robert Deurloo, Casper, WY (US)

(73) Assignee: FROG CREEK PARTNERS, LLC

( * ) Notice: Subject to any disclaimer, the term of this patent is extended or adjusted under 35 U.S.C. 154(b) by 36 days.

(21) Appl. No.: 15/456,998

(22) Filed: Mar. 13, 2017

(65) Prior Publication Data
US 2017/0284077 A1 Oct. 5, 2017

Related U.S. Application Data

(60) Provisional application No. 62/339,122, filed on May 20, 2016, provisional application No. 62/390,510, filed on Mar. 31, 2016.

(51) Int. Cl.
| | |
|---|---|
| *E03F 5/04* | (2006.01) |
| *A01M 23/08* | (2006.01) |
| *B01D 29/94* | (2006.01) |
| *B01D 29/96* | (2006.01) |
| *B01D 29/60* | (2006.01) |
| *B01D 29/27* | (2006.01) |

(52) U.S. Cl.
CPC ............ *A01M 23/08* (2013.01); *B01D 29/60* (2013.01); *B01D 29/94* (2013.01); *B01D 29/96* (2013.01); *E03F 5/0404* (2013.01); *B01D 29/27* (2013.01); *B01D 2201/56* (2013.01); *Y02W 10/37* (2015.05)

(58) Field of Classification Search
CPC ..... E03F 5/0404; E03F 5/14; E03F 2005/061; E03F 2005/063; B01D 29/23; B01D 29/27; B01D 29/60; B01D 29/94; B01D 2201/56

USPC .............................. 210/163, 164; 404/2, 4, 5
See application file for complete search history.

(56) References Cited

U.S. PATENT DOCUMENTS

| | | | |
|---|---|---|---|
| 1,066,316 A * | 7/1913 | Piper | B01D 61/08 404/5 |
| 1,746,121 A | 2/1930 | Levy | |
| 2,586,967 A * | 2/1952 | Lundy, Sr. | E03F 5/0404 210/300 |

(Continued)

OTHER PUBLICATIONS

International Search Report and Written Opinion (PCT/ISA/220, PCT/ISA/210, and PCT/ISA/237) issued in PCT Application No. PCT/US2017/022070 dated Jun. 6, 2017 (11 pages).

*Primary Examiner* — Christopher Upton
(74) *Attorney, Agent, or Firm* — Pate Baird, PLLC

(57) ABSTRACT

A removable catch basin filter insert includes a filter container is fitted into a catch basin in the ground at the location where the stormwater exits the gutter and enters the stormwater sewer system. The removable catch basin filter provides pollution capture from stormwater while being easily cleaned. A hinged cover is included at the top of the filter insert to allow the captured pollutants to be evacuated through the use of a vehicle or being tipped nearly upside down by a mechanical arm. A hinged trap door is included at the bottom of the filter insert to allow captured pollutants to be evacuated through the bottom of the device and into a container. By capturing the pollutants with the removable catch basin filter insert before the pollutants enter the mainline storm drain system, clean storm drain systems are provided allowing for cleaner waterways.

28 Claims, 22 Drawing Sheets

(56) References Cited

U.S. PATENT DOCUMENTS

| | | |
|---|---|---|
| 2,615,526 A * | 10/1952 | Lane .................. E03F 5/0404 210/164 |
| 4,419,232 A | 12/1983 | Arntyr et al. |
| 5,037,541 A | 8/1991 | Ruey-Jang et al. |
| 5,133,619 A | 7/1992 | Murfae et al. |
| 5,284,580 A | 2/1994 | Shyh |
| 5,324,135 A * | 6/1994 | Smith ................ E02D 29/1427 210/164 |
| 5,562,819 A * | 10/1996 | Turner, Jr. ............ B01D 29/27 210/163 |
| 5,569,372 A * | 10/1996 | Smith .................. E03F 5/0404 210/164 |
| 5,864,990 A * | 2/1999 | Tu ............................ E03F 5/06 210/163 |
| 6,062,767 A | 5/2000 | Kizhnerman et al. |
| 6,099,723 A | 8/2000 | Morris et al. |
| 6,106,707 A | 8/2000 | Morris et al. |
| 6,270,663 B1 | 8/2001 | Happel |
| 6,531,059 B1 | 3/2003 | Morris et al. |
| 6,668,390 B1 * | 12/2003 | Gonzalez ............. E03F 5/0404 210/164 |
| 6,872,029 B2 | 3/2005 | Allard et al. |
| 7,112,274 B1 * | 9/2006 | Sanguinetti ........... E03F 5/0404 210/163 |
| 7,276,156 B2 | 10/2007 | Lockerman et al. |
| 7,309,420 B1 | 12/2007 | Trangsrud |
| 7,771,591 B2 | 8/2010 | Lucas |
| 7,875,178 B2 | 1/2011 | Ashliman |
| 7,959,799 B2 | 6/2011 | Happel et al. |
| 8,221,632 B2 | 7/2012 | McInnis et al. |
| 8,226,824 B2 | 7/2012 | Mondschein et al. |
| 8,366,923 B1 | 2/2013 | Happel |
| 8,906,232 B2 | 12/2014 | McInnis |
| 9,371,636 B2 | 6/2016 | Ali et al. |
| 2006/0171778 A1 * | 8/2006 | Fuchs ...................... E03F 5/06 404/2 |
| 2006/0231509 A1 | 10/2006 | Marzett |
| 2008/0023382 A1 * | 1/2008 | Longo .................. E03F 5/0404 210/164 |
| 2008/0029004 A1 | 2/2008 | Bragg |
| 2008/0093280 A1 | 4/2008 | Kang |
| 2009/0014370 A1 * | 1/2009 | Peters, Jr. ............ E03F 5/0404 210/164 |
| 2013/0020242 A1 | 1/2013 | Vreeland |
| 2013/0126406 A1 * | 5/2013 | Alqanee .................. E03F 5/10 210/163 |

* cited by examiner

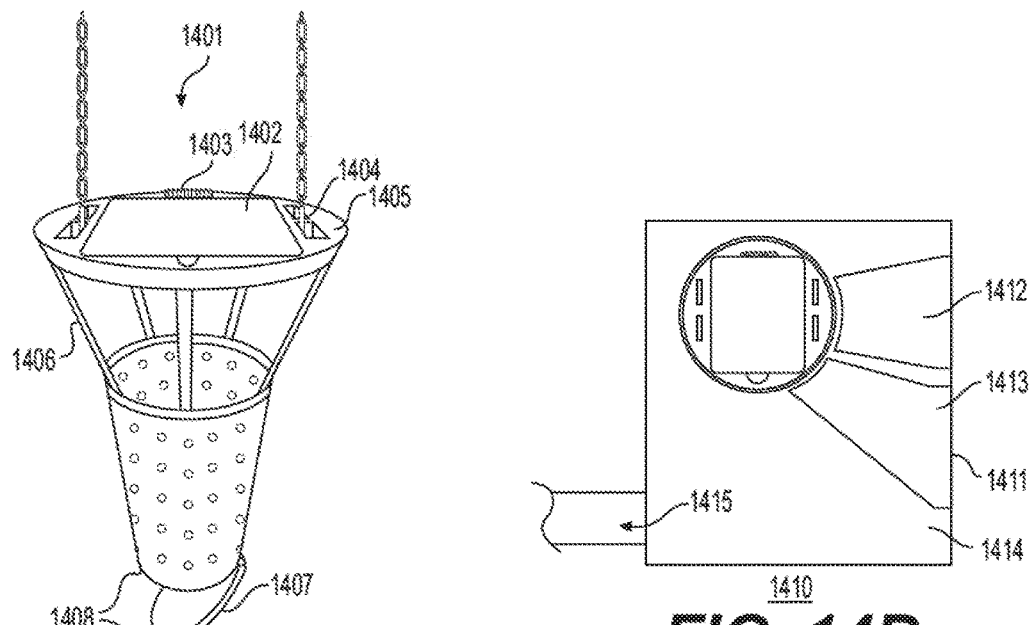
FIG. 14A
FIG. 14B
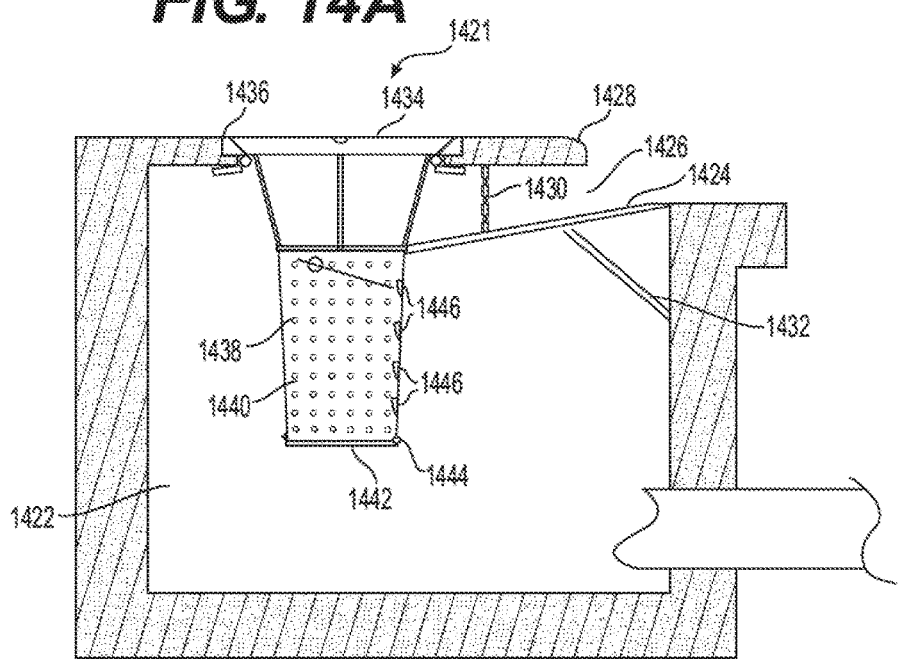
FIG. 14C

2000

2010

2020

2030

REMOVABLE CATCH BASIN FILTER INSERT AND LIFTING APPARATUS

CROSS REFERENCE TO RELATED APPLICATIONS

This application claims the benefit of U.S. Provisional Application Nos. 62/390,510 filed Mar. 31, 2016, and 62/339,122 filed May 20, 2016, the contents of which are incorporated herein by reference.

BACKGROUND ART

This invention relates to reclaiming pollution from the environment and innovative devices that are designed to capture pollution from stormwater within a catch basin where water enters the city storm drain pipe system from a gutter.

There are many forms of stormwater pollution ranging from cigarette butts, to chemicals, to plastics, and the like. There is no one-size-fits-all solution when it comes to selecting pollution capture devices. Many companies exist that produce and install large trash-capture devices, but only a few of those devises perform well in real world applications at a cost affordable to customers.

The improper disposal of cigarette filters and other types of trash is a significant problem, which contributes to an estimated annual $11.5 billion cost to clean up litter in the United States. It is not only a problem in the United States, but it is a global problem. Massive trash islands exist in oceans. The "Great Pacific Trash Gyre", for example, is estimated to be twice the size of Texas, and includes floating plastic that is harming both marine animal and human food supplies. Picking up trash locally assists in solving this severe global problem.

Typically, stormwater accumulates on community streets and sidewalks as it rains or snows. To address this fact, roads are sloped to move water toward gutters along the roadway and sidewalk. These gutters may move the water down gradient to catch basins having storm grate coverings placed at intervals along the gutter system. The water flows through a storm grate or under the hood (which may also be known as a curb box or throat) of the catch basin and into the catch basin. These catch basins can be located immediately below the gutter or recessed under a sidewalk, such as a curb inlet box. There are large storm sewer pipes that terminate in the catch basin and direct the flow of stormwater down gradient into a larger network of storm sewer pipes. The storm sewer system gathers the water of a community and is sized to move the water from municipal infrastructure to a receiving body of water such as a stream, channel, reservoir, lake, or ocean. In most cases, the storm sewer system does not have filtration mechanisms to catch pollutants in the water before entering the receiving body of water. Consequently, most pollutants that make it into the catch basin either clog up the storm sewer pipe or are dumped into the stream, channel, reservoir, lake, or ocean.

Common catch basins and storm grates perform an inadequate job of capturing pollution from stormwater, because they are designed to prevent only large items such as tree limbs and tires from entering the storm drain system. Typically, once a smaller piece of litter makes it to the storm drain, there are very few ways to stop that litter from traveling to the nearest stream and ultimately the ocean.

Several companies produce and install large trash capture devices, but only a few of them perform well in real world applications at a cost affordable to most customers. Fresh Creek Technologies™ (FCT) from New Jersey, for example, was one of eleven contractors selected by the City of San Francisco to install trash capture devices in order to test new technologies and comply with a Bay Area self-imposed clean water initiative. FCT products are hidden away from the public in main line drainage pipes, expensive to install, and require large equipment to maintain. Also, FCT trash capture devices provide no means for water filtration of fertilizers, pesticides, herbicides, or hydrocarbons.

Another company, United Storm Water Inc., for instance, has developed a product called the Drain Pac™ to capture pollution within a catch basin. It performs adequately in certain conditions, but it can be cumbersome to clean, install, and maintain. Furthermore, there are end-of-pipe trash collectors, such as the Stormceptor made by Imbrium®, that remove trash and debris from stormwater but this does not help alleviate clogging in storm sewer system upstream of the device.

In that regard, there is a need for a pollution capture device that captures or filters pollutants from stormwater within a catch basin and is easily removable from a catch basin so as to protect natural water ways and to promote conservation efforts. Furthermore, an apparatus that facilitates on-demand removal of such a device from a catch basin would be of interest to people who are assigned the responsibility of keeping stormwater clean and storm sewer systems from clogging.

SUMMARY OF THE INVENTION

The present disclosure relates to a removable catch basin filter insert, which may be a filter system that includes a container-like device and a filtration system. The filter system may route all or part of the stormwater to pass through the container-like device and where the holes of the filtration system are small enough to capture garbage and/or pollutants, such as cigarette butts and sediment while allowing the water to pass through at a normal flowrate.

The removable catch basin filter insert can be easily removed for maintenance and cleaning. Municipal governments may be able to retrofit a common side-loading garbage truck lifting mechanism to grab, lift, dump and/or replace the catch basin filter insert according to one or more aspects of the disclosure.

The removable catch basin filter insert of the present disclosure is at least efficient in design, cost effective, and provides creative means for reclaiming pollutants, trash, garbage, such as cigarette butts, plastic bottle lids, candy wrappers, water bottles, straws, plastic sacks, and other types of pollution from the environment. The removable catch basin filter can be placed in ordinary stormwater catch basins and may also be designed to filter and capture nicotine, BTEX (benzene, toluene, ethylene, xylene), hydrocarbons, sediment, heavy metals, nutrients, pesticides, magnetic material, and fertilizers from the water, thereby making them an economical mini-reclamation system. The removable catch basin filter insert may also be easily cleaned, maintained, modular, scalable, robust in design, and have replaceable and/or rechargeable filtration units. Moreover, the removable catch basin filter insert may be accompanied by a maintenance pod in order to service the device. By removing the litter from the environment near its source, it is less likely to release toxic leachates to the environment.

Another advantage of the present disclosure is that the removable catch basin filter insert may be placed in catch basins near known littering and polluting sources such as industrial sites, construction sites, pedestrian malls, retail areas, nightclubs, bus stops, and high impact residential and commercial areas. The visible nature of the filter insert can bring awareness to the public of the pollution created by the community. Because it can be street-side, and not hidden away within the storm drain system, they are easily recognized, cleaned, and serviced. Moreover, the affordability of the removable catch basin filter insert allows either to augment a larger pollution capture system or to serve municipal locations that only require a small pollutant capture device.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 14A illustrates a perspective view of a removable catch basin filter insert for a curb inlet in accordance with one or more aspects of the disclosure.

FIGS. 14B and 14C illustrate a top view and a side view, respectively, of a removable catch basin filter insert situated in a manhole and curb inlet in accordance with one or more aspects of the disclosure.

DETAILED DESCRIPTION OF THE EMBODIMENTS OF THE INVENTION

Figure 1:
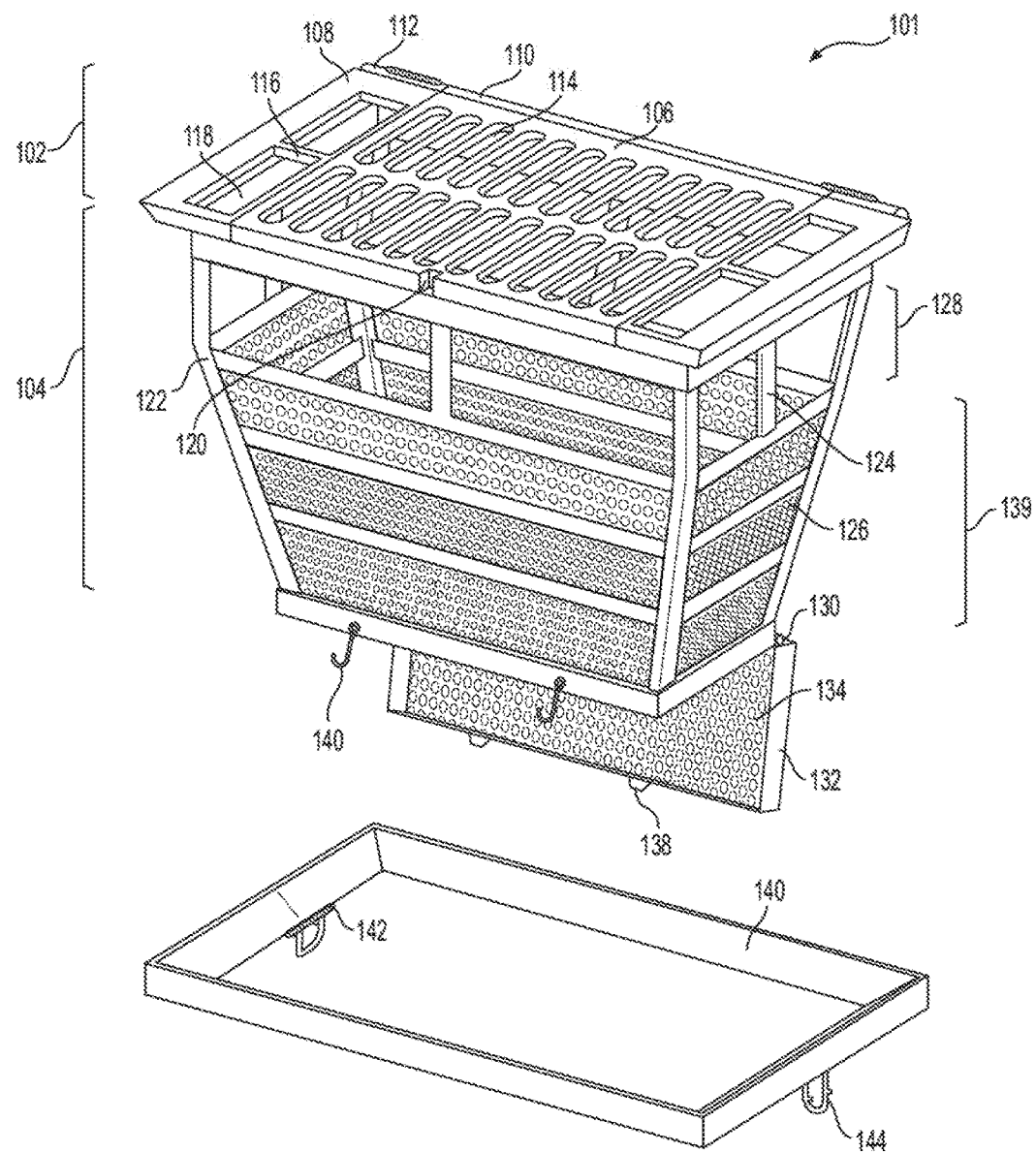
FIG. 1 illustrates a perspective view of a removable catch basin filter insert and an adapter frame in accordance with one or more aspects of the disclosure.

The present disclosure directed to a removable catch basin filter insert and lifting apparatus. For example, the removable catch basin filter insert includes a filter fitted into a stormwater catch basin (e.g., a catchment basin, collection box, vault, settling basin, curb inlet box, sump tank, etc.) in the ground at the location where the stormwater exits the gutter and enters the stormwater sewer system. Most American stormwater systems currently incorporate a storm grate which acts as a filter between the water in the gutter and the water that enters the catch basin. Common catch basins have a storm grate with large holes that perform an inadequate job of preventing trash, sediment, and/or debris from entering the storm sewer system. The removable catch basin filter insert (hereinafter referred to as the "CBFI"), according to one or more aspects of the disclosure, is a filter system that routes all or part of the stormwater through a container-like and/or a container device with a filtration system where the holes are small enough to capture, for instance, cigarette butts and sediment, while water is able to pass through at a normal, or near normal flow rate. Liquid may pass into the CBFI and through the filtering components emerging less contaminated than it entered. In general, the installation of a sufficient number of these catch basin filtration systems would greatly enhance the quality of the stormwater runoff in urbanized watersheds. Furthermore, the CBFI can serve as either a short term or permanent Storm Water Pollution Prevention Plan (SWPPP) Best Management Practice (BMP). Furthermore, the CBFI can help municipal separate storm sewer system (MS4) permit holders to comply with regulations.

In one embodiment of the present disclosure, a method for operating the CBFI may be as follows. A garbage truck or other suitable equipment pulls up to the CBFI and aligns one or more lifting arms with corresponding one or more lifting points on the CBFI. The lifting arm grabs or holds the CBFI and pulls it out of the catch basin with the captured pollution securely held within or on the CBFI. The movable lifting arm lifts the CBFI to a height where the contents of the CBFI can be evacuated into a receiving container. Normally, the CBFI is tipped far enough upside down to empty the contents of the CBFI into the receiving container. Alternatively, the contents of the CBFI can also be evacuated through the side or the bottom of the device even if it is not tipped. At the inverted position of the CBFI, a hinged storm grate (or at least also referred to as "cover") opens to allow the contents of the CBFI to fall out. In a vertical position, the bottom or side door of the CBFI can be opened manually or automatically and the contents are allowed to fall out. The CBFI may also have one or more other filtering components that release when upside down such as a sediment trap, filter media, and magnetic element. The components can be released by gravity, or by manual or mechanical mechanisms. When the contents of the CBFI have evacuated, the lifting arm rotates the CBFI back to a normal position. The storm grate and other gravity release mechanisms fall back into operation placement for filtering. The lifting arm then lowers the CBFI back into the catch basin. The garbage truck, or other suitable maintenance vehicle, then drives to the next CBFI for maintenance and cleaning.

In another embodiment of the present disclosure, a method of cleaning the CBFI may be as follows. A CBFI is situated in a catch basin or similar device that allows for the CBFI to be housed for filtration purposes. A vacuum truck may pull up to the CBFI, and the hinged storm grate of the CB filter may be lifted to reveal the contents within the CBFI while the CBFI is still situated within the catch basin. The CBFI is cleaned out via the use of manual or automatic equipment. Automatic equipment may include a vacuum truck, a back hoe, etc. Manual equipment may include hands, shovel, trowel, post hole-digger, etc. When the CBFI is cleaned out, or nearly cleaned out, the bottom of the CBFI (e.g., sediment filtration system) is exposed. A tool can be used to open the sediment trap door system thereby exposing the catch basin area below the CBFI. Manual or automatic equipment can be inserted through the sediment filtration system door to clean the area below the CBFI. And when cleaning and maintenance operations are complete, the sediment filtration system door can be closed and the hinged storm grate can be closed. Accordingly, the CBFI is ready to filter again.

The CBFI is easily removable for maintenance and cleaning. As described above, various municipal governments can retrofit the common side-loading garbage truck lifting mechanism to grab, lift, dump and replace the CBFI. Current methods of cleaning a catch basin usually requires a vacuum truck, two men, and some sort of traffic control to complete a job that requires about 5 to 25 minutes per catch basin. This novel and improved method of maintaining a CBFI may require only one man and a garbage truck, or the like, with a side-loading mechanism and lifting arms. Other methods and equipment for cleaning the CBFI may become apparent as further prototypes and systems are developed around this novel approach to cleaning stormwater of pollutants.

As will be further described below, the CBFI in accordance with one or more aspects of the disclosure may include one or more of the following: (a) a removable catch basin filter insert body and frame, (b) a hinged storm grate, (c) adapter frame, (d) locking mechanism, (e) a trash capture and storage system, (f) a deflector and water diversion system, (g) a sediment filtration system, (h) a pollution filtration and abatement system, (i) a magnetic element capture system, (j) one or more lifting points, (k) a net and liner system, (l) a hydrodynamic control system, (m) a power, communication, and/or metering system, (n) signage, indicators, colors, and/or branding, and (o) operation and maintenance system. And as will be further described below, at least one method of measuring, fitting, and/or inserting a CBFI into a catch basin is disclosed in accordance with one or more aspects of the disclosure.

FIG. 1 illustrates a perspective view 100 of a CBFI and a corresponding adapter frame in accordance with one or more aspects of the disclosure. As shown, CBFI 101 includes a storm grate and lifting frame assembly 102 and a filter basket 104. The storm grate and lifting frame assembly 102 includes a hinged storm grate 106 and lifting frame 108. A storm grate hinge 110 attaches to the top of the CBFI 101 allows the hinged storm grate 106 to open and close relative to the lifting frame 108, which also includes a lifting frame hinge 112. By way of example, as shown in FIG. 1, the hinged storm grate 106 includes a plurality of spaced grate holes 114. The lifting frame 108 has a lifting point 116 arranged, for example, in a lift point access hole 118. A pry notch 120 may also be configured on the hinged storm grate 106.

The filter basket 104 includes a frame 122 that connects to the storm grate and lifting frame assembly 102. The frame 122 has a suspender 124 and a filter wall 126. Between the distal ends of the suspender 124, an overflow area 128 is formed so that if the storm water level exceeds the height of the filter wall 126 or if the filter basket is full of material, the overflow area 128 can allow the water to flow out therefrom. As will be further described below, the filter wall 126 may have a plurality of holes or openings to allow storm water to flow through while filtering out pollutants, garbage, trash, etc. At the bottom of the frame 122, a trap door hinge may connect and allow a trap door frame 132 and trap door 134 to open or close via latch 136 and latch point 138.

Figure 8A:
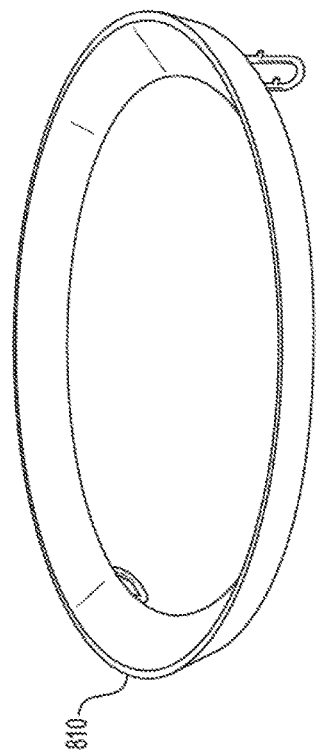
FIGS. 8A and 8B illustrate example adapter frames in accordance with one or more aspects of the disclosure.
Figure 8C:
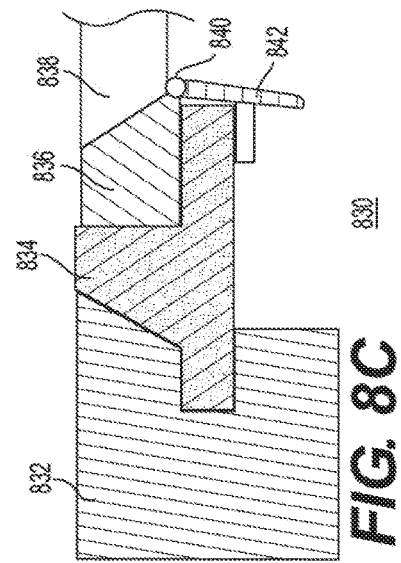
FIG. 8C illustrates an engagement between an adapter frame and a catch basin in accordance with one or more aspects of the disclosure.
Figure 8B:
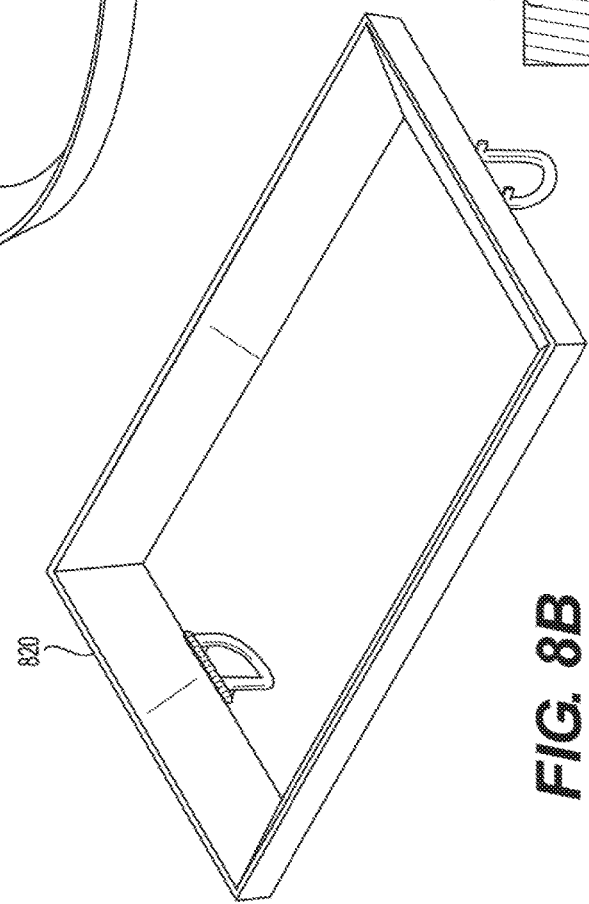

FIG. 1 also illustrates an adapter frame 140 that is configured to receive the CBFI 101. As will be further described below, the adapter frame 140 may be first arranged to fit in, for instance, a catch basin or gutter, and the beveled edges of the CBFI 101 may be situated and align with the corresponding beveled edges of the adapter frame 101. The adapter frame 140 may also have a hinge 142 and an adapter frame lifting point and fastener 144, as shown. The adapter frame may be shaped differently so as to suitably fit on a respective catch basin. For example, FIG. 8A shows an adapter frame 810 that is circular that fits, for example, on a manhole. FIG. 8B illustrates an adapter frame 820 that is rectangular in shape to fit a particular catch basin. In another example, FIG. 8C shows an engagement 830 between a lifting frame 838, an adapter frame 836 and a catch basin or manhole frame 834 in accordance with one or more aspects of the disclosure. As shown, an adapter frame lifting point and fastener 842 is attached to the adapter frame 836 via a hinge 840 and engages a catch basin frame 834 (e.g., a manhole frame), which is adjacent to and arranged with a road or sidewalk 832.

Figure 2:
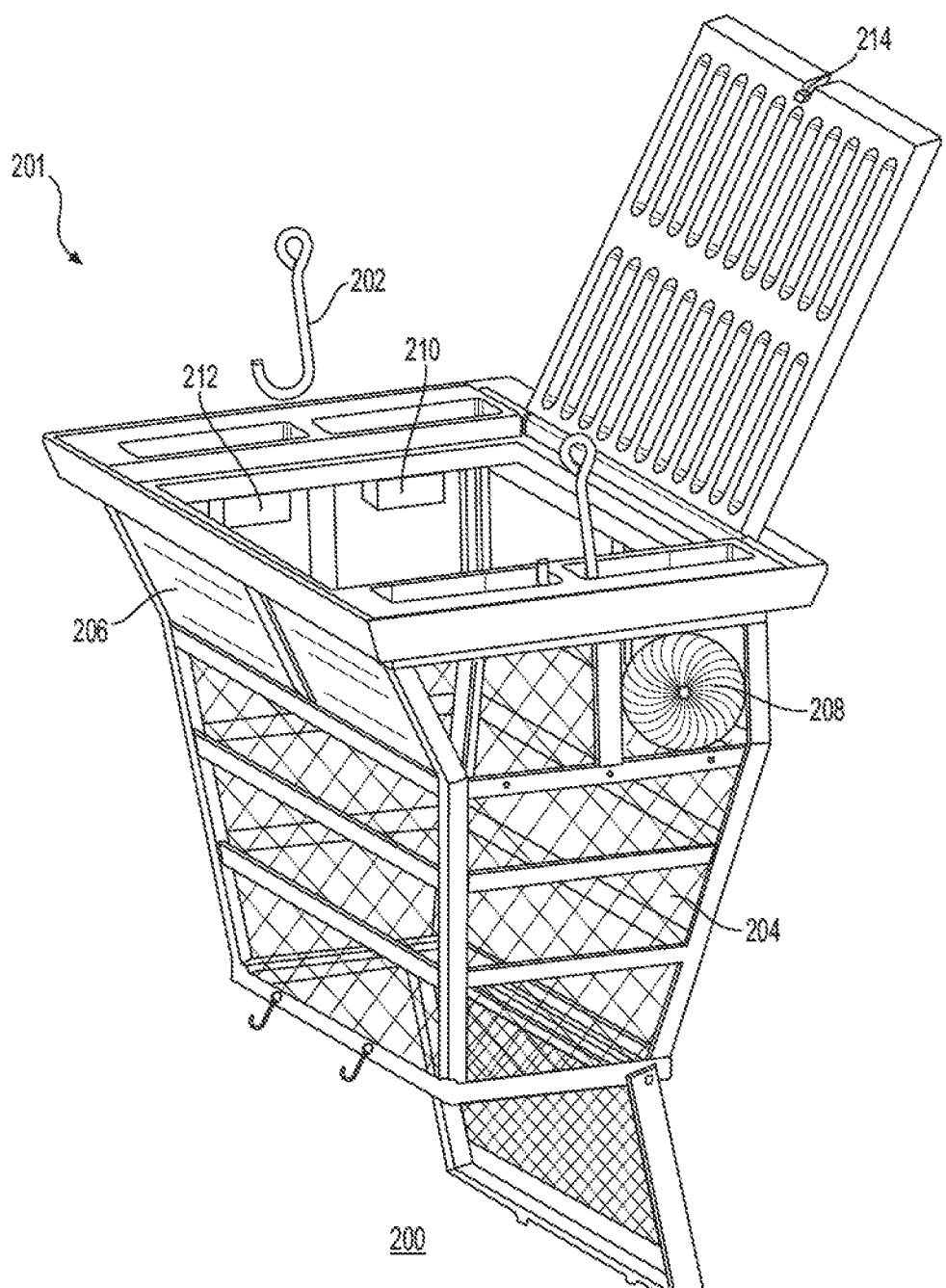
FIG. 2 illustrates a perspective view of a removable catch basin filter insert in accordance with one or more aspects of the disclosure.

In another embodiment, FIG. 2 illustrates a perspective view 200 of a CBFI 201 in accordance with one or more aspects of the disclosure. The CBFI 201 is similar to the CBFI 101 of FIG. 1. As shown, a lifting hook 202 may engage the lifting point of the CBFI 201 to lift it out from a catch basin. In this embodiment, the CBFI 201 includes at least one filter wall 204 configured to filter pollutants from the stormwater flowing through the filter basket. Moreover, different from the CBFI 101 of FIG. 1, this embodiment may include an overflow shield 206. While the overflow shield 206 is arranged in at the front of the CBFI 201, it may be understood that the shield may be configured at any position of the filter insert. As will be further discussed below, the CBFI 201 further includes a rotating element 208, which may be a power system or a flow meter, a sensor 210, a communication system 212, and a locking mechanism 214 arranged on the hinged storm grate or frame.

Figure 3:
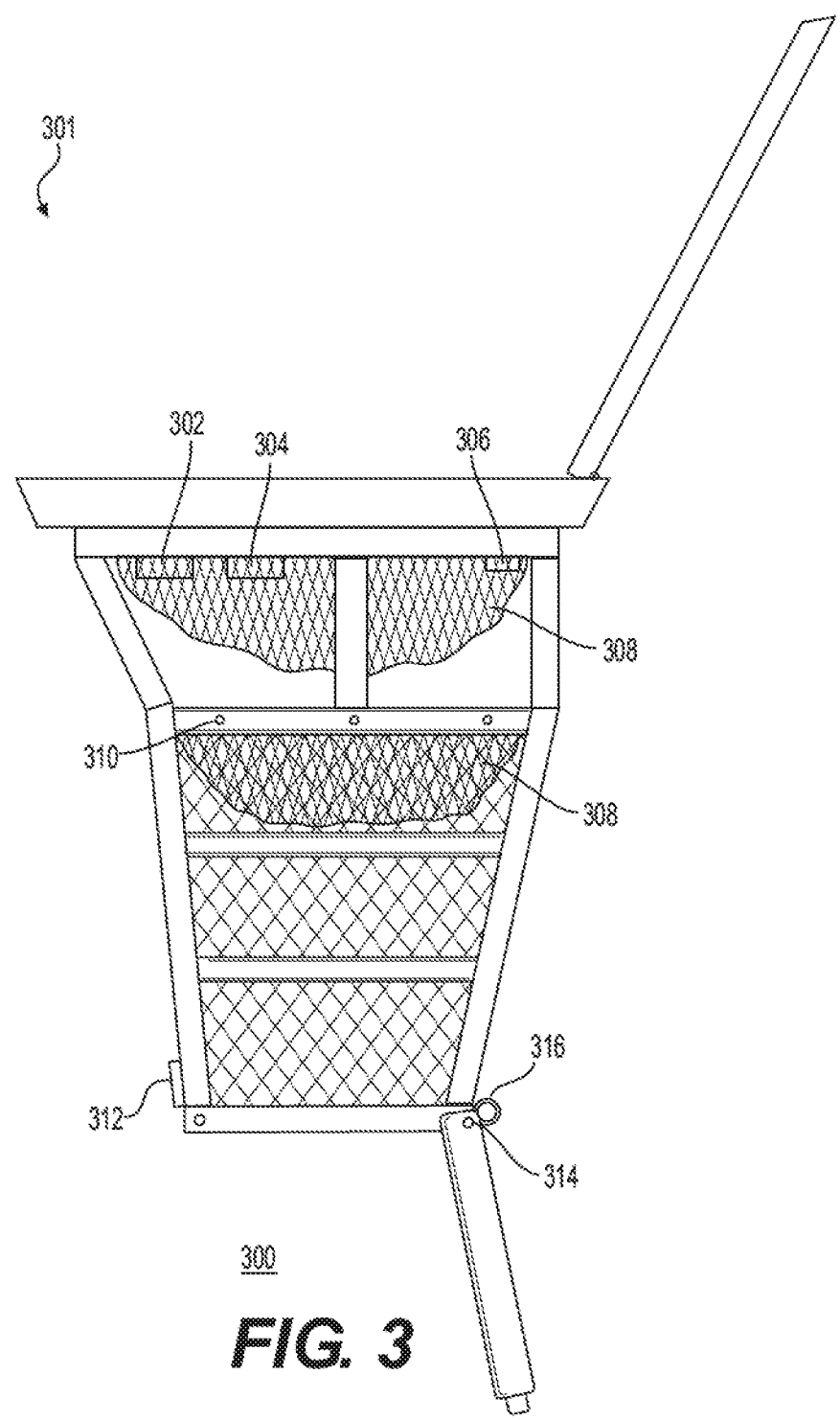
FIG. 3 illustrates a side view of a removable catch basin filter insert in accordance with one or more aspects of the disclosure.

In yet another embodiment, FIG. 3 illustrates a side view 300 of a CBFI 301 in accordance with one or more aspects of the disclosure. The CBFI 301 is similar to the CBFIs 101 and 201 of FIGS. 1 and 2, respectively, including communication system 302, a sensor/meter system 304, a power system 306, and a trap door attached to the frame via a trap door hinge 314 and lockable via the trap door latch 312. However, the CBFI 301 also includes pollutant capture media 308, which can be secured to the frame by fastener 310, and also includes a lifting point 316 at the bottom of the frame, for example, adjacent to the trap door hinge 314.

Figure 4:
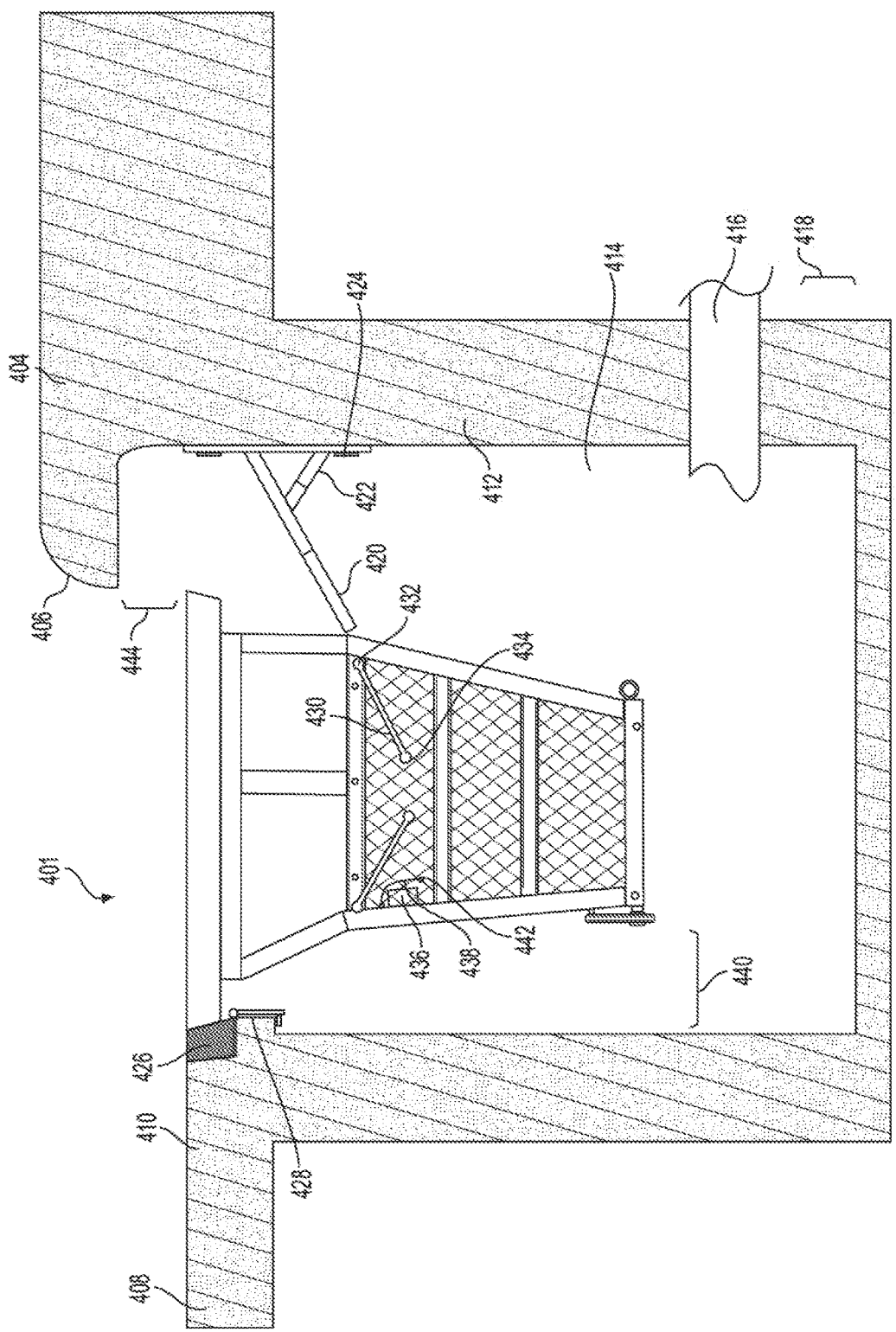
FIG. 4 illustrates a side view of a removable catch basin filter insert situated in a catch basin in accordance with one or more aspects of the disclosure.

In a further embodiment, FIG. 4 illustrates a side view 400 of a CBFI 401 situated in a catch basin 404 in accordance with one or more aspects of the disclosure. The CBFI 401 may be similar to the CBFIs 101, 201, and 301. The catch basin 404 has a catch basin hood 406. A roadway 408 and gutter 410 may be formed integrally with the catch basin 404. The catch basin 404 also has a catch basin wall 412 and a catch basin well 414 formed by the walls. A water outlet 416 may drain the stormwater that has entered the catch basin 404. Moreover, as shown, sump 418 may form at the bottom of the well 414.

In FIG. 4, a catch basin water deflector 420 may be separately arranged on the wall 412. For example, the deflector 420 may be supported by a deflector support 422 and the deflector 420 is securely held in place by fastener 424. The catch basin water deflector 420 is configured to deflect stormwater (and the pollutants therein) into the CBFI 401, as illustrated. Also as shown, an adapter frame 426 abuts the gutter 410 and allows the CBFI 401 to fit therein. The adapter frame 426 has a lifting point and fastener 428 arranged on a portion of the gutter 410. At least in addition to the catch basin water deflector 420, FIG. 4 also shows that the CBFI 401 includes a filter basket energy dissipater 430 attached to a flexible element or hinge 432. A buoyancy device 434 may be attached at the end of the energy dissipater 430 and help cause pollutants not to suspend in fluid due to agitation. Moreover, the CBFI 401 has a magnetic element 436 and a nonmagnetic cover 438 which may have a weight 442 fastened to it to cause the nonmagnetic cover to disengage from the magnetic element when the CBFI is tipped upside down. Furthermore, there is an overflow space 440 between the filter basket walls and the walls of the catch basin to allow water to flow.

Figure 22:
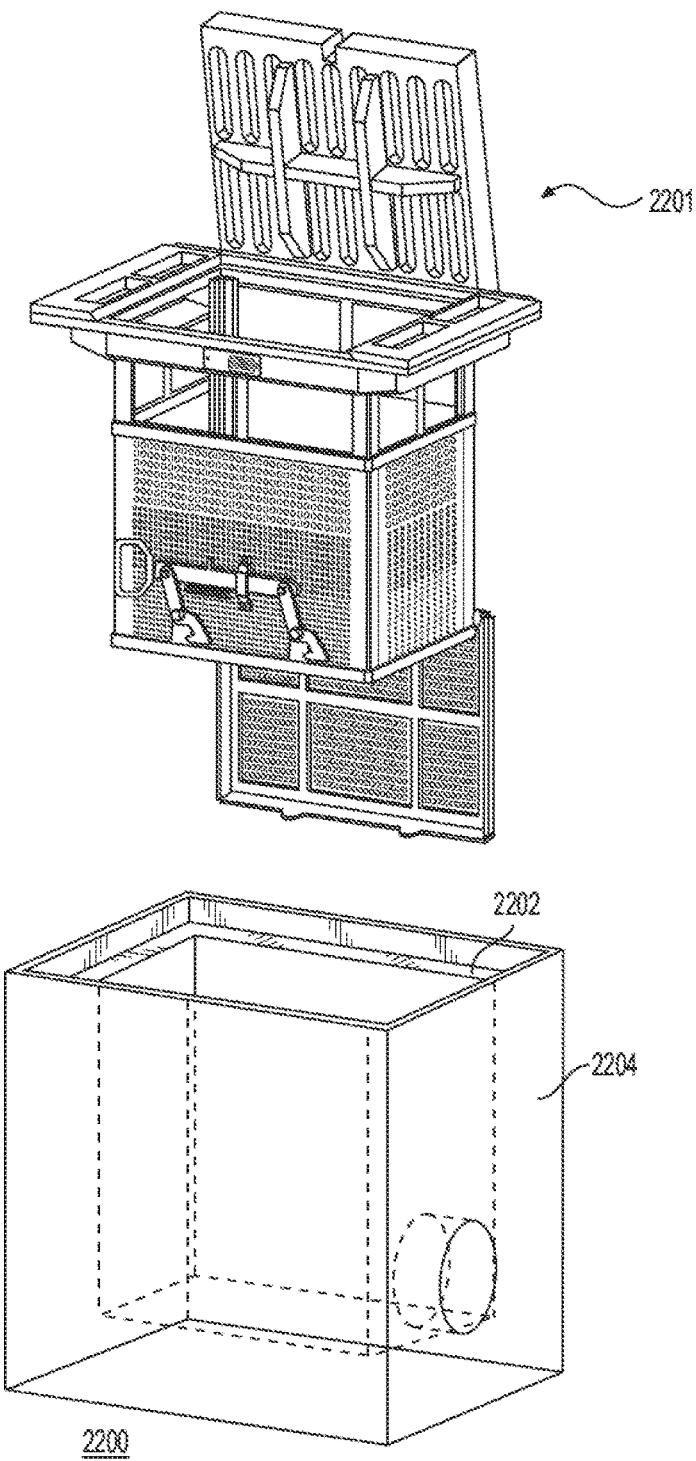
FIG. 22 illustrates a perspective view of a removable catch basin filter insert arranged on a catch basin in accordance with one or more aspects of the disclosure.

FIG. 22 illustrates a perspective view 2200 of a CBFI 2201 in relation to a catch basin 2204 with no adapter frame. As shown, the hinged storm grate and the trap door are open. FIG. 22 also shows that the CBFI 2201 has a shape and/or contour that correspond to the shape and/or contour of the catch basin 2204.

CBFI Body and Frame

An exemplary CBFI is removable from a catch basin and is configured to capture various types of pollution from stormwater. For example, the CBFI 101 is removable from a corresponding catch basin. The CBFI 101, and particularly the filter basket 104, may be shaped like a bucket or basket, or hopper with holes that rests in a catch basin. The filter wall 126 of the CBFI may be permeable over a part of its surface (e.g., with holes), so as to allow water to be filtered of the pollutants, where in an example at least one wall of the CBFI is permeable, and/or the filter wall 126 be a screen to allow water to flow out, but also retain pollution within the CBFI. In one particular example, the maximum size of the holes in the wall may be approximately 6 to 7 mm, so as not to allow cigarette butts to escape the CBFI.

The frame of the CBFI, such as frame 122 of CBFI 101, provides rigidity or flexibility to the CBFI. The frame 122 may also protect the CBFI from damage. The frame may be constructed to allow for the CBFI to be adjustable, modular, and/or scalable, as will be further explained with respect to FIG. 10 for example. The frame 122 may also serve as a guide for CBFI when placed into the catch basin. There may be a corresponding guide system, such as the adapter frame 140, within the catch basin that aligns and guides the CBFI into the proper position. The CBFI 101 may be supported by the frame that is dimensioned to cooperatively engage with the catch basin inlet and the CBFI to substantially maintain the CBFI in a pre-determined location within the catch basin. In an alternative embodiment, the CBFI 101 may not be removable and may be permanently affixed to the catch basin.

The body and frame of a CBFI, such as the CBFI 101, may be made or formed from any suitable type of materials, such as steel, metal, plastic, ABS plastic, COROPLAST, high density polyethylene (HDPE), recycled material, stainless steel, concrete, fiberglass, carbon, and other synthetic or natural materials. For example, the CBFI 101 can be made primarily of sheet metal where the components are folded together and welded. Alternatively, some components can be made by injection molding or other plastic forming process. In a further embodiment, one could cast parts of the CBFI using various metal casting techniques. In yet a further embodiment, all the elements of the CBFI are in an example manufactured of a non-corrosive material such as steel, metal, or high density plastics. Alternatively, the CBFI may be powder coated to prevent corrosion. The powder coating can also provide the CBFI with one or more colors. In an example the CBFI is the color blue.

In one exemplary embodiment, a CBFI may be removed from a catch basin by at least one lifting mechanism. For example, in FIG. 1, the lifting point 116 allows a lifting mechanism, such as a hook, to lift the CBFI 101 out of the catch basin. For example, FIG. 2 shows the lifting hook 202 that can engage and lift the CBFI via the lifting point. By way of another example, FIG. 12, which illustrates a side view 1200 of a CBFI 1201, includes a magnetic lifting mechanism. The magnetic lifting mechanism is formed by way of magnetic lifting point 1204 magnetically attracting to a magnetic element 1206 to move the CBFI 1201.

Alternatively, the top grate can be lifted manually by hand or with a tool to access the inside of the CBFI. The CBFI may have a handle that retracts or moves so the person and/or mechanism emptying the filter insert may grab the filter and remove it from the catch basin. In the example of a manual operation, the one or more filter inserts within the catch basin would be small enough to be lifted by one person. For example, FIG. 11, which illustrates a perspective view 1100 of CBFI 1101, shows three separate removable filter baskets 1102, 1104, and 1106 that can manually be lifted out of the filter frame 1108 via lifting points 1110, 1112, and 1114, respectively. The manual lifting can be performed while a prop arm 1116 props up the hinged storm grate 1118 attached to the filter frame 1108 by way of hinge 1120, as shown.

An exemplary CBFI can be modular, scalable, and/or adjustable. This would allow a user of the filter insert to customize the unit for specific purposes. By way of example, the CBFI can have many adjustments and apparatuses to allow the unit to be expanded and constricted to fit in a specific housing or maximize its filtration capabilities. Allowances can be made in the construction of the CBFI to allow for replacements of old parts with new parts. While modular and replaceable parts are preferred to allow for flexibility in application but, special made components may also be made to account for specific applications.

Figure 10:
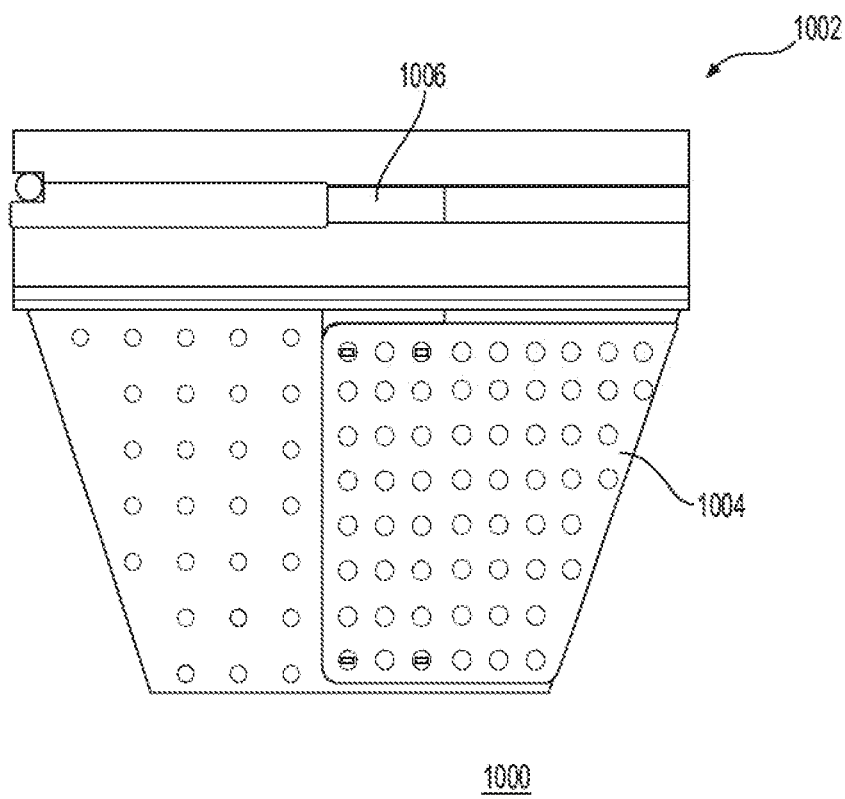
FIG. 10 illustrates a side view of a removable catch basin filter insert with an adjustable frame and an adjustable filter wall in accordance with one or more aspects of the disclosure.

It would be advantageous to the user to allow for a CBFI to be adjusted on site so as to fit the most amounts of catch basin configurations as possible and minimize manufacturing costs. An adjustable CBFI can have pre-marked identifiers to allow the user to properly expand or contract the unit. In an example a majority of the holes in the permeable wall of the CBFI would align after adjustment to ensure maximum efficiency of the filtration system. For example, if one adjustable permeable wall of the CBFI is moved parallel to another adjustable permeable wall, then when the two permeable walls are fastened together then a majority of holes in both permeable walls would line up. This same method of alignment would also be applied to adjusting the frame or adapter frame of the CBFI to ensure efficient filtration. FIG. 10, which for example shows a side view 1000 of CBFI 1002, includes an adjustable filter wall 1004 and an adjustable frame 1006. It may be understood that the filter wall 1004 and the frame 1006 may be adjustable laterally and/or vertically, or in any other suitable direction.

The CBFI may have a predefined shape. As will be further described below, the predefined shape may be any suitable shape to be situated in a respective catch basin. For example, the shape can include a base that generally has a smaller dimension than the top while sitting in the catch basin. This allows for easy removal and insertion of the CBFI. The cross-sectional shapes of the CBFI and/or the catch basin may be of any shape, but may in an example be circular, conical, rectangular, elliptical, diamond, trapezoidal, triangular or square-like, etc.

As described above, an exemplary CBFI can include one or more screens or filter media. For example, the walls of the CBFI may have many holes of any shape within the body and frame of the device. This allows for the CBFI to retain the pollutants and allow the stormwater to exit. The hole spacing filtration system may be of any density and shape. In an example, the size of the holes (e.g., diameter) would be less than 7 mm to capture, for instance, the common cigarette butt, but the size of the holes can be adjusted to meet various filtration requirements. All of the holes may be one size or different sizes. The holes near the top of the CBFI can be larger than the holes at the bottom, or vice versa. Moreover, the holes may be produced in the walls of the CBFI in a plurality of ways including of drilling, laser cutting, water-cutting, molded, layered or any other suitable way. The "holes" may also be formed by meshing wires or other material, such as the ones shown in FIG. 2.

Figure 13:
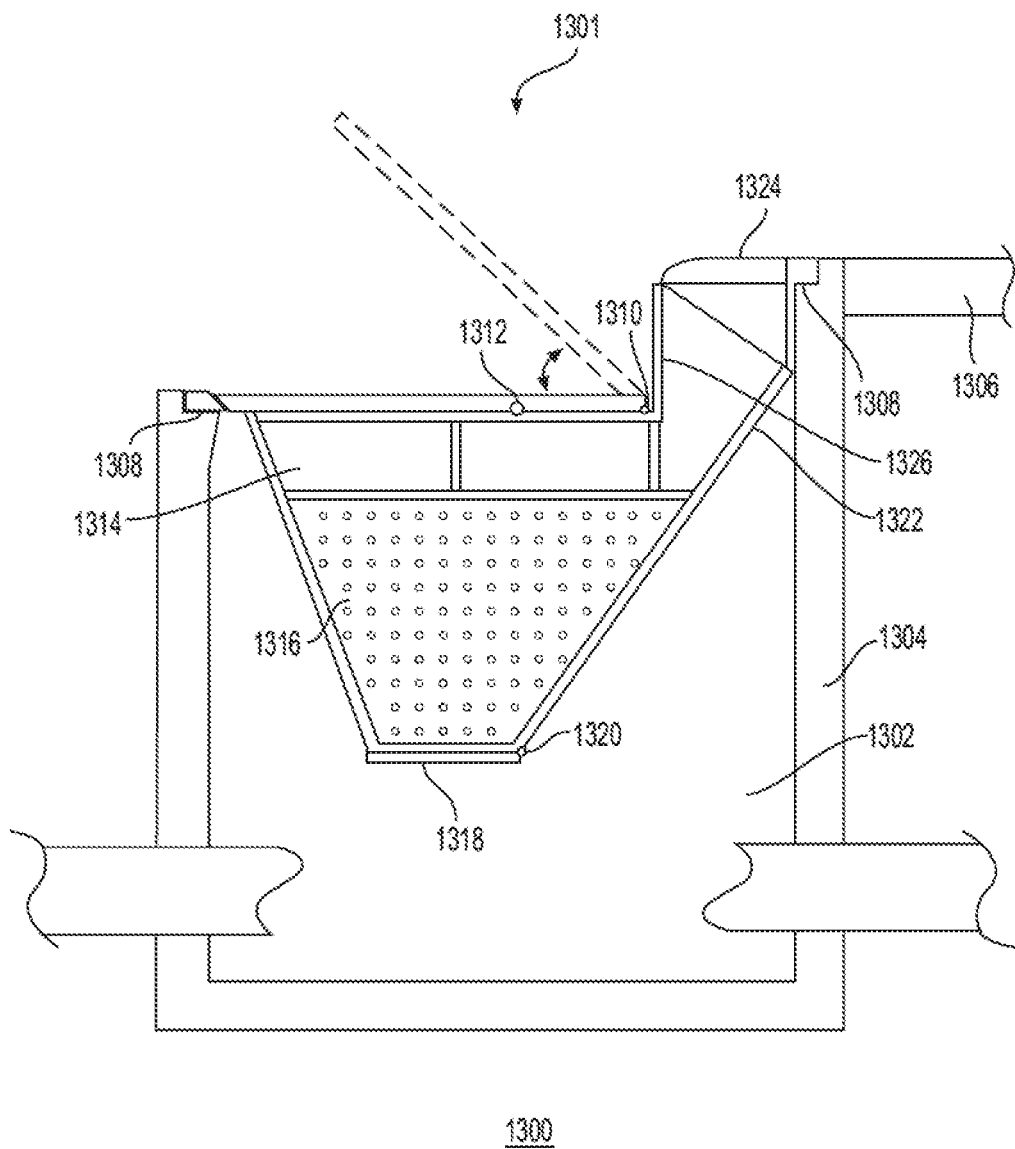
FIG. 13 illustrates a side view of a removable catch basin filter insert with an integrated deflector and hood in accordance with one or more aspects of the disclosure.

A further exemplary CBFI integrally incorporates the hood of the catch basin into the structure of the CBFI so as to be removed with the CBFI. By allowing the hood to be removed with the CBFI will allow the pollution caught in the hood opening to be evacuated as well as what is caught in the filter basket of the CBFI. Moreover, in the exemplary embodiment, the CB filter may also integrally incorporate the deflector. For example, FIG. 13 illustrates a side view 1300 of CBFI 1301 and shows an integrated hood 1324 and an integrated deflector 1322. In at least that regard, the CBFI 1301 along with the integrated hood 1324 and integrated deflector 1322, as a single component, can be situated on the lips 1308 of the catch basin 1302 (by way of an adapter frame, for instance, as described above). The CBFI 1301 with integrated hood and deflector can all be removed from the catch basin 1320 as one unit and be cleaned and maintained.

An additional exemplary embodiment of a CBFI is the incorporation of more than one CBFI in the same catchment basin. The multiple CBFI can sit adjacent to one another, inside one another, or atop one another. It may be a common occurrence within storm sewer systems for multiple storm grates to be associated with a single catch basin. In cases such as this, an exemplary method of filtering stormwater would be to install a CBFI at each storm grate location or at least in the highest polluting location, which is typically the uphill storm grate.

In accordance with another embodiment, a CBFI can have various contours. For example, the walls of the filtration media can be contoured and/or flexible. These contours in the screen, mesh, and/or filtration system may allow for increased surface area, thereby creating better ways of filtration and water flow. Contoured walls (e.g., ribs) may cause light gauge material to be more rigid and thereby cause the CBFI to be more rigid. In some examples, a CBFI may be mostly rigid, such as CBFI 101 made mostly rigid by the filter wall 126, as shown in FIG. 1. In other examples, the CBFI may be flexible. In at least that regard, the frame of a CBFI may be rigid, flexible, or combination thereof. The body of an exemplary CBFI would serve as the frame so as to save on material and manufacturing costs. Thin metal and other material can be bent or molded in such ways to make plated material very strong when folded or bent.

Figure 15A:
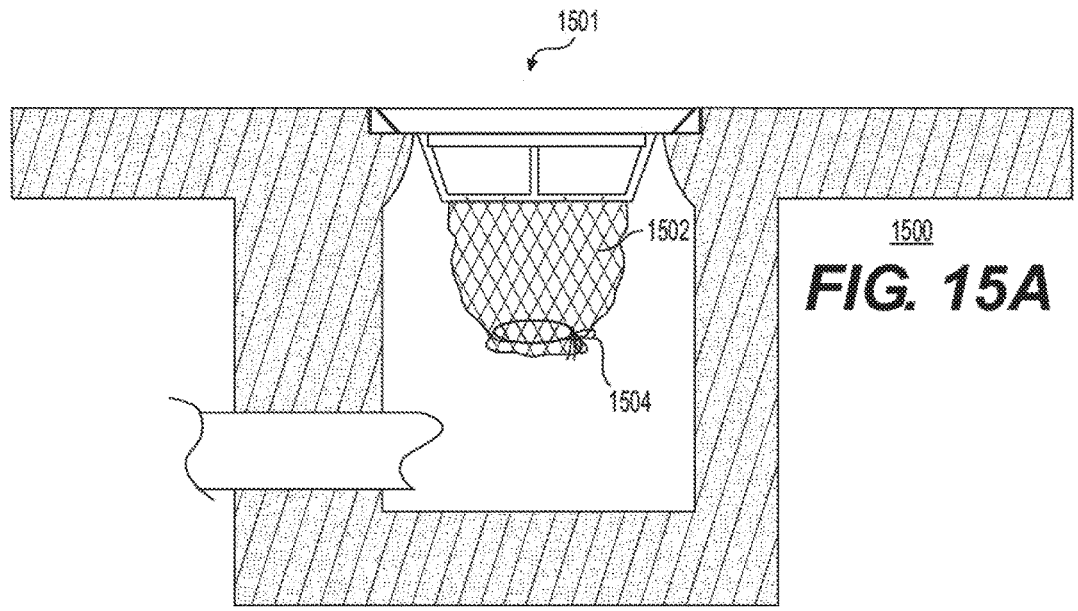
FIG. 15A illustrates a side vide of a removable catch basin filter insert having a filter net situated in a catch basin in accordance with one or more aspects of the disclosure.
Figure 15B:
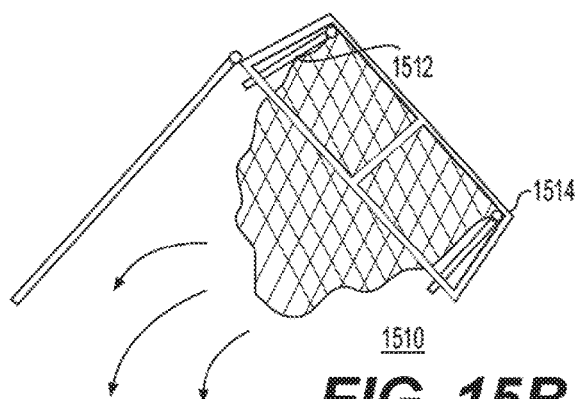
FIGS. 15B and 15C illustrate different emptying configurations of a removable catch basin filter insert having a filter net in accordance with one or more aspects of the disclosure.
Figure 15C:
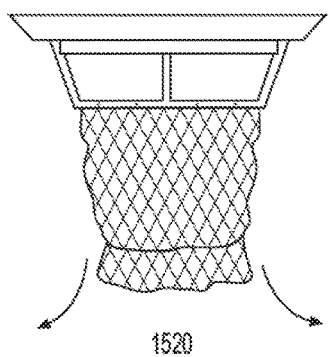
Figure 15D:
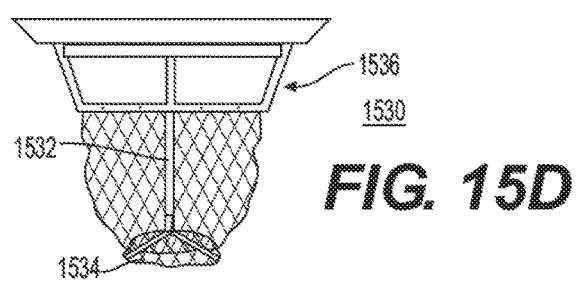
FIG. 15D illustrates a removable catch basin filter inset having a filter net with a folded releasable opening in accordance with one or more aspects of the disclosure.

For example, the CBFI can include a disposable filtration sack (i.e. liner). The filtration sack can be removed manually or by mechanical mechanisms. The sack may be porous and have filtering capabilities. The filtration sack may also be recyclable. FIGS. 15A to 15D illustrate a filtration sack, e.g., a filter net, that is entirely flexible and porous for filtering capabilities in accordance with one or more aspects of the disclosure. FIG. 15 illustrates a side view 1500 of a CBFI 1501 with a filter net 1502 and a releasable opening 1504 at the bottom of the filter net 1502. FIGS. 15B and 15C illustrate a configuration 1510 for emptying a filter net by physically flipping the CBFI and a configuration 1520 for emptying a filter net by way of a releasable opening at the bottom of the filter net, respectively. The filter net may be supported by an internal or external frame or support.

As described above, the body of a CBFI may have a plurality of dimensions and shapes, but may in an example be a shape that allows for the maximum amount of pollution capture within a catch basin while also allowing stormwater within the catch basin to flow unimpeded or nearly unimpeded. By way of example, the CBFI may have a shape that conforms to the shape of a curb and a gutter of a roadway. The shape of the CBFI may also conform to the contours of a stream, channel, or other areas where water or sewer flows. In addition, an exemplary CBFI may meet local, state, or federal regulatory requirements (e.g., Federal Department of Transportation H-20 highway loading standards, United States Environmental Protection Agency Municipal Separate Storm Sewer System regulations). The CBFI may sit at grade, below grade, or a combination thereof. The angle of the CBFI may be horizontal, vertical or sloped. The outside dimensions of the CBFI are typically less than the inside dimensions of the catch basin with approximately the same shape. The CBFI may also be dimensioned in one or more aspects of the disclosure to fit within a catch basin, or the like, and to be removable.

Figure 5:
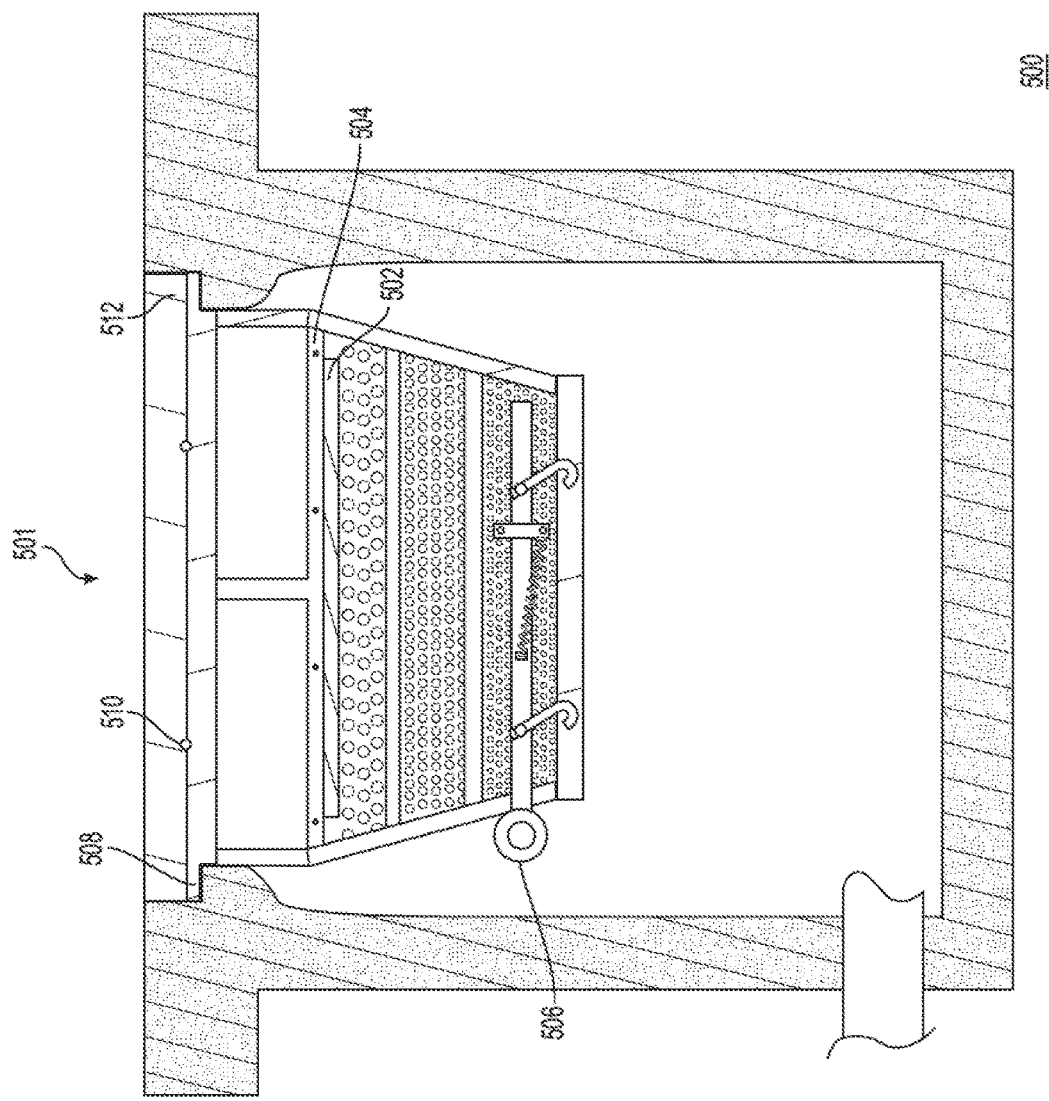
FIG. 5 illustrates a front view of a removable catch basin filter insert situated in a catch basin in accordance with one or more aspects of the disclosure.
Figure 7:
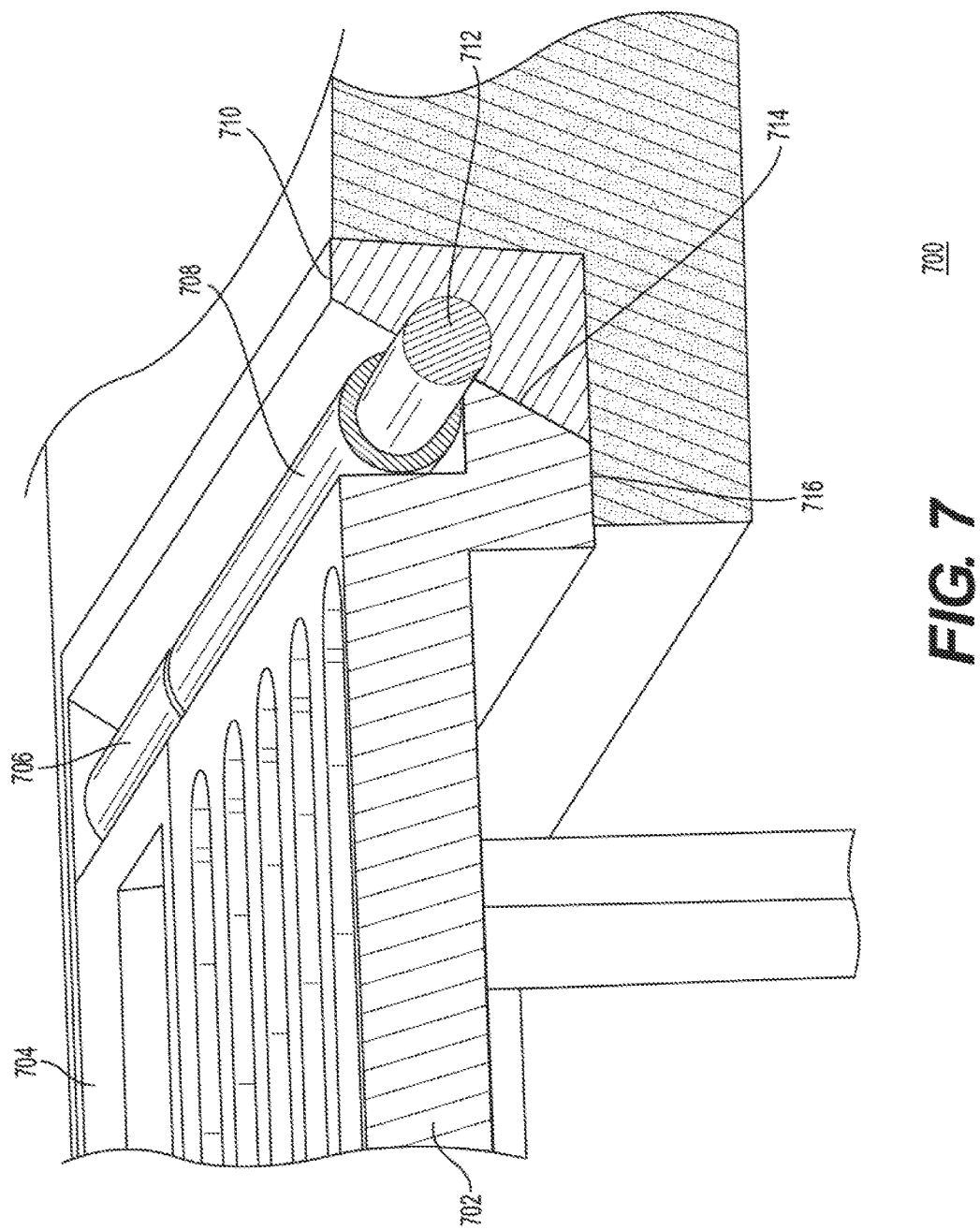
FIG. 7 illustrates a perspective view of a lifting frame of a removable catch basin filter insert, hinge, and an adapter frame resting on a lip of a catch basin in accordance with one or more aspects of the disclosure.

In a further example of the disclosure, a CBFI may also include a lip near the top so that the lip is configured to rest on the lip of the catch basin and under a storm grate which would prevent the CBFI from falling into the catch basin. The CBFI is attached to the storm grate 512 by means of at least one fastener 510 so both may be lifted concurrently from the storm grate with a lifting apparatus. For example, FIG. 5 illustrates a front view 500 of a CBFI 501 situated in a catch basin in accordance with one or more aspects of the disclosure. As shown, the storm grate lip 508 of the CBFI 501 rests on the respective lips of the catch basin. In another example, FIG. 7 illustrates a blown-up perspective view 700 of a lifting frame of a CBFI and an adapter frame resting on a lip of a catch basin in accordance with one or more aspects of the disclosure. As illustrated, a portion of lifting frame 704 rests on the lip of the catch basin, along with the adapter frame 710. Moreover, the lifting frame 704 engages the adapter frame by way of the beveled edge 714.

One example location for the catch basin filter insert is to be placed in the gutter of a roadway, but there may be a plurality of other applications suitable for pollutant removal from the environment. For example, it may be placed within a storm drain, sanitary sewer, combined sewer, fluid channel, creek, stream, infiltration reservoir, culvert, dry well, and/or other environments where water may flow.

One example material used to produce a CBFI is sheet metal. A shape of the filter insert would be cut out and fold and/or bend it into its final shape. Common welding, cutting and fabrication techniques may be used to join the different components of the CBFI. It may be understood by one skilled in the art to produce the components of a CBFI. Alternatively, the components of a CBFI may be built using plastic injection molding techniques or other techniques used to form plastic into shape. It may again be understood by one skilled in the art to produce the components of a CBFI.

The components of the CBFI may be held together with permanent or non-permanent fasteners or bonds. For example, components of the CBFI can be fastened together using methods including welding, fastening, adhering, bolting, riveting, nailing, clamping, pinching, folding, and/or joining. Moreover, in relation to the body of the CBFI, for example, the frame may be located on the inside, outside, or combination thereof to the body or filter net.

In accordance with another embodiment of the disclosure, a CBFI may incorporate a flexible filtration body, as described above with respect to FIGS. 15A to 15C, with a rigid or a semi-rigid frame and a storm grate. A flexible body and adjustable frame 1536 can allow for greater filtration capability while saving on weight. Similar to FIGS. 15A to 15C, in FIG. 15D, for example, a CBFI 1530 is shown having a filter net support element 1532 and a folded releasable opening 1534. Moreover, for example, a hinged storm grate may sit atop a rigid frame that rests within a catch basin. The frame of a CB filter system can resemble an inverted teepee where the bottom points meet or nearly meet forming a circle. The inverted teepee frame is surrounded by a flexible filtration element. Water flows through the top storm grate and is filtered through the flexible CBFI. The rigid or semi-rigid frame allows the flexible CBFI to be inverted to allow the filtered contents to be evacuated while also not allowing the flexible filter element to fall through the opening. Furthermore, FIG. 15B shows the energy dissipaters 1512 rotated about a hinge 1514 and in their open position allowing pollutants to be evacuated from the CBFI in the tipped position.

An exemplary CBFI can have a variety of shapes and forms. In an example, the shape of the CBFI would be one that increases the surface area of the filtration system. For example, the walls of the CBFI can be rounded and or folded in order to increase the surface area of the filtration media thereby capturing more pollutants and allowing fluid to flow more readily through the filtration system.

A stormwater catch basin may have at least one inlet and one outlet for water to flow. Often the inlet is where the water enters from the top of the catch basin through the storm grate and hood. Many times, catch basins act as a transfer point where storm water from up gradient flows into a catch basin through a pipe where it joins with the water flowing in from above within the catch basin and then exits down gradient through the outlet pipe. These pipes are normally subterranean. An exemplary catch basin filter insert may capture pollutants from the up gradient inlet water flow within a catch basin in addition to the pollutants that enter the catch basin from above through the storm grate. These pollutants can be retained with the CBFI and removed at a later date during the maintenance cycle.

An exemplary CBFI can have multiple attachments that are firmly affixed to the CBFI so they do not become dislodge if cleaned out by a vacuum truck. A vacuum truck may have very strong suction and it would be advantageous for any attachments to the CBFI would be affixed well enough to not become dislodged during the maintenance, cleaning, and/or emptying process. Alternatively, certain filtration objects or media can preferably be dislodged during the maintenance process so they are removed from the CBFI.

In yet another exemplary embodiment, a CBFI may include a hinged storm grate that acts as a manhole cover with at least one hinge and at least one lifting point where the hinged cover can open while the at least one lifting point is engaged with a lifting arm. The hinged manhole cover attaches to the CBFI and can be removed for maintenance. The filter basket can fasten to and hang below an unhinged cover with at least one lifting point. The CBFI with hinged manhole cover includes at least one lifting point so it can be removed from the catch basin or vault in much the same way as the CBFI with hinged storm grate embodiment. This method would be advantageous for the instances where stormwater flows through a curb inlet and away from the gutter and roadway. For example, some curb inlets flow into a catch basin that is located under a sidewalk so there is no storm grate covering the catch basin. The water can be diverted from the curb inlet through a pathway or funnel system towards the CBFI that causes the stormwater pollution to be filtered. One can lift the hinged manhole cover with lifting hooks from the catch basin and remove the pollutants. The pollutants can be removed by tipping the CBFI with hinged manhole cover or by releasing a door at or near the bottom. The manhole cover may include similar devices as the hinged storm grate including at least one lifting point, hinge, prop arm, hole, word, lock, etc. The CBFI for curb inlets is dimensioned in the one or more embodiments of the disclosure to fit through a standard manhole.

According to one example, FIG. 14A illustrates a perspective view 1400 of a CBFI 1401 for a manhole in accordance with one or more aspects of the disclosure. FIGS. 14B and 14C illustrate a top view 1410 and a side view 1420, respectively, of a CBFI situated in a manhole in accordance with one or more aspects of the disclosure. One or more components of the CBFI 1401 have components similar to the CBFIs shown in FIGS. 1 to 4. The CBFI 1401 includes a cover 1402, hinge 1403, a lifting point 1404, a lifting frame 1405, a suspender 1406, a trap door 1407, and a latch system 1408. As shown, the lifting frame 1405 is circular to fit the manhole and substitute as the manhole cover.

From the top view 1410, FIG. 14B shows a curb inlet 1411 with two separate channels 1412 (which can be deflectors) for receiving the stormwater. As illustrated, the catch basin 1414 includes an outlet 1415 for flowing water out of the catch basin 1414. In the side view 1420, FIG. 14C shows a CBFI 1421 (which may be similar to the CBFI 1401 of FIG. 14A) situated into a manhole and into a catch basin 1422. Channel (e.g., deflector) 1412 guides water into the CBFI 1421 via a curb inlet 1426. A deflector support 1430 may be arranged on a catch basin hood 1428 or adapter frame 1436. Another deflector support 1432 may be used to support the channel 1412 and arranged on a wall of the catch basin 1422. As shown, the CBFI 1421 has a hinged cover 1434 arranged to fit in an adapter frame 1436, all of which rests on a lip of the catch basin 1422. The CBFI 1401 may be situated in the manhole with or without the adapter frame 1436. Moreover, a filter basket 1440 includes filter holes 1438, a trap door 1442 attached thereto by way of a hinge 1444. The filter basket 1440 also has one or more ladder rungs 1446.

Figure 23B:
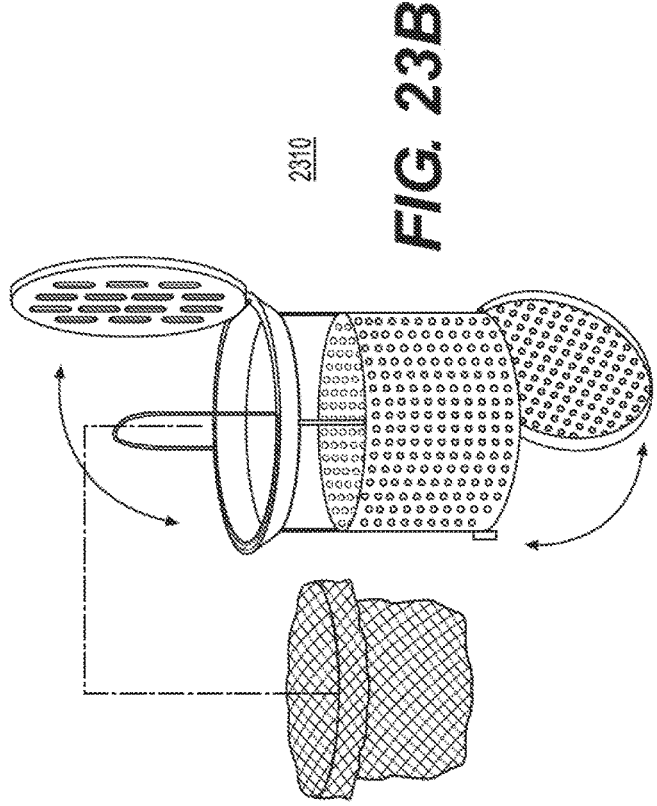
FIG. 23B illustrates a perspective view of another removable catch basin filter insert for a drainage system with a hinged grate and a trap door open in accordance with one or more aspects of the disclosure.
Figure 23C:
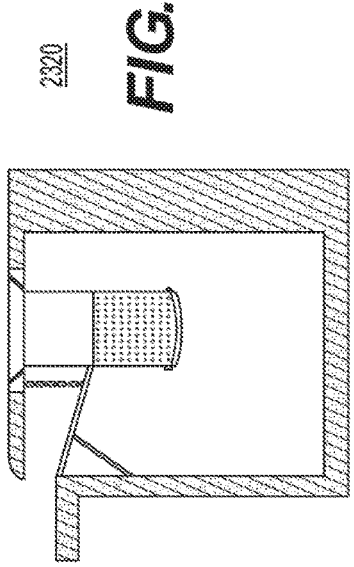
FIG. 23C illustrates a side view of another removable catch basin filter insert situated in a manhole in accordance with one or more aspects of the disclosure.
Figure 23A:
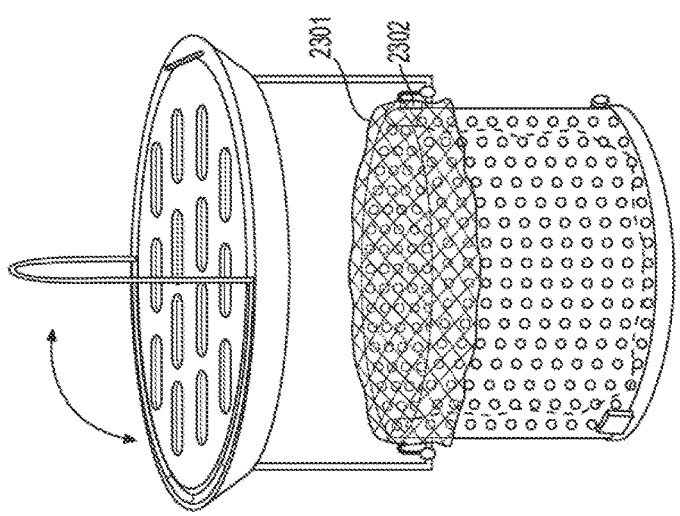
FIG. 23A illustrates a perspective view of another removable catch basin filter insert and filter net for a drainage system in accordance with one or more aspects of the disclosure.

In a different embodiment of the present disclosure, FIGS. 23A to 23C illustrate a CBFI with a circular lift frame and circular hinged cover with a collapsible handle. FIG. 23A illustrates a perspective view 2300 of such CBFI with a magnetic element 2302 attached to a filter net 2301 placed within a CBFI. FIG. 23B shows a perspective view 2310 of the CBFI with the cover and the trap door open in accordance with one or more aspects of the disclosure. FIG. 23C shows a side view 2320 of the same CBFI situated in a manhole and a catch basin in accordance with one or more aspects of the disclosure.

In another exemplary embodiment, a CBFI with a hinged storm grate may be used as an animal trap. For example, in areas where rodent or animal populations live in the storm sewer, a device that acts as an animal trap in the catch basin may be advantageous to the user. The CBFI can include a live trap, leg trap, or other trap that kills the animal. The CBFI can include surfaces that cause the animal to fall into a holding compartment. The CBFI can also include one-way or trap doors which cause the targeted animal to become trapped. The CBFI can hold the live or dead animal until it can be removed.

In yet another exemplary embodiment, a CBFI can be moved in the X, Y, and/or Z axis. Commonly this innovation relates to removing the CBFI on the Z axis (e.g., upward and vertical) to immediately remove it from its support or housing. There are instances that it would be advantageous for the user to move the CBFI in the X or Y axis to remove it from its support or housing. For example, the CB filter may be situated in a pipe in the horizontal position and to remove the CBFI one would have to move the CB filter in the X or Y axis direction to move it.

In a further exemplary embodiment, a CBFI can have removable parts and components. For example, the storm grate can be removed from the frame, the filter basket can be removed from the suspending supports, and the frame can be removed from the suspending supports. This may allow for easier repairs and replacement.

In another exemplary embodiment, a CBFI has a side cutout that allows fluid to laterally overflow from one modular unit to an adjacent modular unit. One or more of the CBFIs may receive water from above or laterally. Moreover, an exemplary CBFI includes at least one rolling mechanism. For example, the rolling mechanism can be one or more wheels that allow the CBFI to be rolled and moved easier.

In an additional exemplary embodiment, a CBFI captures pollutants from the first flush of a rainstorm and can allow the remainder of the stormwater to overflow into the storm sewer system. The first flush is the initial surface runoff of a rainstorm. The water pollution associated with the first flush is generally more concentrated compared to the remainder of the storm.

Hinged Storm Grate

In accordance with one or more embodiments of the disclosure, a hinged storm grate fits atop a CBFI. The hinged stored grate may also be referred herein as a cover, a lid, or any non-limiting term that signifies a removable and/or hinged cover for a top of a container-like object. The hinged storm grate is in an example affixed to the CBFI with at least one hinge. The edges of the hinged storm grate rest on a lip on the inside dimension of the CBFI so it does not fall into the CBFI. When the CBFI and hinged storm grate are lifted from the housing for cleaning, and then turned upside down, the hinged storm grate opens opposite the at least one hinge and allows the trash, debris, pollutants, garbage, etc. to be evacuated by falling out. When the CBFI and hinged storm grate are placed back in the catch basin, the hinged storm grate falls back into place and the lifting elements may retract back into the filter insert.

Figure 6:
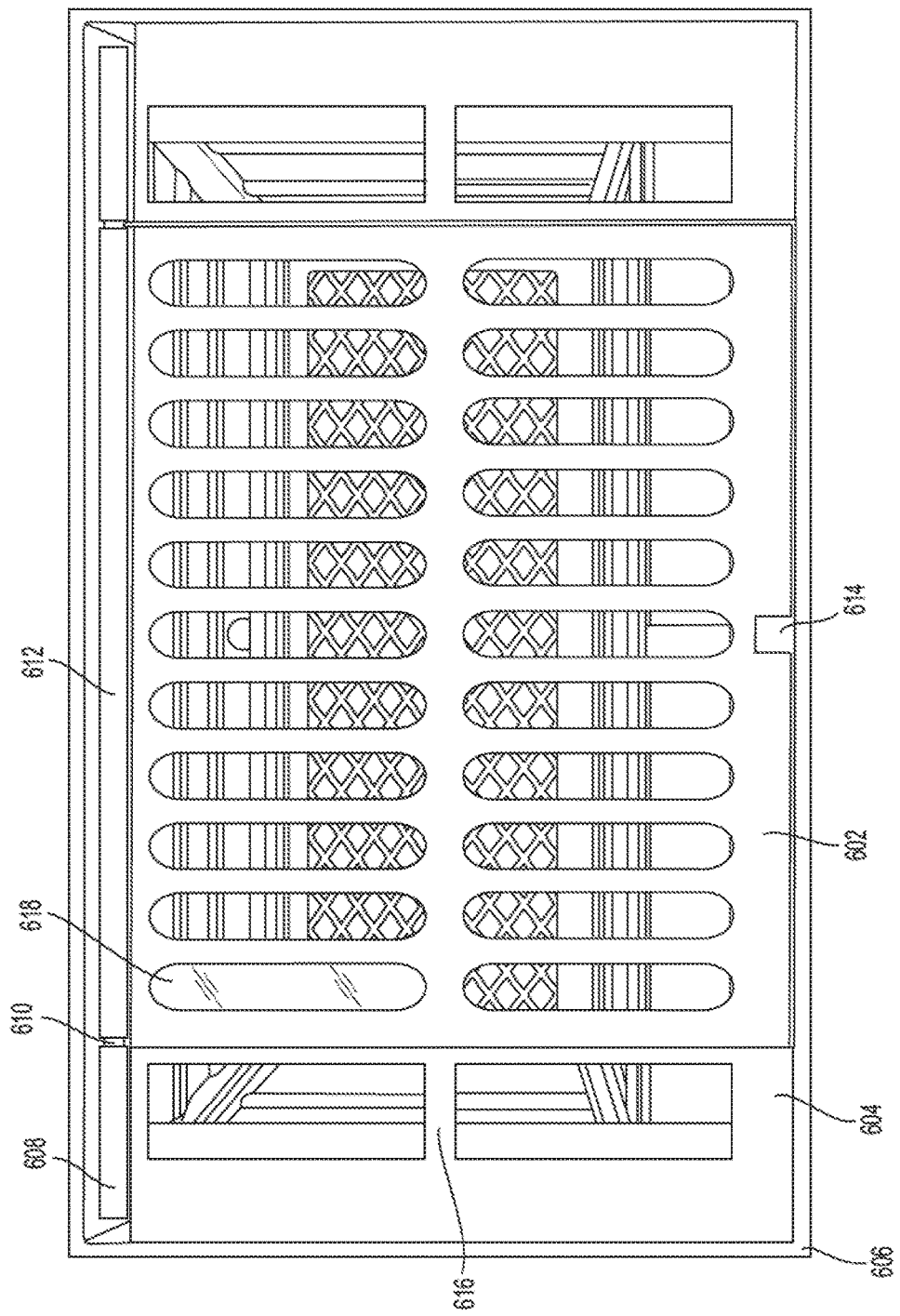
FIG. 6 illustrates a top view of a removable catch basin filter insert in accordance with one or more aspects of the disclosure.
Figure 21:
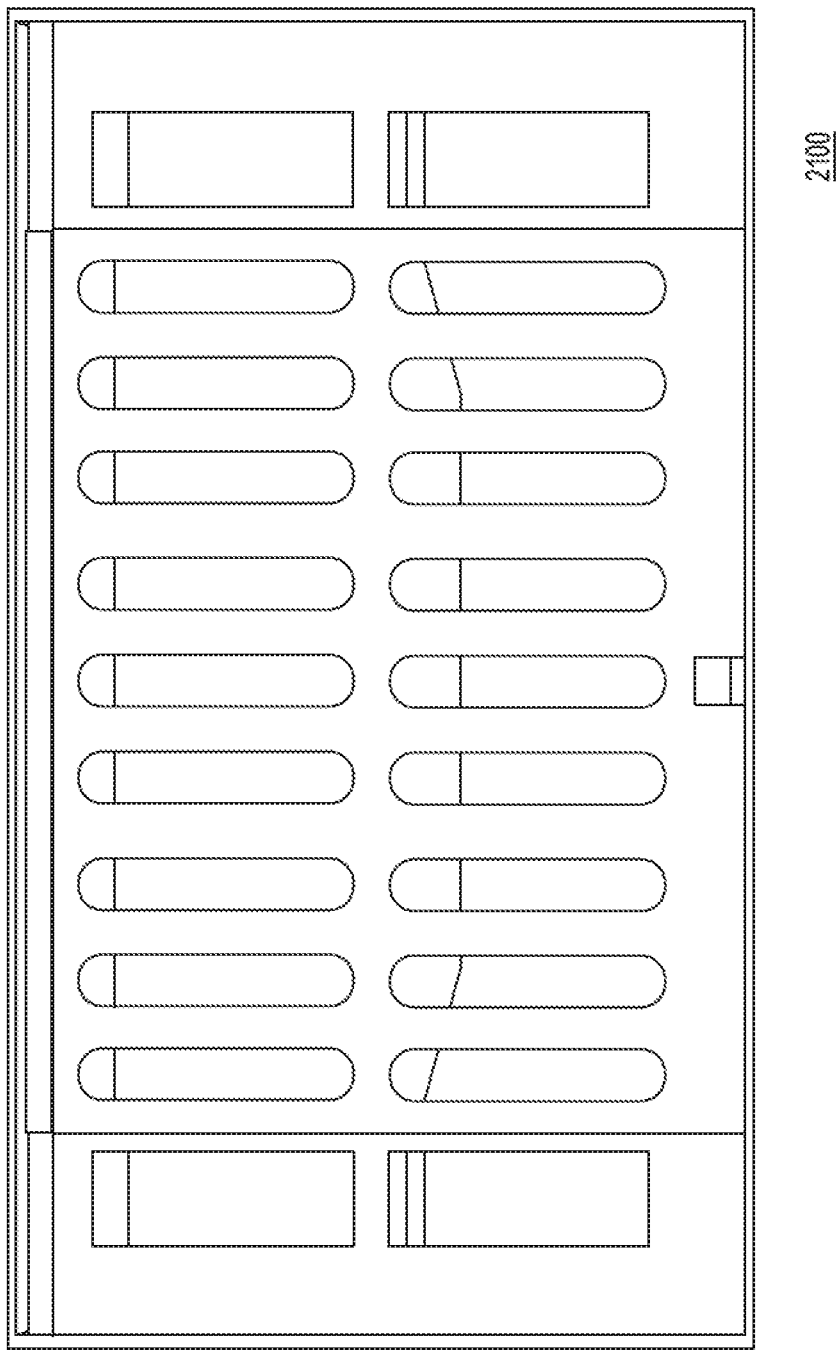
FIG. 21 illustrates another top view of a removable catch basin filter insert in accordance with one or more aspects of the disclosure.

For example, FIG. 6 illustrates from a top view 600 a hinged storm grate 602 attached to the illustrated CBFI by way of a hinge pin 610 and a storm grate hinge barrel 612 fastened to the storm grate. The hinged storm grate 602 along with a lifting frame 604 and the adapter frame 606, from top view 600, outline the perimeter of the CBFI. The lifting frame hinge barrel 608 is fastened to the lifting frame 604. The hinge pin 610 is positioned through both the lifting frame hinge barrel 608 and the storm grate hinge barrel 612 and can be fastened at both ends to hold the hinge pin inside the hinge barrels so the hinged storm grate is integrally connected to the lifting frame. FIG. 7, for example, also shows hinge pin 712 arranged in a storm grate hinge barrel 708, both of which are arranged adjacent to a lifting frame hinge barrel 706. Moreover, FIG. 21 illustrates another top view of a CBFI with a hinged storm grate.

An exemplary hinged storm grate may be constructed of at least one non-corrosive material. The hinge may be able to function even if it is subjected to a corrosive environment, such as an environment near a body of saltwater, so that the CBFI can be accessed and maintained.

The hinged storm grate may include a sound dampening mechanism (e.g., a sound dampener with sound dampening material) to prevent a loud bang caused by metal to metal contact when the grate falls. For example, there may be a strip of rubber or plastic around the lip of the CBFI that acts as a seal or gasket that prevents metal to metal contact between the hinged storm grate and the CBFI. The sound dampening device can also be affixed to the hinged storm grate. The sound dampening device may also serve as a seal to prevent or direct the flow of material. For example, there may be a gasket or seal that partially or wholly surrounds the lip of the CBFI or the catch basin lip itself. This gasket or seal can prevent the flow of material through a given area.

An exemplary CBFI may include a storm grate with at least one hinge, for example, hinge pin 610 and hinge barrel 612 of FIG. 6. In an example the hinge is on the curb-side of the CBFI but it can be located on any side of the CBFI. The hinged storm grate incorporates at least one hinge to allow it to be opened manually, mechanically, magnetically and/or gravitationally. One can use a lever to pry it open, and/or a mechanical device to lift the storm grate open, and/or a magnet can magnetically open the storm grate or the CBFI can be tipped to allow the hinged storm grate open by the force of gravity.

The hinged storm grate of the present disclosure can meet local, state or federal regulatory requirements (e.g., Federal Dept. of Transportation H-20 highway loading standards and United States Environmental Protection Agency Municipal Separate Storm Sewer System {USEPA-MS4}), or similar foreign and domestic regulatory requirements related to water, land, and/or air. Moreover, the hinged storm grate, for example, may withstand normal traffic loading.

In one embodiment, a hinged storm grate may be formed or made from iron and/or steel. Additionally, an exemplary hinged storm grate is made of composite material. Alternatively, other material for producing a hinged storm grate includes steel, iron, polymer, composite, plastic, carbon, or any other natural or synthetic material.

An exemplary hinged storm grate can be of any shape. In one example, the hinged storm grate is in the shape of a circle, square, rectangle, oval, triangle or diamond. The hinged storm grate may be any suitable shape and design to most efficiently direct stormwater from a gutter to the catch basin. There are many applications that a hinged storm grate can cover a catch basin and they will become more apparent with experimentation and customer requirements.

In another example, according to the aspects of the disclosure, a hinged storm grate may be rigid. Alternatively, the hinged storm grate may be flexible for environments that require a flexible grate such as sensitive environmental areas. For example, the lid or cover may bend or bow with an applied force.

An exemplary hinged storm grate is produced with holes of sufficient size to allow stormwater to flow into the catch basin, act as a roadway surface, and prevent certain large items from entering the catch basin (e.g., foot traffic, bicycles, large tree limbs, vehicles, etc.) Moreover, an exemplary hinged storm grate may be flat, or alternatively, the hinged storm grate may be contoured or angled to accommodate environmental conditions and applications.

In yet another embodiment of the present disclosure, a hinged storm grate may incorporate a stopping device and/or mechanism to prevent the grate from opening past 90 degrees. This would allow for the grate to fall shut if left unattended since the center of gravity of the storm grate would be positioned towards the closed side of the hinge rather than the open side. For example, a tab can be attached to a hinge that presses against a barrier at a certain point of hinge opening. The tab hitting the barrier may cause the hinge not to open any further. This tab can be attached to the hinge housing or can rotate with the hinge. Additionally, a chain or cable can be attached to the door on a hinge to prevent it from opening past a certain point. In yet another example, the design of the CB filter itself may stop the hinged storm grate from opening past 90 degrees, as illustrated, for instance, in FIG. 13. In at least that regard, the grate may fall shut if left unattended so as to prevent traffic, people, and/or items from falling in.

Figure 11:
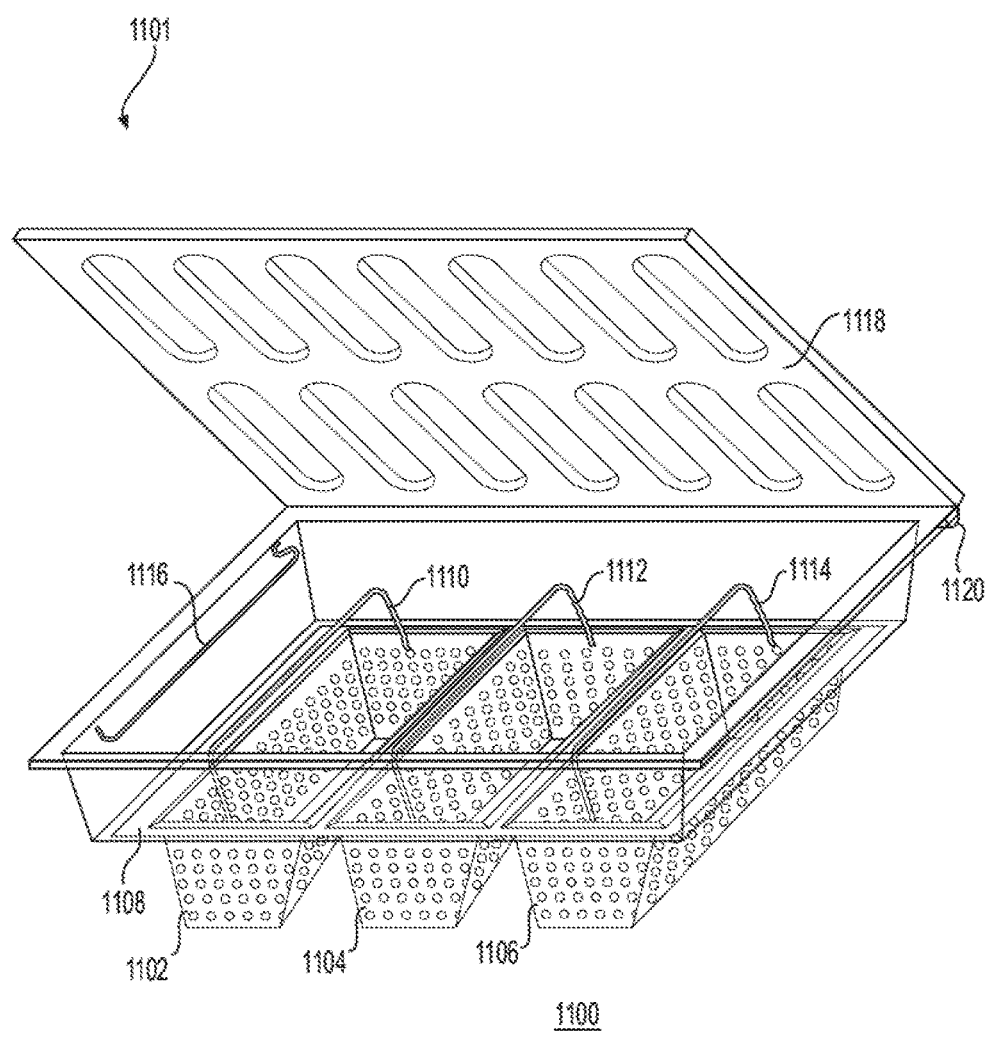
FIG. 11 illustrates a perspective view of a removable catch basin filter with separately removable filter baskets in accordance with one or more aspects of the disclosure.

An exemplary hinged storm grate can incorporate a prop arm to hold the grate open while being serviced. The prop arm can be an integral component of the CBFI system and stored under the hinged storm grate or it can be a separate item only used when servicing the CBFI. The prop arm can serve as a safety arm to hold open the grate for a user. FIG. 11, as described above for example, has a prop arm 1116, which is used to prop up the hinged storm grate 1118. The prop arm can rotate around a point and be folded under the hinged storm grate when not in use. The hinged storm grate may include an attachment point for the prop arm to attach to when holding open the hinged storm grate. Furthermore, the prop arm can have an attachment point that securely holds it against the CBFI when not in use so it does not become dislodged when the CBFI is tipped.

In a further embodiment of the disclosure, a CBFI may be at least one hydraulic or pneumatic piston to help lift and hold open a hinged storm grate. The hinged storm grate may be very heavy and a maintenance person can benefit from a device (e.g., hydraulic or pneumatic piston) that helps open, or hold open a hinged storm grate.

An exemplary hinged storm grate may sit at the road grade, below grade or any combination thereof. It may sit flat or at a slope. Moreover, an exemplary hinged storm grate can include multiple segments. For example, where catchment basins are located at a corner, the hinged storm grate may require multiple segments to open properly and allow for full evacuation of CBFI contents. On an inside corner, the curbside dimension of the grate may be less than the street side dimension (vice versa for outside corner). Each segment of the hinged storm grate may require at least one hinge. An exemplary hinged storm grate may also rest upon a frame. The frame may help distribute the load exhibited from the traffic above.

In accordance to yet an additional embodiment, a hinged storm grate may include at least one magnetic element and/or may be magnetized as a whole unit or can have one or more magnets attached to the storm grate.

An exemplary hinged storm grate may incorporate an embodiment to mitigate the effects of debris accumulation on the frame of where the storm grate is seated. For example, a storm grate may sit on a two-inch lip of a frame that covers a catch basin. Often, this lip may accumulate debris, which may cause some storm grates to not sit flush. An improved storm grate, such as the storm grates in accordance with one or more aspects of the disclosure, may include a wedge-like shape (or other contour shape) on the underside and side of the storm grate that pushes into debris and allows the grate to firmly rests upon the frame lip. The one or more wedges would essentially slice through the debris thereby causing a firm seat for the hinged storm grate to rest on. The bottom and sides of the hinged storm grate may resemble a large serrated knife, where multiple wedges and contours act as the base of where the hinged storm grate presses against the frame of the CBFI. The contours may also incorporate a sound dampening device. These contours will allow for the hinged storm grate to have a better chance of closing even if there is a large amount of debris between the storm grate and the CB filter frame. The sound dampening devices can be individual units and replaceable. Furthermore, the frame of the CBFI may have corresponding contours to complement the contours on the hinged storm grate to allow for greater efficiency of design.

In one example method of producing a hinged storm grate, cast iron molding techniques may be used. Another exemplary way to produce a hinged storm grate is to create it from a piece of plate steel where the holes are cut out of the steel to the desired design and function and fixtures may be welded on. In yet another exemplary method of producing a hinged storm grate, a molding process, such as plastic or fiberglass, may be used.

An exemplary hinged storm grate may be opened when the CBFI is situated in the catch basin. For example, there is enough clearance and maneuverability of the hinged storm grate to be opened in a plurality of circumstances, including when it is tipped on its side, upside down, or in an upright position.

Moreover, in another example, a CBFI may include a hinged hood incorporated to the CBFI. For instance, typical catch basins with storm grates have a hood opening (e.g., throat) where the opening is in the vertical plane (as opposed to the storm grate which is open in the horizontal plane). The hood opening is generally larger than the holes in the storm grate thereby allowing larger items to pass into the catch basin through the hood opening. By incorporating the hood structure to the catch basin filter insert, the device may be configured to capture more pollution from stormwater. When the CBFI with integrated hood is lifted from the catch basin and tipped, then one or both the hood and storm grate can open around a hinge and evacuate the contents of the CBFI into a receptacle.

In yet another embodiment of the disclosure, a hinged storm grate can be removed from the basket of the CBFI. Furthermore, the hinged storm grate can be replaced with other devices that modify operation of the CBFI. For example, a normal hinged storm grate can be changed out with another device during the fall to capture more leaves from the storm sewer system. Additionally, the hinged storm grate and/or CBFI can be replaced with a modified storm grate and/or filter that is designed to work with specific environments including winter, monsoon, new construction, autumn leaves, block parties, seasons, etc.

An exemplary hinged storm grate would have a quick release mechanism so the hinged storm grate can be easily removed. Alternatively, a hinged storm grate can be designed to be difficult to remove to prevent, for example, theft.

An exemplary hinged storm grate incorporates patterns in the holes that perform a plurality of functions including hydrodynamic control, load distribution, beautification, etc. For example, the holes can be angled and fluted to catch more water from a certain direction of flow.

An exemplary hinged storm grate is designed to account for pedestrian and bicyclist safety. For example, the holes in the hinged storm grate are aligned so they do not grab a normal bicycle tire (e.g., perpendicular to bicycle traffic) so the bicycle tire does not become lodged within the hinged storm grate opening(s). Furthermore, the holes are designed so they do not allow a shoe of a certain size to enter the holes of the hinged storm grate.

Furthermore, an exemplary hinged storm grate includes at least one notch or pry hole. FIG. 1, for example, includes notch 120. The notch can be recessed within the plane of the hinged storm grate so it does not protrude and cause a tripping hazard. Furthermore, the notch is an integral part of the storm grate and can act as a place for stormwater to flow. The notch serves the purpose of allowing a designated point(s) for a maintenance person to grab and lift the hinged storm grate to allow access to the CBFI. One may use a hand or tool to grab the notch to open the hinged storm grate. One may also insert a lever or arm into a hole to pry the hinged storm grate open. This same notch point can be used to attach a hook so the heavy storm grate or frame can be lifted and maneuvered by a crane-like device.

In another exemplary embodiment, a storm grate may include openings that direct the flow of stormwater into the CBFI. For example, the openings of the hinged storm grate may be fluted or slanted to cause stormwater flowing in a certain direction to be diverted into the CBFI. Often times a catch basin is located to capture water from a sloped surface. If the openings of the hinged storm grate are fluted or slanted it can help capture and divert more of the stormwater into the CBFI rather than letting the stormwater flow over the hinged storm grate. The flutes or slants of the hinged storm grate can be unidirectional or multi-directional to aid in water capture or flow.

Moreover, the hinged storm grate in accordance with one or more aspects of the disclosure may slide and rotate. For example, some catch basins may be hard to access or may actually be positioned under an overhang. A hinged storm grate that can slide out from an overhang or restriction and then rotate open may be an advantage to the user. The hinge or pin may slide in a channel that allows the hinged storm grate to free itself from a restrictive opening. The hinged storm grate may also be removed from the filter insert. For example, the at least one hinge can rotate around the x, y, or z axis causing one side of the hinge to disconnect from the other side of the hinge thereby separating the hinged storm grate from the filter insert. The user may want to do this for a plurality of reasons including maintenance, equipment replacement, access, and the like. And the exemplary hinged storm grate may seal against the frame of the CBFI.

In yet another exemplary embodiment, a hinged storm grate may be angled on the bottom where it rests against and angled frame allowing debris and water to fall into the catch basin. The angle of the storm grate distributes the load exerted on it from above. The angle may also cause debris to not become stuck between the hinged storm grate and the frame it rests on so the hinged storm grate usually sits flush, or nearly flush, against the frame. For example, the top perimeter dimension of the hinged storm grate is greater than the bottom perimeter dimension.

Moreover, in some examples, a hinged storm grate includes a linkage with at least one arm to connect the hinged storm grate to another component of the CBFI. The movement of the storm grate can cause the linkage to move another CB filter component like a diverter, energy dissipater, filtration mechanism, or the like.

In other examples, a hinged storm grate may include at least one notch in the storm grate exposing the frame of the CBFI. This notch may serve a plurality of purposes. The notch may serve as a point for a tool to be inserted to lift the hinged storm grate. Additionally, the notch can serve as a point of rotation. For example, if the CBFI were lifted by a flexible cable, rather than a rigid lifting unit, then it may be difficult for one to invert the CBFI. A hook can be placed in the notch so a force may be applied to the frame of the CBFI that is opposite that of the lifting force. This would cause the CBFI to rotate and evacuate its contents. FIG. 1, for example, includes notch 120. Similarly, notch 614 is included on the hinged storm grate 602, as illustrated in FIG. 6.

In an alternate exemplary embodiment, the CBFI hinged storm grate can be removed from the CBFI. It may become necessary to remove the hinged storm grate for the purpose of maintenance, cleaning, and replacement. In an example, the hinges are configured to allow removal of the storm grate from the CBFI. In another alternative embodiment, the storm grate may not be permanently attached to the CBFI. The CBFI may be placed under or fastened to an existing storm grate for the purpose of filtering water.

Figure 9:
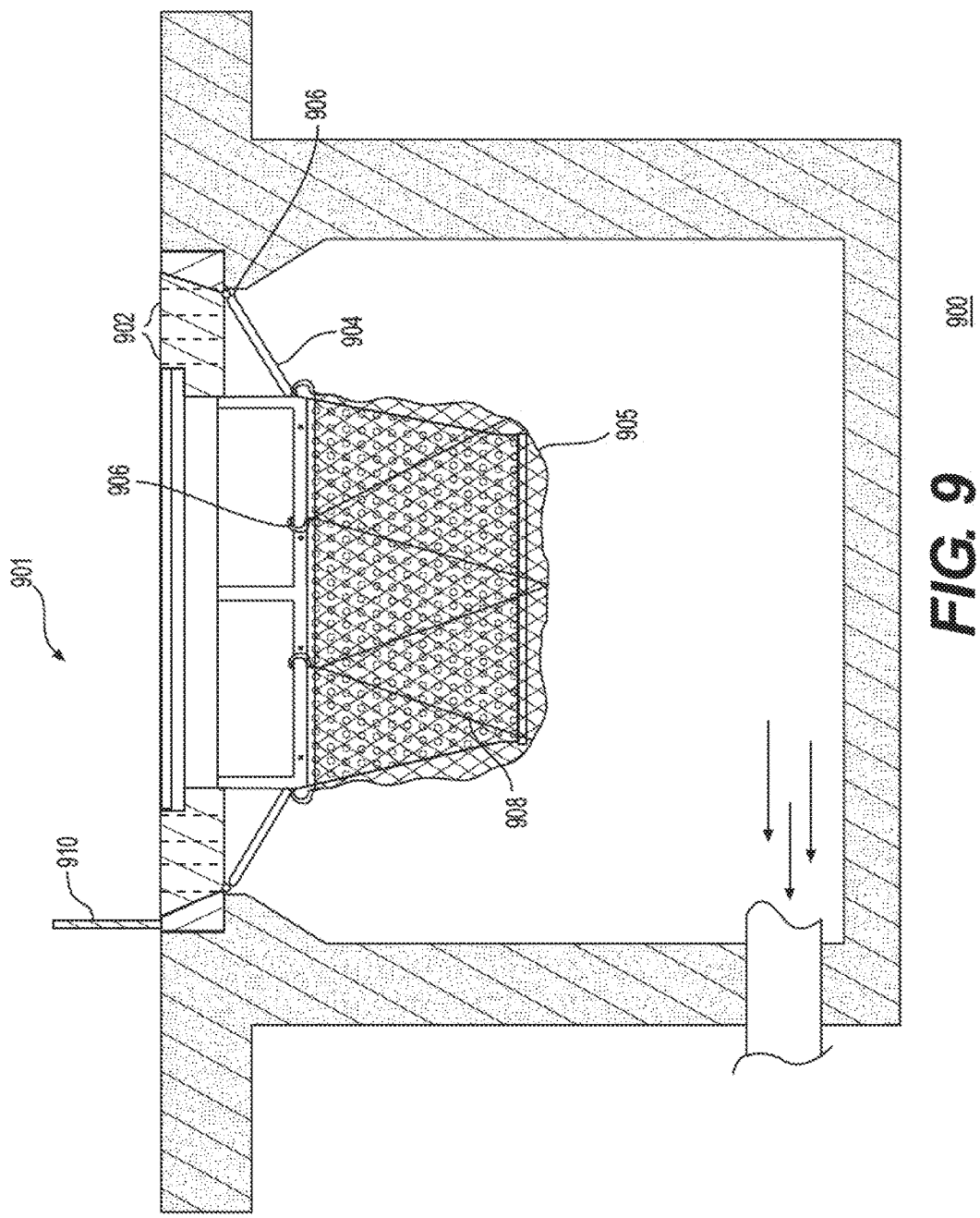
FIG. 9 illustrates a removable catch basin filter insert with a filter net situated in a catch basin in accordance with one or more aspects of the disclosure.

The CBFI according to aspects of the disclosure may include at least one wall that extends upwards from the level of the hinged storm grate. This wall (hereinafter referred to as the "debris catch") is flexible or rigid. As shown in FIG. 9, the debris catch 910 can also be porous or non-porous. For example, the debris catch can function as a grate that protrudes approximately six inches up from the top of the storm grate and towards the curb side. This debris catch can prevent pollutants from entering the storm sewer by covering the hood of the storm drain. Alternatively, in another exemplary example, the debris catch can be perpendicular or not perpendicular to the flow of water in a gutter system. The debris catch can extend vertically from the CBFI and on the downstream side of the hinged storm grate. This debris catch would then serve a purpose of preventing debris that was not initially captured in the storm grate, from flowing downstream in the gutter. Furthermore, the debris catch can divert water toward or away from the filter basket. The debris catch would hold the debris on top of the CBFI so it can be removed during the normal maintenance procedure of dumping the CBFI. A flexible debris catch would be advantageous so a car or bicycle could drive over the top of it and not damage the unit. A rigid debris catch would be advantageous for instances where a more robust system is necessary. The debris catch can be affixed to the CBFI at any angle but in an example at an angle between 45 and 90 degrees. Furthermore, the debris catch can be affixed to the CBFI in a plurality of ways. For example, it can be welded, fastened, or affixed to the hinged storm grate, the adapter frame, the frame of the CBFI, or to the catch basin unit itself.

Adapter Frame

In one embodiment of the disclosure, a CBFI may include an adapter frame. The adapter frame is placed between the catch basin frame and the CBFI frame. The adapter frame allows for the CBFI to be more easily removed from and placed back into the catch basin. A typical catch basin frame and storm grate is manufactured with cast iron which lends itself to rough edges and some imperfections. By placing an adapter frame around the cast iron frame of a catch basin allows the user to negate the imperfections of cast iron manufacturing techniques. An adapter frame that is designed to fit into a catch basin frame, and accept a CBFI will allow for less complications during the maintenance process of a CBFI. For example, FIG. 1 illustrates adapter frame 140, FIG. 4 shows adapter frame 426, FIG. 6 shows adapter frame 606, FIG. 7 illustrates the engagement between the CBFI and adapter frame 710, FIGS. 8A and 8B show different shapes of adapter frames, and FIG. 22 shows a CBFI 2201 installed within a catch basin 2204 without the use of an adapter frame. An adapter frame may or may not be used for the placement of a CBFI into a catch basin or manhole.

The CBFI may suspend from an adapter frame attached to a catch basin frame. The bottom of the CBFI is shaped in such a way that it narrows going downward. This causes the CBFI to not catch on protrusions as it is pulled out or inserted into the catch basin.

An exemplary CBFI adapter frame can be affixed to the frame of a catch basin. The adapter frame is attached to the catch basin frame so it does not come out when the CBFI is removed for maintenance. FIG. 14C shows, for example, the adapter frame 1436 attached to the frame of a manhole opening to a catch basin 1422. The adapter frame is affixed to a catch basin in a plurality of ways including of a bolt, adhesive, latch, spring, bendable tab, hook, etc. The inner lip of the catch basin should be free of debris prior to the placement of the adapter frame to ensure proper fit. For example, FIG. 8C, as described above, includes an adapter frame lifting point and fastener 842 for affixing the adapter frame 836 to a manhole frame 834.

In another embodiment, an adapter frame is modular and adjustable. The adapter frame can be adjusted in the X, Y, and Z axis to ensure proper fit between the catch basin frame and the CBFI. Additionally, modular items can be attached to the CBFI adapter frame for the purpose of filling large holes, spacing, fitting, etc.

In yet another embodiment, an adapter frame may be angled or contoured. For example, the inner edge of the adapter frame that faces the opening may be sloped downward to allow for water and debris to fall into the catch basin. The CBFI frame may have a corresponding angle that is opposite to the adapter frame which allows the CBFI and adapter frame to sit flush with one another. An inwardly facing angle of the adapter frame will also allow the CBFI to fit well when placed back in catch basin.

Advantageously, the adapter frame and CBFI can be marketed by offering it from among a set of adapter frame and CBFIs that are preconfigured for known storm drain and catch basin dimensions or as a standard adapter frame and CBFI that can be modified to fit the dimensions of a particular storm drain and catch basin. Examples of the different dimensions and shapes are illustrated in FIGS. 8A and 8B, e.g., circular and rectangular, respectively.

Locking Mechanism

A hinged storm grate in accordance with one or more aspects of the disclosure may incorporate at least one locking mechanism. FIG. 2, for example, shows locking mechanism 214. The locking mechanism can be released and engaged through a plurality of methods including a key, magnet, lever, or any other suitable mechanism. Alternatively, the lock may be released and engaged by gravity. For example, the hinged storm grate may be locked while sitting in the catch basin. When the CBFI is tipped past a certain angle (e.g., past 90 degrees), then the gravity lock releases its hold on the hinged storm grate allowing the grate to open. The lifting points of the CBFI may engage at least one mechanism that unlocks the hinged storm grate. In some examples, it may be preferred that the locking mechanism is not easily disengaged, except by trained operators or professionals, in order to prevent theft. In other examples, the locking mechanism may be disengaged by engaging the lifting arms.

Trash Capture and Storage System

The CBFI in accordance with aspects of the disclosure can hold captured pollutants, which can be from a gutter and/or a catch basin system.

In accordance with one embodiment, a CBFI can incorporate an opening on top of the hood to allow for trash or debris to be deposited into the filter insert. For example, there may be a separate storage bin for trash that is deposited through a hole in the top of the hood of the catchment basin. The hood generally is above the level of the storm grate and the top of the hood is flush with the level of a sidewalk. A hole in the top of the hood, and nearly flush with the sidewalk, could allow for pollutants to be deposited into this hole where they are directed towards a trash container under the hood and incorporated to or separate from the CBFI. The contents of the sidewalk debris could be reasonably separated from the contents of the captured stormwater pollution. The contents of the sidewalk trash could be deposited at the same manner and time as the CBFI. Alternatively, a trash-can-like device can be placed over the hole in the catch basin hood to funnel debris into the subterranean trash bin.

FIG. 3 illustrates pollutant capture media 308 at two different side-view levels of the CBFI 301. As stormwater passes through the CBFI, the pollutant capture media 308 are configured to capture pollutants from water as the water flows over or through the pollutant capture media. The pollutant capture media is situated in such a way to maximize the surface area exposed to polluted water. The pollutant capture media 308 may be attached to the frame of the CBFI 301 via fasteners 310.

Moreover, a CBFI can also include a mechanism to help prevent stormwater from agitating previously captured pollution in the CBFI. For example, the CBFI may include at least one energy dissipater, buoyant platform, or flow restrictor to allow for existing or new pollutants to remain trapped in the CBFI and allowing stormwater to flow through or out of the device. For example, FIG. 4 shows the buoyancy device 434 and energy dissipater 430 on each side of the CB filter 401 to allow the captured pollution to remain inside the filter basket of the CB filter.

An exemplary CBFI may incorporate a device that is sized to capture the pollutants associated with the first flush of storm event. After the first flush volume has been achieved, the remaining stormwater may be directed around the filtration system. Moreover, an exemplary CBFI can include at least one rotating mechanism to capture pollution, move fluid, capture energy from moving fluid, or to operate certain functions of the CBFI system.

In a further embodiment of the disclosure, a CBFI can be used in a combined stormwater and sewer system. For example, in cities where the storm sewer and sanitary sewer are combined, a CBFI can be used to filter both stormwater and the sewage. This could save treatment plants a lot of money by filtering larger pollutants from the water prior to treatment. Furthermore, combined sewer systems generally dump straight into a river, lake or ocean when inundated with water. The CBFI can help alleviate pollutants discharged to these water systems when placed in strategic locations (e.g., the outlet pipe) and maintained regularly.

Deflector and Water Diversion System

As described above, an exemplary CBFI includes at least one deflector. The deflector may be used for a plurality of purposes including, for instance, deflecting pollutants, deflecting stormwater, and deflecting material in a certain direction. For example, FIG. 4 shows a combination drop inlet where the hood opening (i.e. throat or curb inlet) 444 of a catch basin typically is the largest opening between the gutter and the catch basin which allows for pollutants larger than the holes in a storm grate to pass through. The hood opening is typically recessed under the sidewalk and may allow pollutants and stormwater to bypass the CBFI. A deflector attached to the underside of the hood, or on to the CBFI would divert pollutants and water into the CBFI where it could be cleaned. The deflector can be rigid or flexible including material including metal, rubber, plastic, concrete or other material. Examples of the deflector are shown in at least FIGS. 4, 9, 13, 14B, 14C, 19, and 23C.

In some examples, the deflector can be retractable. A retractable deflector can be advantageous by capturing more pollutants. It can be retracted through the lifting motion when the CBFI is pulled out of the catch basin. Alternatively, the deflector can be permanently attached to the wall of the catch basin and not retractable in certain circumstances.

Figure 18:
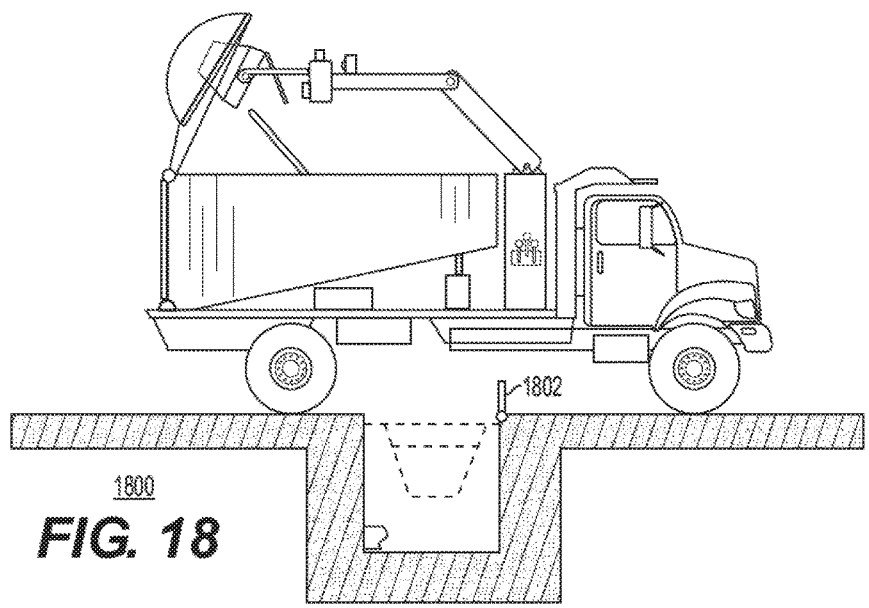
FIGS. 18 and 19 illustrate examples of vehicles emptying removable catch basin filter inserts in accordance with one or more aspects of the disclosure.

In another embodiment, a CBFI may include a mechanism to prevent debris from entering the catch basin while the CBFI is removed from the catch basin during servicing. For example, FIG. 18 shows a debris shield 1802 mechanism that resembles a net or shield that pops up or extends as the CBFI is pulled out of the catch basin. The debris shield can remain attached to the catch basin or frame as the CBFI is pulled out of the catch basin. The debris shield would hold back debris, rocks and pollution from entering the catch basin while the CBFI is out of the catch basin and being serviced. This debris shield would also prevent debris from filling in the catch basin platform lip where the CBFI rests while in the catch basin. Excess debris on the catch basin platform frame may cause the CBFI to not sit flush. The debris shield can be hinged and moved by springs, counter weights, gravity, and magnetics. The debris shield can retract when the CBFI is placed back into the catch basin.

In yet another example, the deflector may be attached to the CBFI. Alternatively, it can be permanently attached to the housing of the catch basin frame or hood. The deflector may contain a magnetic element and filtration component. The magnetic element may serve as an attachment mechanism for the deflector to attach to the underside of the hood. The deflector may be welded in place. Alternatively, and in an example, the deflector may be affixed to the underside of the hood using bolts. The bolts are usually present under newer style catch basin hoods.

In another embodiment, a CBFI includes a mechanism to prevent sediment agitation. For example, sediment in stormwater includes of gravel, sand, silt and clay. A mechanism to prevent sediment agitation may include of a floating barrier, baffles, water break, bristle comb, etc. The floating barrier may be a floating wall that protects the captured sediment below from being pummeled or resuspended by water from above or the floating barrier may include of floating balls that break the impact of the water. An exemplary floating ball to prevent sediment agitation may include a hydrocarbon and toxin capture media. Alternatively, and in another exemplary embodiment, the mechanism to prevent sediment agitation can be affixed to the CBFI by at least one hinge as shown in FIG. 4.

An exemplary CBFI includes a water diversion system. The water diversion can be used to move water and pollutants from one location to another. For example, in instances where a curb inlet catch basin is located under a sidewalk and is accessed by a manhole rather than a storm grate it may be necessary to use a tray, funnel or channel to move the water from the water inlet to the CBFI as shown in FIGS. 14B and 14C. The water diversion system can be held in position by one or more supports that rest against, or are affixed to at least one surface of the catch basin, catch basin filter insert, or catch basin appurtenances. The water diversion system can include an active or passive overflow device to cause high volumes of water to be diverted away from the CBFI. The water diversion system can be in the form of a channel 1412 made of sheet metal or plastic with low walls which contain the flow of water in the channel during the first flush and allow greater flow rates to spill over the channel walls 1424 as the water flows into the curb inlet 1426. The water diversion channel can have small holes in it that causes water to fall through but prevent debris of a certain size from falling through. For example, a channel with a plurality of holes with a diameter of 2 mm would allow water to fall through the channel but pollutants such as cigarette butts and large sand particles would be retained on the water diversion system and moved towards the CBFI. The water diversion system channel would be sloped downward towards the CBFI so the water and pollutants would move in the direction of the CBFI. The main filtration system of the CBFI is below where the water diversion system enters the CBFI. This configuration allows for the water diverted from the curb inlet to be filtered. The holes in the water diversion system can be contoured to more effectively move water and pollutants towards the CBFI. For example, the holes can be in the shape of a cheese grater where the holes are partially covered. According to another aspect of the invention, the water diversion system can be advantageously configured to act as a funnel. By directing water downward from the curb inlet opening to the catch basin filter insert, a water diversion system having such a configuration helps maximize the amount of water and pollution that passes through the CBFI In a further example, a CBFI includes an overflow. An example of an overflow is shown as overflow 128 in FIG. 1. The overflow, such as overflow 128, may be designed to handle a certain size weather event. For example, some regulatory bodies may require that overflows be designed to accommodate a 5-year flood event. In this case, the surface area of the overflow would be equal to or greater than surface area needed to drain the water associated with a 5-year flood at a given rate. The total surface area of the holes in the filtration system (e.g., holes in walls and bottom) can be inclusive or exclusive of the overflow total area calculation. In an example, the total surface area of the holes and overflow in the CBFI are equal to or greater than the total surface area of the storm grate and hood opening or the total surface area of the outlet pipe. The overflow height and flow capacity can be a function of the length of the suspenders that hang from a cover or object. The suspenders can be adjusted to change the dimension of the overflow or alternatively they can be rigid.

In another example, the CBFI can include at least one funnel. A funnel-like device can be affixed to any part of the CBFI or flange to divert water into or away from the filtration system. In an example, the water would be diverted towards the filtration system but water may need to be diverted away from the filtration system in instances such as high flow. An exemplary funnel can be rigid or flexible.

Sediment Filtration System

A CBFI according to an embodiment of the disclosure includes a sediment trap. The sediment trap can be drained by gravity allowing sediment of a pre-determined size to remain in the CBFI and allow water to flow out of the sediment trap. The walls of the lower portion of the CBFI can be nonporous or porous for trapping the sediment. The height of the nonporous walls may be determined by the amount of sediment load estimated to reach the catch basin through calculations of the drainage basin area. In an example, the sediment trap portion of the CBFI would not allow large sediment out of the CBFI. It may be understood that certain heavy metals have a propensity to attach themselves to sediment. By capturing sediment from stormwater, the amount of metals (e.g., heavy metals) introduced to bodies of water, such as rivers and streams, can be reduced. Examples of the sediment trap are shown in various drawings, for example, in FIG. 1, a trap door 134 and trap door frame 132 are illustrated.

The CB insert with sediment trap embodiment can be placed in a catch basin downstream of new building construction activities. New construction typically creates large sediment loads that enter the storm sewer system and clog pipes with sediment as well as pollute nearby receiving streams. A CBFI can be specifically designed to capture target pollutants from new construction sites by adjusting the filtration size holes.

An exemplary sediment trap within a CBFI includes at least one hinge (e.g., trap door hinge 130 as illustrated in FIG. 1). For example, the bottom of the CBFI can be the filtration system for the sediment trap. It can be porous, mesh, fabric, or screen. The sediment filtration system can be affixed to a rigid frame that rotates around at least one hinge when the CBFI is tipped. The rotation of the sediment filtration system around the at least one hinge causes the sediment to fall out of the CBFI. The frame of the sediment filtration system may hit a stopping point causing it to jar slightly when the CBFI is rotated or inverted. This jarring effect can knock the sediment off of the sediment filtration system frame. In an alternate embodiment of a sediment filtration system, the frame of the sediment filtration system may not be permanently attached to the body of the CBFI. The sediment filtration system may move freely up and down within a frame in a sliding motion. Another exemplary sediment filtration system does not move or rotate on the CBFI but can still allow water to flow while capturing sediment.

Figure 16:
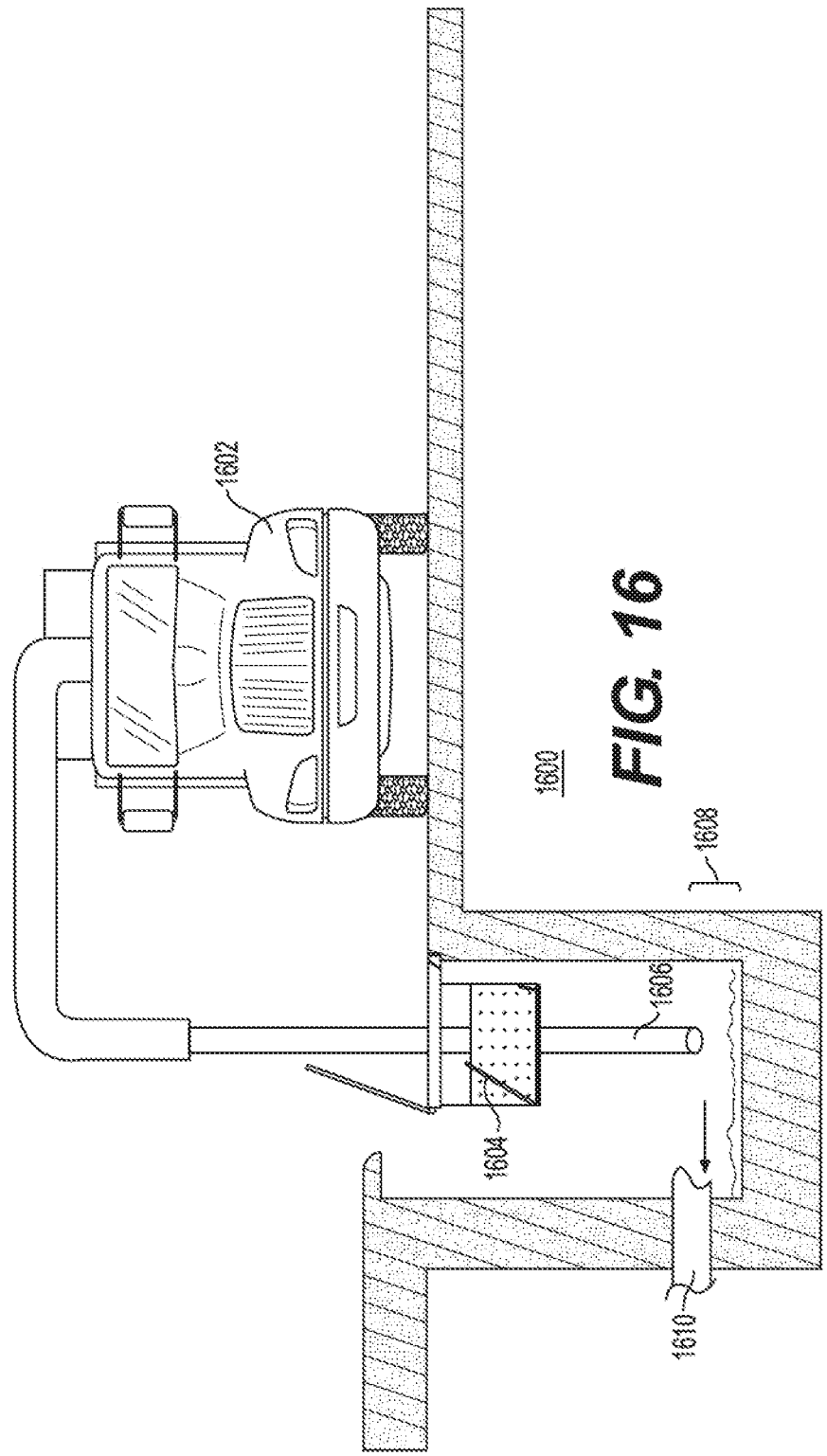
FIG. 16 illustrates a vehicle vacuuming a sump from a catch basin through a removable catch basin filter insert in accordance with one or more aspects of the disclosure.

An exemplary sediment trap is shaped to accommodate the insertion of a vacuum truck hose for cleaning out the CBFI. For example, in some instances it may not be possible or necessary to remove the CBFI from the catch basin for maintenance. In these instances, the hinged storm grate of the CBFI can be opened and a vacuum truck can insert the vacuum hose into the CBFI to clean out the trapped sediment and pollutants. For example, FIG. 16 shows a truck 1602 with hose 1606 extending down to the bottom of the catch basin through an open trap door 1604 that opens upward in order to vacuum sump 1608. The trap door may also open outward by disengaging a latch system that holds the trap door frame. A CBFI with a bottom surface and sediment trap that is contoured and shaped to accept the vacuum hose will facilitate the cleaning of the CBFI. In an example, the hinged sediment trap can be opened wide enough to allow a vacuum hose to be inserted through the sediment trap door so the vacuum hose can access a sediment or debris that is located below the CBFI in the sump of the catch basin. In this instance, the sediment trap door can include a lifting point so a maintenance person can use a hooked rod (or similar mechanism) to open the sediment trap door while the CBFI is still located within the catch basin. The sediment trap door can be held in an open or closed position with the use of at least one magnet, hook, fastener, or attachment mechanism.

An exemplary lifting point incorporated to a sediment trap door (e.g., lifting point 316 shown in FIG. 3) may disengage the hinge stop or opening restrictor. For example, there may be instances where the user will open the sediment trap door in order to vacuum the sump of the catch basin. Alternatively, this same user may include the removal and tipping method of cleaning the CBFI. The sediment trap door is designed to accommodate both cleaning methods by allowing the sediment trap door to open fully if cleaning from above with a vacuum truck and having a restricted opening if tipped. By causing the sediment trap door to have a restricted opening when being tipped prevents the sediment trap door from sticking open when it is placed back into the catch basin.

An exemplary sediment trap incorporates at least one movable flap or door. The door or flap can be affixed to the CB filter by means of at least one flexible element or hinge. In an example, the door or flap opens inward towards the center of the CBFI so sediment is released when the CBFI is in its inverted position. Alternatively, another embodiment includes of a door or flap that opens outward from the bottom or side of the CBFI. This would allow for the sediment trap of the CBFI to release its contents in the upright position which may be preferable in certain circumstances. A sediment trap door that opens outward would in an example have a latch or locking mechanism that allows the sediment trap door to remain closed when in its operating position. A sediment trap door that can open inwardly and outwardly would be advantageous to the user thereby allowing for multiple methods of maintenance.

In one example, the sediment trap door may open to the inside or the outside of the CBFI. Allowing the sediment trap door to open both ways would allow for multiple means of evacuating the contents of a CBFI. A sediment trap door that opens toward the inside of the CBFI is conducive to an evacuation method where the CBFI is tipped upside down. A sediment trap door that opens toward the outside of the CBFI is conducive to an evacuation method where the CBFI is held upright and the contents are evacuated from the bottom of the CBFI. The sediment trap door can be held in place by a frame and latch system. The frame and sediment trap door can share the same hinge system or be separated. The frame and sediment trap door can be rotated open around the same axis point or from different axis points. The sediment trap door can be opened manually or automatically.

A sediment trap door that opens outward may have a latch or locking mechanism that allows the sediment trap door to remain closed when in its operating position. The latch or locking mechanisms are shown, for example, by latch 136 and latch point 138 in FIG. 1.

An exemplary sediment trap may include at least one hinge that has a hinge stop. This hinge stop allows the sediment trap to only open a certain distance or angle. A sediment trap door that has a restricted opening has the advantage of not allowing the sediment door to be stuck open. It would also cause the sediment door to jar against the hinge stop when inverted. Additionally, a sediment door that opens can break a vacuum seal caused by caked in sediment. The hinge break can be an integral part of the hinge (e.g., attached and rotates with the hinge) or it can be a stop affixed to the door or wall that restricts the opening of the door. An exemplary hinge stop can be engaged, disengaged, and adjusted so the user can alter the effects of the hinge stop to align with the user's maintenance needs.

An exemplary sediment trap within a CBFI can move when the CBFI is rotated. A CBFI can have at least one designated strike point where a blunt instrument can strike the CBFI to dislodge its contents. Moreover, an exemplary CBFI will drain water between storm events thereby preventing mosquitos from laying eggs in standing water. Additionally, an exemplary CBFI with sediment filtration system can include a secondary insert within the CBFI to accommodate larger loads of sediment. For example, a secondary flexible or rigid insert can be installed in the CBFI that covers some or all of the holes in the CBFI. In doing so, this secondary insert would allow the CBFI to have a greater holding capacity to accommodate sediment load deposited from stormwater because a temporary new construction project may be happening up stream of the particular catch basin with filter insert. Furthermore, similar to the frame of the CBFI, the sediment filtration system can be flexible or rigid.

An exemplary CBFI includes one or more drainage holes that may be in a variety of shapes, designs, and layouts. The holes can be in plurality of patterns and shapes, such as circles, rectangles, polygons, etc. In an example, the holes are small enough to not allow a cigarette butt to pass through. Additionally, an exemplary CBFI would include filtration holes that account for sediment bridging and hydrodynamic forces during the filtration process. For example, it may be preferable to design the holes so a certain size of particle has a propensity to bridge across a certain diameter or shape of hole. This would facilitate the filtration process. Furthermore, the filtration holes of the CBFI can take a plurality of shapes that allow water to drop its pollutant load more readily into the CBFI before exiting the filtration system.

In one example of the disclosure, an exemplary CBFI includes a multitude of filtration holes that can be configured in a plurality of configurations. The configurations of the filtration holes can be evenly spaced, graduated spacing, and any other configuration that facilitates the filtration of pollutants from fluid and material.

One or more flexible or rigid additional filtration devices may be attached to the CBFI. For example, if the catch basin is immediately downstream of a construction site, then an additional bag filter (i.e. filter net) for fine sediment can be attached to the inside or outside of the CBFI to catch fine sediment.

Moreover, an exemplary sediment trap door may include a seal around the opening of the door. This seal may be water tight or nearly water tight. An exemplary sediment trap door seal will prevent sediment from exiting the CBFI.

In accordance with yet another exemplary sediment trap door, it can include a system where the door may be locked or held in place to prevent it from opening or closing in one or more ways until released by the user. This lock can include of a magnet, lever, hinge, rotating arm, spring (e.g., spring latch handle 506 in FIG. 5), lock, slide, linkage system, etc. For example, a normal sediment trap door may open inward but on certain occasion the user may want to open the sediment trap door outward so the contents may be evacuated from the bottom while being held upright. A sediment trap door with a locking mechanism could be disengaged manually or automatically by the user or machine thereby causing the contents to spill out from the bottom. In an example, the sediment trap door can open 180 degrees outward so the CBFI can be placed on a flat surface while the sediment trap door is completely open. This would allow a user to use great force on any contents stuck within the CBFI while not damaging the sediment trap door or the associated hinge.

An exemplary sediment trap door includes a drain hole that may be of the non-clogging sort. The drain hole will allow water to drain from the CBFI with a low likelihood of clogging with sediment. In addition, an exemplary sediment filtration system may be parallel to the plane of the hinged storm grate. In an alternative exemplary embodiment, the hinged storm grate and sediment filtration system may not be parallel with one another. For example, where the road or sidewalk is at an angle that requires the cover to be placed at an angle to prevent tripping or otherwise, the CBFI may be have a vertical orientation causing the hinged storm grate to be non-horizontal and the sediment filtration system to be horizontal.

An exemplary sediment filtration system is modular and replaceable. For example, some instances may require fine filtration media and others may require coarse filtration media. By including a method for replaceable filtration elements, one may target a plurality of pollutants. Additionally, an exemplary CBFI includes a permeable bottom. A permeable bottom allows for water to drain out when the water inflow abates. Examples of suitable permeable material for the sediment filtration system include of metallic mesh, perforated steel or plastic, reinforced cloth, polyethylene mesh, polypropylene mesh, plastic, etc.

Pollution Filtration and Abatement System

A CBFI includes at least one filtration media to remove toxins and pollutants from stormwater. A plurality of filtration and pollutant capture medias can be used including but not limited to sand, activated carbon, carbon, nano-carbon tubes, graphene, zeolites, silicas, silicates, aluminas, wood, peat, cellulose fibers, mesh, paper, grates, media filters, perforations, hydrodynamic pollution removal devices, filter strips, biofiltration, magnetic elements, styrene-butadiene-styrene ("SBS"), copolymers, polymers, styrene-isoprene-styrene ("SIS"), or other suitable type of natural or synthetic filtration materials and elements.

An exemplary filtration media in a CBFI would be hydrophobic, so as to, for instance, repel water. Additionally, an exemplary filtration media in a CBFI would be oleophilic, so as to, for instance, attract oils. A preferred oleophilic material is compliant or flexible, hydrophobic and having a melting point lower than that of the oil, petrochemical, and other toxins it absorbs. This would allow for the oleophilic material to be recycled and reused.

An exemplary pollution filtration system would not unduly restrict the flow of water through the CBFI. In an example the filtration media will accommodate the flow volume associated with the first flush during a rain storm. Moreover, an exemplary filtration media incorporated to a CBFI may include of one or more material including but not limited to an ultra-thin graphite sponge, modified polyurethane foam, carbon nanofiber (CNF) aerogels, carbon nanotube (CNT) aerogels, graphene aerogel, and chemical vapor deposition (CVD)-graphene/CNT hybrid foams.

For example, toxin filtration and capture media incorporated to a CBFI can be attached or free standing within the CBFI. By way of example, sheets of toxin filtration media can be temporarily affixed to the body or frame of the CBFI through the use of one or more fasteners. The fasteners can be of the magnetic sort. Alternatively, toxin filtration media can be free standing within the CBFI where the toxin filtration media moves around the CBFI collecting toxins from stormwater. For instance, the toxin filtration media can take the shape of a spheroid of any dimension where at least the outer layer is at least one filtration media that collects toxins from stormwater or other fluid. The inner layers or material of the filter sphere can include at least one magnetic element and buoyancy device so the toxin capturing filtration media spheres can be magnetically reclaimed as well as target toxins at a horizon in the fluid through the use of the buoyancy embodiment. Free standing filtration media within the CBFI can be removed during the process of evacuating the contents of the CBFI. More free standing filtration media can be added to the CBFI during the process of replacing it back into the catch basin Exemplary filtration media would have at least one magnetic element, and further, may be replaceable, rechargeable, and/or recyclable. For example, one can attach sheets or units of filtration media to the CBFI and replace them at regular intervals. Certain filtration media may become saturated faster in dirtier environments requiring more frequent replacement. These units of filtration media may be recharged in a plurality of methods. Furthermore, the filtration media can be recycled or upcycled into other products. Alternatively, the filtration media can be replaceable and disposable. Additionally, an exemplary CBFI includes multistage filtration media and filters.

An exemplary CBFI includes a sucrose derived toxin capture media. This sucrose derived toxin capture media can be in any form including powder, granules, liquid, textile, or sheet form. The sucrose derived toxin capture media can be replaced in the CBFI on a periodic basis. The sucrose derived toxin capture media can be an ultra-thin graphite sponge. A sucrose derived toxin capture media includes, for example, at least one magnet element for magnetic reclamation from the environment. An exemplary sucrose derived toxin capture media is porous and may include at least one buoyancy device. A buoyancy device can allow the sucrose derived toxin capture media to float, sink or remain neutrally buoyant in an environment. An exemplary sucrose derived toxin capture media includes at least one buoyancy device and at least one magnetic element. This sucrose derived filtration media can be attached to or free of attachment within the CBFI.

An exemplary CBFI includes a device to measure toxin and pollutant levels in water. The ability to measure toxins in stormwater would be advantageous for the public to determine toxin levels (e.g., hydrocarbons, heavy metals, herbicides, pesticides, insecticides, etc.) in the water and help identify illegal discharges that may be upstream of the CBFI. One or more toxin and pollutant meters in a CBFI can also help determine the status of water quality in certain areas. An exemplary toxin level measurement device can be an electronic device. Alternatively, the toxin level measurement device is not electronic and can be checked manually or visually.

Moreover, an exemplary CBFI includes a system to replace, alternate or install one or more filtration media(s). The filtration media(s) may be attached to the CBFI by way of permanent, temporary or magnetic attachment. The filtration media can be placed within a space that rests inside the CBFI or attaches to the outside of the CBFI. For example, the CBFI may have more than one permeable surface that polluted water must pass through to exit. One permeable wall can have a coarse filtration element that leads to a finer filtration element. The coarse filtration element can filter large particles out like trash and sediment. The fine filtration element can filter out finer particles such as hydrocarbons, metals, fertilizers and other pollutants.

An exemplary CBFI can incorporate embodiments to mitigate or reduce contaminants, such as bacteria, herbicide, pesticide, and nutrient loads. For example, the CBFI may include antibacterial material to lessen the amount of bacteria in stormwater flow. Additionally, the CBFI may control the pH of stormwater.

An exemplary CBFI may include a device to hold and dose material that treats or alters stormwater quality. For example, the CBFI can include a device that doses a liquid and/or solid treatment to stormwater based upon the volume and flow of stormwater that passes through the CBFI. Alternatively, the CBFI may hold or distribute material that dissolves in water or electrically treats water to alter stormwater quality.

An exemplary filtration media can capture elements including trash, chemicals, fertilizers, herbicides, pesticides, hydrocarbons, nicotine, silt, salt, sediment, solids, floatables, debris, heavy metals, toxins, nutrients (phosphorus & nitrogen), unnatural and natural pollution from the environment. The filtration media may include an adsorbent or absorbent element and may be easily accessed and removable for maintenance. The filtration media elements may be reused, recycled, recharged, and replaced, and may also be designed to handle low flow and high flow environmental situations.

An exemplary CBFI includes an overflow to allow for large amount of water to bypass the filtration system. Moreover, the filtration media may be one or more self-contained filters or there may be canisters that are dumped when they are full of pollution and recharged with more filter media. The filtration media can be placed into the CBFI through a storm grate while it is closed or the filtration media can be placed into the CBFI through the hinged storm grate while it is open.

The filtration system may also be configured to adjust pH, nutrient level, electric conductivity, and bacteria. An exemplary CBFI includes plant and/or animal species to clean pollutants from the system. Additionally, an exemplary CBFI can sample fluid. For example, the CBFI may be configured to gather and take water samples from stormwater. The CBFI can capture the stormwater for sampling prior to, during, or after it has been filtered by the filtration system in a container located on the inside or outside of the CBFI. The CBFI can capture the water sample in one or more containers located below the storm grate so they are protected from the public. The CB filter captures, for instance, only water and no relatively large pollutants in the water sample container.

Furthermore, the CBFI can include a sampling port to access a sampling location below the hinged storm grate. For example, the hinged storm grate may have at least a 2-inch diameter hole at a location that allows for a water sampler to insert a dipper into the hole and retrieve a water sample below the hinged storm grate.

Magnetic Element Capture System

An exemplary CBFI includes at least one magnetic element. The at least one magnetic element includes a plurality of functions including but not limited to: lock, latch, lift, hold, capture, retain, convert, repel, rotate, and move. For example, the magnetic element can be incorporated to the CBFI for various functionalities, such as magnetically locking a component into place, latching a component, lifting a component, holding a component, capturing magnetic pollution, retaining something like magnetic pollution, converting energy, repelling a component, rotating a component, or moving a magnetic object. One example of a magnetic element is shown in FIG. 4, e.g., magnetic element 436 with nonmagnetic cover 438, and another example of a magnetic element is illustrated in FIG. 5, e.g., magnetic element 502 attached to the frame by fastener 504.

The at least one magnetic element can be covered, or partially covered by a nonmagnetic element. For example, the magnetic element designated to capture magnetic material from stormwater or other fluids may be covered by a nonmagnetic material, such as aluminum, plastic, rubber, filtration media, etc. The nonmagnetic material may be flexible or rigid and move when the CBFI is moved or rotated around an axis. When the non-magnetic cover is separated from the magnet the magnetic pollution located on the opposite side of the nonmagnetic cover as the magnet will detract from the magnet. The nonmagnetic element may be weighted to cause it to disengage or separate from the magnet when inverted or tipped causing the attracted magnetic material to fall off An exemplary CBFI includes at least one magnetic element where an external magnetic element can attach and move the CBFI. For example, the CBFI can have a magnetic element at the top of the unit that allows lifting arms with at least one electromagnet (or magnetic element) to attach and move the CBFI. Moreover, an additional exemplary embodiment to a CBFI includes at least one magnetic element. The at least one magnetic element can serve one or more functions including but not limited to: (1) serve as a lifting point for the CBFI to be used in conjunction with at least one magnetic element on the lifting arm, (2) to capture magnetic pollution from stormwater, and (3) serve as a release or holding mechanism for at least one component of the CBFI.

An exemplary CBFI can include a magnetized grate, frame, or body. The magnetic element incorporated to a CBFI may be a permanent magnet, electromagnet, paramagnet, or ferritic magnet with or without a net magnetic moment. Furthermore, an exemplary magnetic element incorporated to a CBFI may alter the chemical composition of one or more pollutants in stormwater.

Lifting Points

As described above, a CBFI in accordance with aspects of the disclosure includes at least one lifting point (e.g., lifting point 116 in FIG. 1). The at least one lifting point allows the CBFI to be removed from the catch basin. In an example, the at least one lifting point is affixed or incorporated to the CBFI to allow the storm grate to move freely about a hinged axis. For example, the lifting points may be arranged on the frame and/or body of the CBFI. There is one or more lifting points on the CBFI that allow a lifting armature device from the garbage truck, knuckle boom, crane, or other suitable equipment, to grab and lift the CBFI.

The at least one lifting point incorporated to a CBFI may include a hook, pin, slot, magnetic element, rotating lifting point, retractable lifting point. An exemplary CBFI lifting point can be attached to a mechanism incorporated to the CBFI. The mechanism can include a lever, pulley, linkage, rod, etc. that moves one or more components incorporated to the CBFI. For example, when the lifting point is engaged it may pull on a lever or linkage that moves a component within the CBFI.

An exemplary CBFI lifting point can be secured to one or more lifting mechanisms for moving the CBFI. For example, the CBFI can be secured to one or more lifting mechanisms by methods using magnets (e.g., magnetic element 1206 in FIG. 12), electromagnets, hydraulics, pneumatics, mechanical, electrical, frictional, and/or manual techniques.

An exemplary CBFI lifting point can be retractable. The lifting point can retract through a plurality of methods including of magnet, lever, mechanical, electrical, and gravity. A lifting point (e.g., lifting point 116 in FIG. 1) can be situated above the grade of hinged storm grate, below the grade of the hinged storm grate, or level with the grade of the hinged storm grate. An exemplary lifting point is below ground level or at ground level in its resting state.

Figure 12:
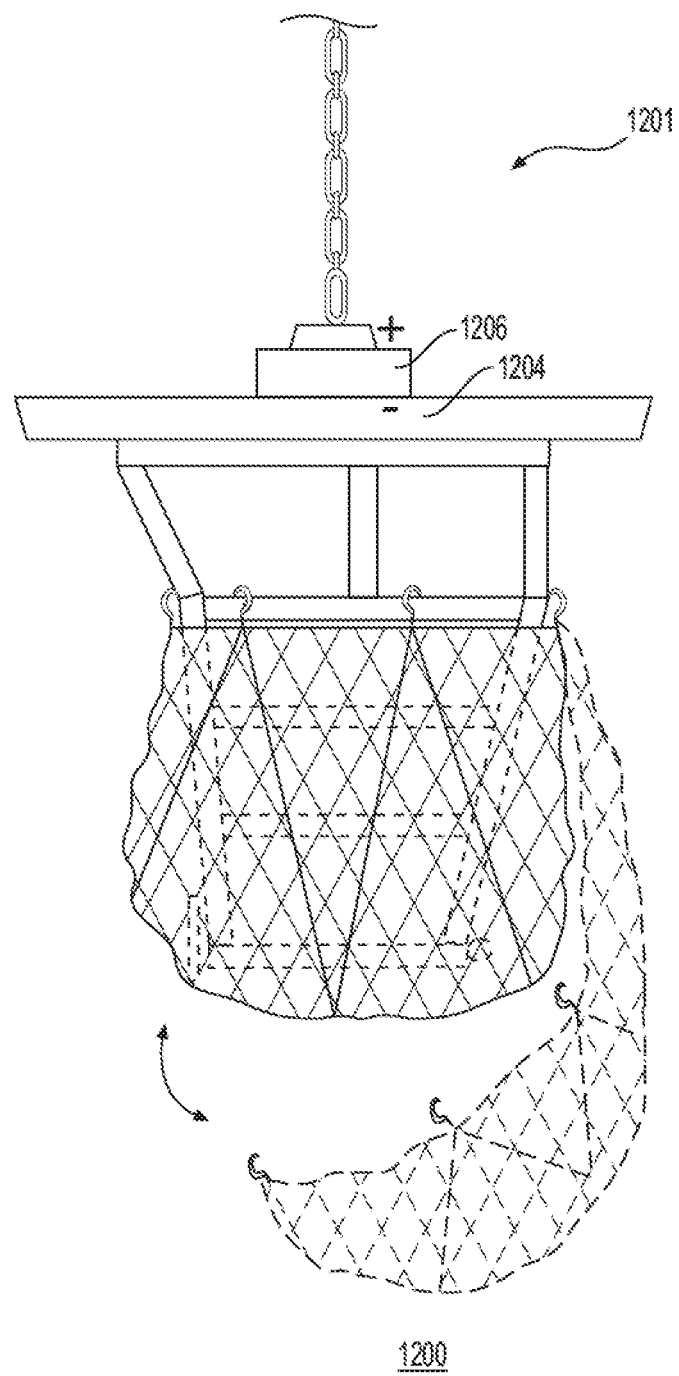
FIG. 12 illustrates a side view of a removable catch basin filter insert with a magnetic lifting point in accordance with one or more aspects of the disclosure.

An exemplary CBFI lifting point is magnetic and the hinged storm grate is non-magnetic. This would allow a lifting apparatus with an electromagnet to attach to the CBFI at the magnetic lifting point without attracting to the hinged storm grate. The CBFI can be pulled out of the catch basin via a magnetic element and the hinged storm grate made of non-magnetic material can move freely to allow the pollution to be evacuated if tipped nearly upside down. FIG. 12, as described above for example, illustrates the lifting of a CBFI using a magnetic element 1206 via magnetic lifting point 1204.

An exemplary CBFI lifting point can be accessed from any direction by the lifting mechanism. For example, the lifting mechanism can approach and lift the CBFI in the X, Y, or Z axis. In most instances, it is envisioned that the lifting arm will approach the CBFI from above and then attach to the lifting points. Once the lifting arms get near the lifting point, the lifting arms can move forward, back, up, down, and/or sideways to engage the at least one lifting point of the CBFI. Furthermore, the lifting arm can expand to engage the lifting point of the CBFI. For example, the lifting point can actually be a slot in the CBFI and the lifting arm can have a pin that inserts into the slot. This lifting arm pin can then move, expand, or release a mechanism that prevents the pin from dislodging while the CBFI is pulled out of the catch basin for maintenance.

In another exemplary embodiment, the CBFI can be moved manually. For example, the hinged storm grate can be opened manually. The operator can reach into the CBFI and grab the handle of at least one filter basket and remove it from the catch basin. In this case, the CB filter basket is not permanently attached to the hinged storm grate or the CBFI frame allowing for manual maintenance as shown in FIG. 11. This application may suit customers that do not have access to equipment with mechanical lifting arms. FIGS. 11, 23A and 23B, for example, show handles for lifting.

An exemplary CBFI lifting point can accommodate a rigid or flexible lifting mechanism. Moreover, an exemplary lifting point may act as a hinge for the lifting mechanism to rotate around. For example, the lifting point may be a cylinder and the curved hook may pick up at the lifting point and the lifting point can rotate around the curved hook. In yet another example, the CB filter includes at least one lifting point situated in line with the center of gravity of a CBFI. If more than one lifting point is used on the CBFI, then the lifting points can be aligned to allow for an even lift over the center of gravity with consideration given to a full or empty CBFI. Alternatively, the lifting points are not aligned with the center of gravity so it will tip.

An exemplary CBFI includes at least one lifting point. The at least one lifting point may be situated near the top, side or bottom of the CBFI. The at least one lifting point on the top allows for the CBFI to be lifted out of the catch basin. The at least one lifting point on the bottom or side may serve as a point for rotating or grabbing the CBFI. For example, a user can attach a lifting hook to a lift point situated at the bottom of the CBFI and lift vertically while the lifting frame is secured and vertically stationary with lifting hooks attached to the lift points on the top of the lifting frame. This would cause the CBFI to rotate around the lift points on top and then dump the contents through the hinged storm grate. This motion is similar to how a person dumps a bucket of water by holding the handle from above and then also grabbing the bottom of the bucket and tipping it over to dump the contents. Moreover, when a CBFI is lifted straight up into the air, a user may want to guide the CBFI in a certain direction. By attaching a hook, rope, or cable to a lifting point near the bottom of the CBFI, the user may more easily guide the movements of the CBFI.

Net and Liner System

An exemplary CBFI may optionally include at least one net or liner. The net may be used as a pollution capture device. It can be used as the filtering media. Nets can hang from the hinged storm grate and contain filtering media. Alternatively, a liner or mesh can be dropped into the CBFI that contain filter media. These nets or liners can then be dumped out during the next servicing of the CBFI. For example, FIG. 9 shows a filter net 905 wrapped around the body of the CBFI 901 and also shows net support 908 fastened to the CBFI with at least one fastener 906. FIG. 9 also shows a water diverter 904 to move water and pollution from the edges of the CBFI to the filter basket. Similarly, FIG. 12 shows a filter net that is attachable to the body of the frame by way of at least one fastener. In addition, FIG. 23A shows a filter net that is situated within the filter basket.

An exemplary net or liner incorporated to CBFI can be disposable, reusable, and/or recyclable, and/or can include at least one magnetic element. In another embodiment, an external liner is attached to the outside of the CBFI. In doing so, the CBFI can capture the larger pollutants from the stormwater and the external liner attached the outside of the CBFI can capture the overflow pollutants or pollutants small enough to escape the CBFI filtration system. The CBFI liner can have varying degrees of porosity and can be made from a plurality of material including carbon, metal, fabric, mesh, cotton, poly blend, and natural and/or synthetic materials. An exemplary CBFI liner may attach to the CBFI by a plurality of means including of a temporary fastener, permanent fastener, hook, magnet, etc. The filtration liner can be disposable, replaceable, and recyclable. The liner may include at least one lifting point. The liner can be flexible or rigid but in an example flexible. The liner may be porous and filter pollutants from a fluid.

An exemplary CBFI liner may have means for filtering toxins and pollutants from a fluid. Moreover, an exemplary CBFI with sediment filtration system can include a liner. An exemplary CBFI liner (hereinafter referred to as "the liner") is flexible and porous. The liner fits within the CBFI and allows water to flow through the liner and the CBFI serves as an outer wall for the liner. The liner can be used in applications that require finer filtration measures than what the CBFI normally targets. For example, a supplementary liner can be installed in the CBFI that covers all or some of the filtration holes or screen. In doing so, the liner would allow the CBFI to have a greater holding capacity to accommodate sediment load deposited from stormwater because of activities associated with construction projects located upstream of the CBFI. An exemplary liner includes of a porous filter bag, fabric, screen, fabric mesh, metal mesh or any other natural and/or synthetic material. The liner can be affixed on the inside or outside of the CBFI but in an example inside. In an example, the liner conforms to the inside of the CBFI to allow for more efficient filtration of pollutants. An exemplary liner insert has at least one lifting point so it may be lifted manually or through mechanical means. The lifting point can be attached to a sling that wraps around the liner which provides greater integrity to the system and prevents the liner from ripping. The at least one lifting point is positioned on the top, side or bottom of the liner. A lifting point at the top of the liner will help the process of pulling the liner out of the CBFI. A lifting point on the bottom of the liner will allow a point to pull the liner upside down or inside out. The liner may also be dropped out the bottom or side of the CBFI through the trap door. Another exemplary embodiment for a CBFI supplementary liner is at least one attachment mechanism to attach or hang the supplementary liner to the CBFI. The attachment mechanism allows the liner to permanently or temporarily be attached to the CBFI. The liner can be attached to the CBFI with at least two fasteners. At least one of the fasteners can have a quick release which would allow a user to easily disengage the fastener and cause the liner to open thereby evacuating the contents of the liner.

Furthermore, another exemplary embodiment to the CBFI liner is a frame. The frame can be flexible, rigid, or semi-rigid. The dimensions of the external liner will be such that it can be removed from the catch basin even with a full capacity.

To operate the liner, one can open the hinged storm grate of the CBFI. One or more lifting hooks are attached to one or more lifting points on the liner. The liner can be removed through manual or mechanical means. For example, two chain hooks can attach to two liner lifting points. The CBFI can stay positioned in the catch basin while the liner is pulled from the CBFI. The liner is lifted into the air and positioned above a trash receptacle. There may be a hopper opening to allow the bottom of the liner to open and dump the contents from below. Alternatively, one can attach a hook, or use a hand, to pull on the lifting point situated at the bottom of the liner to invert the liner for the purpose of dumping the contents. Once evacuated, the liner can be placed back into the CBFI for future filtration. The attachment mechanism of the liner can be affixed to the designated attachment point on the CBFI.

An exemplary CBFI that includes a net can be dumped from the bottom or inverted. The net may hang from the frame of the CBFI and have a closure or fastener to not allow large sized items to pass through. The closure can be opened while being maintained to allow material to pass through. The closure can include of a rope, magnet, flap, etc.

In another exemplary embodiment, a liner can hang below a storm grate to capture pollutants from stormwater. The storm grate may or may not have a hinge. The net can be attached to an existing storm grate and the whole unit can be lifted out of the catch basin with a lifting hook or magnet for dumping. The liner can be taken off of the storm grate to be dumped or the liner can have a re-sealable opening at the bottom that can be opened to allow the captured contents evacuated from the net. The liner may have a flexible or rigid frame.

The net can be attached to a storm grate that does not include a hinge. It may be advantageous to provide a net that can attach to an existing storm grate that does not include a hinge. The storm grate with net can still be lifted from the catch basin by means of one or more lifting hooks. The net can be dumped from above or below. Or the net can be replaceable. The net and storm grate can be placed back in the catch basin to filter debris from stormwater. It would be in an example that the net and non-hinged storm grate be used in conjunction with a water diversion system to filter the most amounts of pollutants from stormwater.

Hydrodynamic Control System

An exemplary CBFI may capture pollution from stormwater using a plurality of methods, such as filters, screens, gravity separation, centrifugal separation, diverters, dams, baffles, siphon, density separation, etc. In one example, the CBFI includes at least one flap, valve, or doorway that opens at least one-way. The flap, valve, or doorway can serve the purpose of allowing material to move one-way within or through the CBFI.

In accordance with another example of the disclosure, a CBFI includes one or more devices to prevent floatables and neutrally buoyant pollutants from exiting the filtration system of the CBFI. For example, as water and pollutants enter the CBFI the water swirls around inside the basket-like device and deposits its pollutant load before exiting through the porous filtration media or through the overflow at the top of the CBFI. In an example, there is at least one device to prevent the floatable or neutrally buoyant pollutants from resuspending or exiting the CBFI through the overflow at the top or other designated CBFI openings. An exemplary method of retaining these pollutants can be at least one energy dissipater (also known as a water diversion in the previous provisional patent application) that hold pollutants within the CBFI. The openings of the energy dissipater are designed to be cleaned from water from above and not allow pollutants to clog the holes. The energy dissipater holes, openings, or slots may resemble a cheese grater where the holes partially protrude from the plane of the screen. The hood of the opening can extend partially or wholly over the top of the opening where the "slicing side" of the hood faces downward as to prevent pollutants from entering the hooded opening from above. The openings allow water from below to flow upwards but retain pollutants the size of cigarette butt or larger within the CBFI.

An exemplary energy dissipater can include at least one hinge so when tipped upside down the energy dissipater allows pollutants contained within the CBFI below the energy dissipater to be evacuated. Besides including at least one hinge, an exemplary energy dissipater can include a toxin capture media as well as at least one buoyancy device to cause the energy dissipater to float, sink, or remain neutrally buoyant in a fluid. The toxin capture media can partially or wholly cover or embody the energy dissipater. The at least one buoyancy device can be a separate component placed at a plurality of locations on the energy dissipater or the energy dissipater can be made of a material that includes a material best suited for the CBFI buoyancy and filtering requirements. The energy dissipater can be made of a plurality of material including of metal, plastic, natural and/or synthetic material. An exemplary energy dissipater for preventing pollutant loss from the CBFI causes the water to swirl and retain the pollutants within the filter. For example, the impact of water from above may disturb the already captured sediment and the energy dissipater would help prevent the captured pollutants from being re-suspended in the water by dissipating the kinetic energy of the water. The diverter bristle brush of street sweeper may work as an exemplary method to retain pollutants within the CBFI. The bristle brush is a comb-like device with many long bristles that overlap each other and are connected at one end. The bristle brush is about one half inch wide and can be as long and deep as needed for application to a CBFI. In an example, the bristle brush would be as long as a CBFI and half as deep. That way, if a bristle brush is placed on opposing sides of the CBFI, then the open ends of the brush would meet in the middle. The bristle brush can be attached to the side of the CBFI by a flexible or rigid attachment or can be attached by hinge. A hinge would be preferred so the bristle brush can rotate and allow the contents of the CBFI to slide by the bristle brush and be evacuated.

An exemplary CBFI includes at least one hydrodynamic separator for separating pollutants from stormwater. For example, the hydrodynamic separator can separate pollutants from stormwater by creating a vortex that uses centrifugal force to separate pollutants from water. The inflow of water into the CBFI can be from the top, side, or bottom of the filter insert. In an example the captured pollution from the hydrodynamic separation device can be evacuated from the CBFI in much the same way as if the CBFI did not include the hydrodynamic separation device. The hydrodynamic separation device may be a removable or permanent fixture within the catch basin.

An exemplary CBFI includes at least one buoyancy device. The buoyancy device can take a plurality of forms and include a plurality of materials including foam, rubber, plastic, polymer, metal, latex, gas-filled bladder(s), etc. The buoyancy device can be used to retain filter media, control the turbulence of water, control the buoyancy of a device in a fluid, magnetically reclaim pollution, act as a stopper in a valve-like device, and cause a lever to move (e.g., like a toilet bowl reservoir valve).

An exemplary CBFI includes an overflow for high fluid flow (e.g., storm) events. The overflow is located at a location to cause the least amount of trapped pollutants to escape the CBFI (e.g., the top of the device). During high intensity stormwater events, an exemplary CBFI can divert overflow water so the captured pollution within the CBFI is minimally disturbed. For example, one or more baffles within the CBFI can become engaged by a buoyancy device, or smart device, and redirect water within the CBFI. Moreover, a CBFI has a designed discharge rate out of the filter system greater than the average expected stormwater inflow rate into a particular catch basin or the flow rate of the outflow pipe. In most instances, the flow of the water out of the filtration system of the CBFI is great enough to prevent the captured pollution from escaping out of the overflow. The hydraulic control can also be a baffle or hood system that lessens the kinetic energy of the water entering from above so as to not greatly disturb the debris and sediment that the CBFI has already captured. The force of the water entering from above can be minimized by making it hit a plate or energy dissipation device. An exemplary CBFI includes a water energy dissipation device.

If multiple baskets are incorporated to the CBFI, the overflow may be designed to allow water to flow from one basket to the other. For example, a CBFI can include more than one basket or chamber whereby the water from one basket may overflow laterally into another. This overflow action can act as a multi-stage filtration system within the CBFI.

An exemplary CBFI can include at least one baffle and divider to control water flow. The at least one baffle can extend fully or partially from one wall of the CBFI to another wall to mitigate turbulent flow, direct water flow, and capture pollution from stormwater. The baffle (e.g., wall) can be porous or nonporous. The baffle can also have notches cut in it to allow some water to flow across the baffle system. The one or more baffles performs a plurality of functions including of stopping wave action, causing sediment deposition, decreasing/increasing turbulence, and controlling fluid flow. Furthermore, the one or more baffles can include at least one hinge to allow it to move.

An exemplary CBFI can be sized to capture the pollutants in the first flush of a storm event. The CBFI can also allow the stormwater after the first flush to flow through, over or around the CBFI. The first flush is the initial surface runoff of a rainstorm. The water pollution associated with the first flush is generally more concentrated compared to the remainder of the storm. An exemplary CBFI captures pollutants from the first flush of a rainstorm and can allow the remainder of the stormwater to overflow into the storm sewer system.

An exemplary CBFI includes a mechanism to divert stormwater away from the filtration system when the total amount of stormwater exceeds the calculated first flush volume. One skilled in the art of watershed management can calculate a typical volume that constitutes the first flush of water during a given storm event and drainage area. The CBFI may have a container that gradually fills as the first flush is allowed to flow through the CB filter system. This container acts as a counterweight {hereinafter referred to as the first flush counterweight (FFCW)} to a lever mechanism. The FFCW fills with first flush water at a calculated rate so it will be at a given capacity (e.g., given weight of water) at nearly the same time as the total first flush volume of stormwater from the drainage area has passed through the CBFI. When the FFCW reaches a designated fullness, the weight of the water in the FFCW causes the FFCW to be pulled down thereby causing a lever to move that is attached to the FFCW. This lever can open or close a device. In an example the lever constricts the access of new stormwater from entering into the CBFI and causing the non-first flush water to be diverted around the CBFI. Alternatively, the first flush water can be measured by an electronic device. When the determined amount of first flush water is achieved, then a mechanical device closes the access of stormwater to the CBFI. There are many ways to cause levers to be moved through the weight of water and it would not be difficult for one skilled in the art of hydraulics to design and build a device as described above.

In a further exemplary embodiment, a CBFI can incorporate at least one flexible element to retain pollutants within the filter system. For example, multiple flexible fingers or bristles can wholly or partially encompass the flow of water exiting the CBFI by way of the overflow. These flexible fingers or bristles can allow water to flow through but restrict the passage of certain sized pollutants (e.g., cigarette butts). The fingers can disengage or open when the CB filter is tipped thereby allowing the pollutants to be evacuated.

An exemplary CBFI can filter material from gas, liquid or solids. There can be cases where the innovation is used to filter pollutants or material from a medium other than water. In these cases, the CBFI with accompanying embodiments can be applied to other media.

An exemplary CBFI includes at least one buoyancy device. The buoyancy device can float inside or on the CBFI. The buoyancy device can float inside the CBFI for a plurality of reasons including to modify the pollution capture potential of the device, cause a part of the CBFI to move with water flow, and the like. Furthermore, in an additional exemplary embodiment, the CBFI can be buoyant in order to perform filtration in an open body of water. For example, the CBFI can be pulled along the surface of a polluted water to filter pollutants from water. The CBFI can then be removed from the water and dumped of its pollutant load.

Power, Communication, and Metering System

An exemplary CBFI includes at least one power source. The power source can include a solar panel, solar cell, fuel cell, battery, water wheel, and permanent power. FIGS. 2, 3, and 6 show examples of the at least one power source in accordance with one or more aspects of the disclosure.

An exemplary CBFI includes at least one sensor. For example, FIG. 2 shows sensor 210 and FIG. 3 shows sensor/metering system 304. The sensor can sense a plurality of things including, but not limited to, pollutant levels, water levels, environmental conditions, toxins, pollutants, relation to the earth, and status of the components of the CBFI. A communication device can relay the information from a sensor via wireless or wired transmission to form a network. For example, the sensor can be the sonic type or infrared type which is used to measure snow pack levels, but in this case the sensor will measure the depth of pollutants in the CBFI. This data can be transmitted to another location with the use of the communication device. Moreover, a CBFI may include a global positioning system (GPS).

An exemplary CBFI includes a device to transmit information wirelessly. For example, FIG. 2 shows a communication system 212 arranged on a side of the CBFI 201. A wireless (e.g., Wi-Fi, radio, digital, cellular, etc.) connection or wired connection can be made between the CBFI and another communication device. Some governmental entities currently use Wi-Fi connections on power poles to transmit information to emergency personnel. The CBFI can perform the similar task of transmitting information and connecting to the internet or cloud. An exemplary CBFI may serve as a wireless hotspot for the public.

An exemplary CBFI includes at least one radio frequency identification device (RFID) or electronic tag. The RFID stores and transmits information about the CBFI. The communication system 212 of FIG. 2 may include the RFID. In an example the RFID is a passive RFID but it can also be an active RFID. The RFID incorporated to the CBFI can be used in conjunction with an RFID reader and transmitter. The RFID reader can be mounted on a vehicle used to service or maintain the CBFI. The RFID, or other electronic tag device, can be used in conjunction with other resources (e.g., software, people, equipment) to perform a plurality of functions, such as asset tracking, productivity tracking, fleet tracking, route optimization, equipment management, maintenance tracking, data collection, etc. An exemplary CBFI includes at least one RFID that can be used in conjunction with a weight scale and RFID reader on a maintenance truck so the weight of the CBFI can be weighed and recorded for a specific CBFI for reporting purposes. The reading of the RFID data can be manual or automatic.

An exemplary CBFI communicates information with a maintenance vehicle, such as a vacuum truck. For example, a CBFI may have a passive RFID embodiment that communicates with a side-loading garbage truck or maintenance vehicle that includes a passive RFID reader. The vehicle identifies the specific CBFI when it comes close enough to passively read the RFID. The vehicle pulls the CBFI out of the catch basin with its lifting arms and dumps the contents into its hopper. The vehicle may record that it tipped, weighed, and maintained that particular unique CBFI. The information is recorded in the maintenance software system. Alternatively, the RFID can be read with a handheld RFID reader.

An exemplary CBFI includes at least one solar panel. For example, FIG. 6 shows solar panel 618 arranged in one of the hinged storm grate openings. The solar panel can be used to power devices within the CBFI. For example, the solar panel can power a modem, battery, Telnet system, active RFID, internet connection, communication device, lighting system and transmitter/receiver. The solar panel can also power a heating element to prevent freezing or it can power a filtration component of the CBFI. An exemplary CBFI includes a solar panel to power at least one light and audible device. This light can be used to light a sidewalk, light a path, light a road, indicate emergency situations, communicate information by light, relay data, play music, aesthetics, etc.

Furthermore, an exemplary CBFI includes a device, such as a rotating element, powered by flowing water. For example, the CBFI may include a water wheel-like device that can rotate and charge a battery when water is flowing. For example, FIG. 2 illustrates a rotating element 208 arranged on a side of the CBFI 201 that can rotate as water flows through the CBFI 201.

An exemplary CBFI includes a metering system (e.g., sensor/metering system 304 of FIG. 3) that can measure and/or calculate a plurality of data related to the CBFI and the environment therein, such as total flow of water, total weight of pollutants collected, volume, length, meteorological temperature, rainfall, sunlight, filter status, illegal discharge, capacity, pollutant levels in stormwater, etc. This information can be transmitted from the CBFI to another receiver. A further exemplary CBFI embodiment includes a device that may be adjusted based upon the information said metering system records or calculates. For example, if the capacity meter (e.g., fullness meter) of the CBFI indicates a near full status, then the meter will send this information to the maintenance shop and the meter or user can remotely actuate a mechanism in the CBFI.

An exemplary CBFI can detect when the unit has been maintained. For example, the CBFI can have a device that detects when it is tipped. This sensor would then relay this information to the data center to record the time and date of when the CBFI was maintained.

Signage, Indicators, Colors, and/or Branding

An exemplary CBFI can incorporate a plurality of colors, branding, information, and/or design. In an example the top of the CBFI is predominantly blue but it can be any one or combination of colors. The color blue represents clean water and the CBFI may come to be known as the Blue Basin. People can recognize the blue hinged storm grate and know that the stormwater is being filtered at that location.

An exemplary CBFI and its individual parts can incorporate a unique identifier. That way if the customer needs a replacement part, one can be remade and shipped to him. The identifier can include the dimension information and/or model number.

An exemplary CBFI can include a filtration system that resembles plants, animals, and fungus. For example, affixed to the top of the hinged storm grate can be a plurality of filtration components that resemble a garden with plants, animals and/or fungus. These filtration units can provide pre-filtration activities as well as provide public awareness of pollution activities. Moreover, an exemplary CBFI can include advertising media. For example, the name of the manufacturer or sponsor of the equipment can be displayed on the CBFI.

An exemplary CB filter incorporates the manufacturer's name, origin, patent information, environmental messaging, and other details at a location that is visible to the general public. For example, the name of the company and place of manufacture can be located on the top of the hinged storm grate or on the hood. Furthermore, an exemplary CBFI can incorporate other types of information, such as environmental messages (e.g., "Drains to Stream"), municipality (e.g., "City of Casper, Wyo., USA), advertising, etc. The information can be incorporated directly into the material that includes the CBFI or it can be attached like a small flag or external device. The CBFI can take many shapes and color. For example it can embody logos, shapes, flags, symbols, jurisdictional colors, etc.

Operation and Maintenance System

As described above, an exemplary CBFI would fit in a catch basin. Each catch basin may be measured to determine the best dimensions for the fabrication of the CBFI, such as depth, width, and height of the grate, opening, hood, catch basin dimensions, water inlets, water outlets, etc. The CBFI can be constructed so it does not damage, or be damaged by, the existing equipment within the catch basin. Alternatively, a catch basin may need to be altered to accept a CBFI. In a case such as this, a rock saw, concrete saw, metal saw, plasma cutter, water jet, or other cutting mechanism can be used to alter the catch basin.

An exemplary CBFI can be taken apart to transport as flat as possible. Furthermore, an exemplary catch basin is modular and scalable so one particular model of CBFI may be able to fit a variety of sizes of catch basins. The housing of an existing catch basin can be measured to determine its dimensions. For instance, rather than destroying the current catch basin to prepare for a new CBFI, the existing infrastructure may be measured and a purpose-built CBFI can be constructed to fit the existing infrastructure. In an example, the CBFI can fit into an existing catch basin with minimal retrofit or effort. A catch basin may be measured by a laser and/or a camera to determine the dimensions.

An exemplary CBFI can be maintained by existing municipal equipment. The existing equipment may require some retrofit or alterations to lift or maintain the CBFI. Furthermore, the municipality may use equipment like a garbage truck, knuckle boom, vacuum truck, backhoe, etc. to maintain the CBFI. An exemplary CBFI may include a ladder (e.g., rungs 1446 of FIG. 14C). For example, for large applications, the filter insert can have a ladder incorporated into the design and construction of the CBFI. The ladder can be located on the inside or outside wall of the CBFI.

An exemplary CBFI provides for measuring the contents of the filtration system. For example, the CBFI can have a tare weight so a user knows how much the CBFI weighs empty. The user may weigh the CBFI during the lifting process to determine how much pollution, sediment, trash, debris, etc. was captured by the CBFI during operation by subtracting the tare weight from the total weight. The user may also record such things as weight, distribution, volume, density, specific gravity, quantity, quality, and contents of the filter material. The user can use a weight scale attached to a vehicle or lifting mechanism. Alternatively, another method of weighing the contents of the CBFI is for the user to use a lever arm with a weight scale and lifting hooks. In this method, the lifting hooks would attach to the lifting points of the CBFI and the user would push or pull on a lever to cause the CBFI to be lifted out of the ground. The lifting hooks can engage a weight scale and indicates the weight of the CBFI. The tare weight can be subtracted from the total weight giving the user the weight of filtered material within the CBFI.

By allowing sediment and trash to accumulate within the CBFI, the captured pollutants can advantageously act as a filtering media. Captured pollutants can be removed several times throughout the useful life of the CBFI.

Lifting Apparatus for CBFI

A CBFI will require the use of a lifting apparatus to remove it from a catch basin for maintenance. Currently many garbage trucks used in the United States include the use of side-loader arms (e.g., automated loader) and grabbers to pick up trash cans and dump them in a hopper that usually is near the top of the garbage truck and behind the cab of the truck. The arm and grabbers used to grasp the trash cans are special purpose. The arm attaches to the garbage truck and moves about through one or more axis to align the grabbers with a trash can and lift it. The grabbers wrap around the trash can and hold the trash can while the arm moves to dump it.

This present disclosure relates to novel designs and methods for lifting arms to be built and retrofitted to existing side-loader armature garbage truck technology so a CBFI may be removed from a catch basin and dumped into a garbage truck, vehicle, trailer, or like device. These novel lifting arms can be designed to fit with side-loader arms and grabbers currently manufactured by companies such as Peterson Industries, Labrie Enviroquip Group, Haul-All, New Way, Scranton Manufacturing, Bridgeport, Wayne Engineering, etc. The CBFI lifting arms can attach to the some existing side loader armature and grabber technology or be purpose built for operations with a CBFI. The garbage truck would align with a CBFI that is situated in a catch basin. The operator of the garbage truck (or like devices) would maneuver the lifting arms to align with the lifting points of the CBFI. The lifting arms would grab or attach to the CBFI lifting points and lift the CBFI out of the catch basin. The lifting arms and side-loader armature would then lift the CBFI up to the height of the hopper, rotate the lifting arms and CBFI to allow the hinged storm grate to open, the contents of the CBFI would fall out and into the hopper, the operator may shake the CB filter with the side-loader armature controls, and then reverse the lifting process to place the CBFI back into the catch basin for future pollution capture. A garbage truck may not be the only equipment that is used to perform the task of cleaning a CBFI. It is conceivable that other equipment with similar functions could perform this work including but not limited to a crane, forklift backhoe, skid steer and lever mechanism.

The CBFI can also be evacuated of its contents in the upright position without being inverted. Instead of the CBFI being inverted, the CBFI can release its contents out the bottom much like a hopper mechanism works. The CBFI can be lifted out of the catch basin by at least on lifting point and lifting mechanism so the at least one surface (e.g., wall or bottom sediment trap door) can be opened to allow the contents to be dumped out. This method would allow a user that does not have access to a side-loader garbage truck to use other common equipment such as a crane, backhoe, skid steer, knuckle boom, or manual lever mechanism to maintain the CBFI. The user can attach to the at least one lifting point of the CBFI with at least one chain, hook, magnetic element, armature, rope, or strap and pull it out of the catch basin and then lift the CBFI above a dumping point. The user can then disengage a mechanism to allow at least one wall or bottom of the CBFI to open which would cause the contents to evacuate.

Adjustable Lifting Arm for CBFI

An exemplary lifting arm (also may be known as a lifting mechanism) for a CBFI can attach to and lift and move the CBFI. One or more lifting arms can be used to attach to one or more lifting points on a CBFI.

An exemplary adjustable lifting arm for CBFI can attach to a CBFI lifting point in plurality of ways including mechanical, friction, pneumatic, hydraulic, electrical and magnetic means. For example, a pair of opposable hooks powered by hydraulics can close around a lifting point on the CBFI for lifting. The lifting arm may lock to the lifting point.

Another exemplary lifting arm can include at least one hook to attach to the lifting point of a CBFI. The hook can include a closing mechanism to ensure the CBFI does not become disengaged from the lifting arm. For example, the hook can have a device that closes the gap of the hook such as a spring arm, flap, or an opposable device that mechanically closes.

An exemplary lifting arm can be attached to a knuckle boom. Knuckle booms are made in a variety of configurations to move material, lift men, and control tools attached to knuckle booms. A knuckle boom can be configured to have a mechanism attached to the end of the boom that engages a CBFI so it can be lifted out of a catch basin and moved to a location for dumping. In an example the knuckle boom would have the lifting capability to lift the weight of a CBFI plus the contents it has filtered from a fluid. The CBFI may become adhered in place after a particular duration of time so the knuckle boom would need the lifting capability to break this adhesive seal that can be formed between the catch basin or the flange and the CBFI. Furthermore, the knuckle boom would need the reach capability to maneuver between parked cars and engage a CBFI near a gutter or by a roadway. To counteract the possibility of the maintenance vehicle with knuckle boom from tipping, it may be necessary that the maintenance vehicle to have one or more outriggers to prevent tipping. The knuckle boom and outriggers can be controlled from within the cab of the maintenance vehicle or from the outside of the maintenance vehicle. In an example the knuckle boom with lifting arm would include at least one camera so the operator can control the arm from within the cab and not be exposed to traffic. In addition, the maintenance vehicle can include a wash station and vacuum mechanism. The manual or automatic wash station can wash the CBFI, the catch basin, and the street. The vacuum mechanism can clean the CBFI and catch basin.

An exemplary adjustable lifting arm for CBFI can move or rotate along any axis (x, y, z) to engage with the lifting point of a CBFI. A highly maneuverable lifting arm is desirable to allow the operator to more easily engage and pickup a CBFI. Alternatively, a lifting arm with limited maneuverability, yet still able to engage a CBFI, may be advantageous to the user because it has less moving parts than a highly maneuverable lifting arm.

An adjustable exemplary lifting arm for CBFI can lower to ground level, or below ground level, to attach to the lifting points of a CBFI. The current side-loading technology usually allows for the lifting arms to not reach all of the way to ground level. Lifting arms fitted to the side-loading grabbers can allow for the lifting hooks to engage with the CBFI at ground level. Ground level motion may be necessary to engage a CBFI.

An exemplary adjustable lifting arm can incorporate an electromagnet for means of moving a CBFI with magnetic element embodiment. The lifting arm can include a magnetic element to engage with a magnetic element on the CBFI. For example, the lifting arm can have at least one electromagnet. When the electromagnet is turned on and placed against the at least one magnetic element in the catch basin such as a CBFI, the lifting arm can pull the CBFI out of the catch basin. The magnet can engage at a location so certain functions are still possible such as moving the hinged storm grate or trap door, etc. When the lifting arm places the CBFI back into the catch basin, the electromagnet can be turned off and releases the CBFI.

An exemplary adjustable lifting arm for a CBFI can engage the lifting points of a CBFI from the top, side, front, back, or bottom orientation. Moreover, an exemplary adjustable lifting arm for CBFI can be incorporated to existing or proposed side-loader arm grabbers or other lifting technology. In an example, a CBFI lifting arm that is retrofitted or newly built with lifting arms for CBFI maintenance may still lift, rotate, and maintain a trash can.

An exemplary adjustable lifting arm for CBFI can align with the lifting points of a CBFI. The lifting arms can use a plurality of methods to align with the lifting points of the CBFI including of mechanical, visual, audible, and magnetic means. For example, the maintenance vehicle can have a point on the truck that indicates when it is aligned with the lifting points of the CBFI. The equipment within the truck may indicate to the driver when alignment has, or has not, been achieved.

An adjustable exemplary lifting arm for CBFI has means for controlling the width of the arms as they open or close. For example, the distance between two lifting points on a CBFI may be 32 inches. The lift arm(s) can have a solid spacer arm to control the width the lifting arms close to. Alternatively, the control mechanism of the lifting arm and side-load armature can be controlled manually or through computer programming, software, hardware, proximity sensors and other electronic or magnetic means. Various CBFIs may have a plurality of lifting point spacing dimensions. Therefore, an adjustable lifting arm able to account for these various spacings would be advantageous to the user. For example, one CBFI on a maintenance route may have lifting points spaced 32 inches apart. Another CBFI on the same service route may have lifting points spaced at 30 inches apart. A lifting mechanism must account for these different dimensions through the use of mechanical, manual, or electronic means.

An exemplary CBFI adjustable lifting arm or hook can be retrofitted and attached to existing equipment. For example, a common automated side-loading garbage truck includes two grabbers and sometimes a plunger to hold a trash can. The grabbers of a garbage truck lifting arm can be permanently or temporarily affixed to the garbage truck lifting arm. For example, the grabbers of some Wayne Engineering devices attach to the arm with the use of a receiver and pin configuration where the grabbers can be removed from the garbage truck lifting arm. These grabbers could be removed and replaced with CBFI lifting arms. In instances, where the grabbers are not removable from an existing garbage truck arm, the CBFI lifting arms can be attached to the existing grabbers through means including of welding, bolting, fastening, and affixing the retrofitted CBFI lifting arms to the existing garbage truck grabbers. An exemplary retrofit of a garbage truck arm with a CBFI lifting arm can include the attachment of levers, hooks, extenders, devices, actuators, spacers, hydraulic pistons, proximity switches, and other mechanical or electrical equipment. Furthermore, the software that controls the garbage truck arm, grabbers and mechanical movement of the device can be reconfigured to work with a CBFI lifting arm. The act of retrofitting an existing garbage truck side-loader arms with a CBFI lifting arm would be advantageous to the user for means of saving time and costs.

Current garbage truck side-loader arms and grabbers are not designed to lift an object where the top of the object is nearly flush with ground level. Trash cans typically rest on level ground and the arm and grabbers of a garbage truck typically grab a 90-gallon trash can about 18-30 inches above ground level. An exemplary retrofitted garbage truck side-loader arm and grabber can extend at least one lifting hook to the ground so the lifting hook can engage at least one lifting point of a CBFI so the CBFI may be lifted from a catch basin. Furthermore, the side-loader arm can be retrofitted with mechanical equipment that allows the CBFI to be lifted far enough out of a catch basin so the bottom clears the lip of the catch basin. It may be necessary for an outrigger on the truck to ensure stabilization and minimize torque to the equipment chassis.

Additional retrofits to a garbage truck may be necessary in order to be used in conjunction with, and maintain a CBFI. For example, the hopper of the garbage truck may need to be lined with a material (e.g., plastic) to prevent the abrasive contents from a CBFI from unduly harming the hopper of the garbage truck through an abrasive action. Additionally, the hopper tailgate or access openings may require a water-proof seal to hold the wet evacuated contents (e.g., water, sand, debris) of a CBFI within the hopper of the garbage truck. Furthermore, the bed of the receiving vehicle can be sloped to cause the contents of the CBFI to be redistributed after dumping.

Alternatively, an exemplary CBFI can be moved by a common garbage truck cart tipper. A cart tipper lifting mechanism attached to a movable arm attached to a garbage truck. A cart tipper does not typically have grabber arms since one or more hooks grab on to a bar on a trash cart. The cart tipper grabs the trash cart, lifts it, and inverts the cart into the hopper of a garbage truck. A cart tipper can be retrofitted with lifting arms to grab, lift and invert a CBFI.

Another exemplary method to move a CBFI is by attaching the at least one lifting arm to a knuckle boom. Knuckle booms are highly maneuverable and are quite capable of lifting and maintaining a CBFI. It may be required to add one or more moving parts to a knuckle boom but it would not be difficult for one skilled in the art of manufacturing to produce a knuckle boom attachment that can lift a CBFI. The knuckle boom can empty the contents of the CBFI by tipping it or allowing the contents to be evacuated from the bottom.

Equipment and Method of Cleaning

An exemplary catch basin filter insert with at least one lifting point can be moved by a plurality of mechanisms or machines. FIGS. 17, 18, 19, and FIGS. 20A to 20D show exemplary methods of lifting a CBFI out of a catch basin and cleaning it in accordance with one or more aspects of the disclosure. The mechanisms or machines include, but are not limited to a vehicle (e.g., garbage truck, side-loader, rear-loader, or front-loader), backhoe, crane, skid steer, fork lift, track hoe, winch, articulated mechanical arm, hydraulic mechanism, pneumatic mechanism, electric mechanism, knuckle boom, or a manual lever and fulcrum. For example, the CBFI may be situated in a catch basin located at or near a construction site. For the construction workers to lift and maintain the CBFI, they may attach chains to the lifting point(s) of a CBFI and use the bucket or hoe of a backhoe to lift the CBFI from the catch basin. Other common manual or mechanical construction equipment may be used to move and maintain the CBFI. An exemplary CBFI may dump its contents from the bottom without being inverted if being lifted by a backhoe, crate, forklift, etc.

Figure 17:
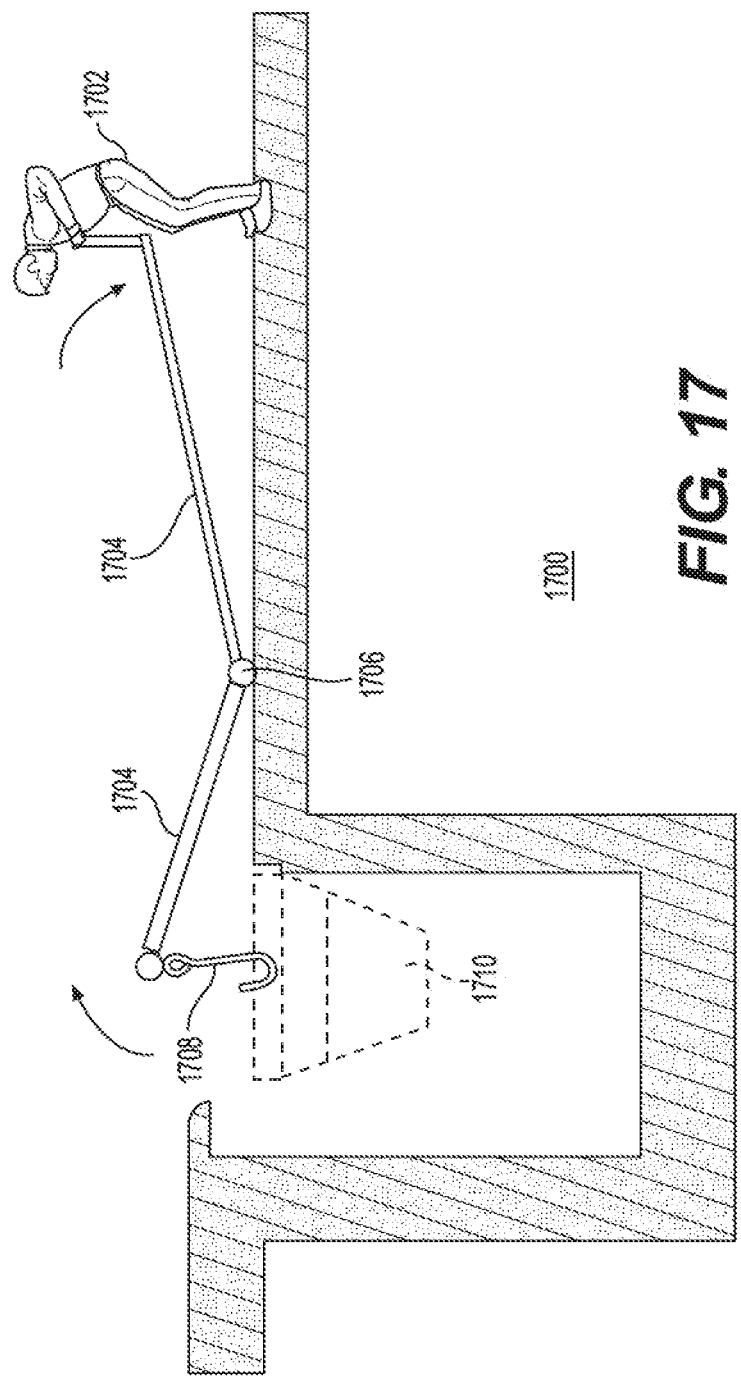
FIG. 17 illustrates an operator lifting a removable catch basin filter insert with a lever in accordance with one or more aspects of the disclosure.
Figure 19:
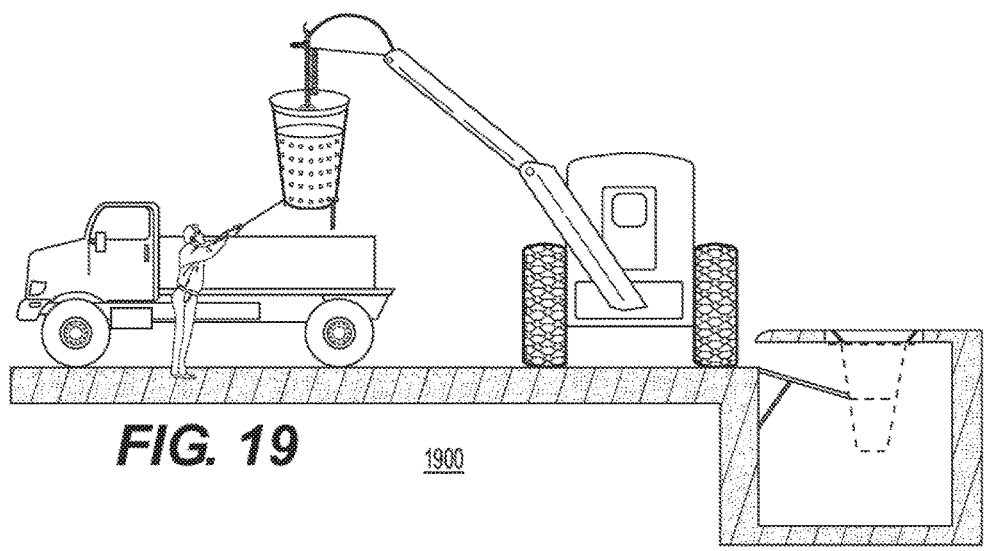
Figure 20A:
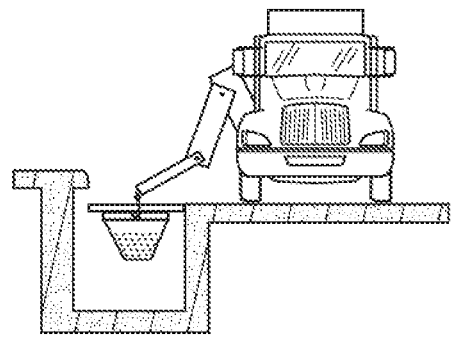
FIGS. 20A to 20D illustrate start, emptying, and end positions of a removable catch basin filter insert for emptying in accordance with one or more aspects of the disclosure.
Figure 20B:
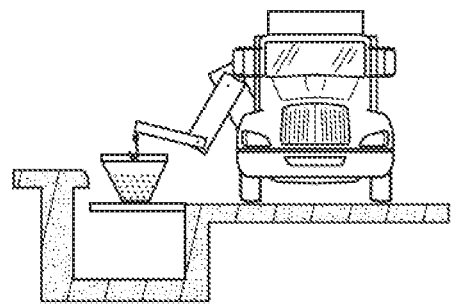
Figure 20C:
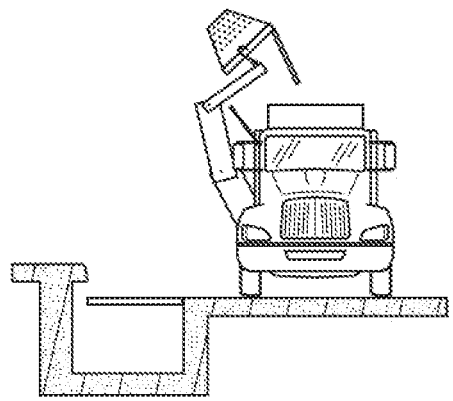
Figure 20D:
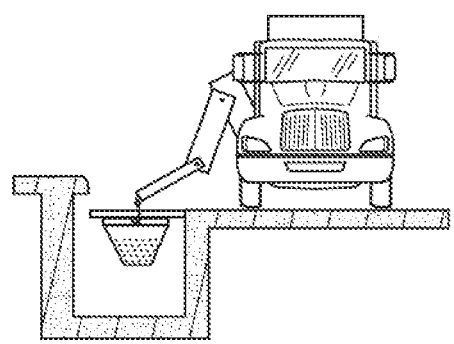

As shown in FIG. 17, an operator 1702 can push down on a lever 1704 on a fulcrum 1706 to lift a CBFI 1710 out of a catch basin via a hook 1708. In FIG. 18, a vehicle may use a lifting system (e.g., knuckle boom, hydraulic arms, etc.) to pick up the CBFI out of a catch basin. Similarly, FIG. 19 shows an operator using a rod to open the sediment trap door of a CBFI that has been removed from a catch basin by a machine. FIGS. 20A to 20D show four separate steps 2000, 2010, 2020, and 2030, respectively, lifting a CBFI and emptying it from a start position to a finish position.

An exemplary CBFI can be cleaned with a vacuum (e.g., Vactor) truck. Not all users of the CBFI may have access to a garbage truck or lifting mechanism to service the CBFI. One may evacuate the contents of a CBFI with the use of a vacuum (e.g., Vactor) truck. Attachments to the CBFI would be affixed well enough not to become dislodged during the vacuuming process. Alternatively, components can be designed to be dislodge during service such as filtration media or magnetic material.

Machines can incorporate software that marks the location where the CBFI was first lifted out of the hole and can put back where it began. Software can be programed to remove, lift, dump, and replace the CBFI.

An exemplary lifting apparatus for a CBFI includes a radio frequency identification device (RFID) reader or similar data gathering mechanism. Additionally, an exemplary lifting apparatus for a CBFI includes a weight scale to measure the weight of the CBFI and its contents. For example, the CBFI can have a tare weight and identifier that is recorded in the RFID or other data collection device. When the lifting apparatus lifts the CBFI from the catch basin, the weight scale records the weight and identity of the whole unit. Software can determine the amount of contents removed from the CBFI by comparing the tare weight of the CBFI to the total weight during maintenance. In this way, the user can record the total weight of filtered material removed from a fluid and report it to customers or to a regulatory agency. This would be especially advantageous for municipalities that must report total pollutants removed from stormwater when complying with National Pollutant Discharge Elimination System (NPDES) permits.

The lifting apparatus can also be attached to a small vehicle for a one-person operation. Much like the small vehicles used to gather shopping carts at a Walmart, this small vehicle can be retrofitted with a lifting mechanism to remove a CBFI from a catch basin.

Other Applications of the Invention

The present disclosure of a water filtration device that is easily removed and maintained as described in the above paragraphs may be used in a plurality of other applications. Other applications of a CBFI in accordance with one or more aspects of the disclosure may include, but are not limited to the following: irrigation channels, streams and rivers, roadway drainages, water drains, culvert inlets and outlets, floor and parking lot drains, dredging operations, gross pollutant traps, dry wells, sewage systems, water discharge points, ponds, infiltration reservoir inlets/outlets, and other places where fluid may flow, etc.

Advantages

Novel pollution capture devices, such as the CBFI described herein, has several advantages unavailable with current pollution capture devises. They are efficient in design, cost effective, and provide creative ways for reclaiming sediment and other pollution from the environment. The primary focus and advantage is innovative devices placed in ordinary stormwater catch basins targeting the removal of commonly littered items such as cigarette butts, plastic bottle lids, candy wrappers, water bottles, straws, plastic sacks, etc. These pollution capture devices can also be designed to filter and capture nicotine, BTEX (benzene, toluene, ethylene, xylene), hydrocarbons, sediment, nutrients, heavy metals, pesticides, magnetic material, and fertilizers from the water, thereby making them an economical mini-reclamation system. They can be easily cleaned, maintained, modular, scalable, robust in design, and have replaceable and/or rechargeable filtration units. The pollution capture devices may even be accompanied by a maintenance pod in order to service the device. By removing the litter from the environment near its source, it is less likely to release toxic leachates to the environment and clog storm sewer lines.

Another advantage of these devices is that they are purposely visible units placed in a catch basin near known littering and polluting sources such as industrial sites, construction sites, pedestrian malls, retail areas, nightclubs, bus stops, and high impact residential and commercial areas. The visible nature of the devices serves to bring awareness to the public of the pollution created by the community. Because the devices are street-side, and not hidden away within the storm drain system, they are easily recognized, cleaned, and serviced. The device's affordability allows them either to augment a larger pollution capture system or to serve municipal locations that only require a small pollutant capture device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

What is claimed is:

1. A system for filtering pollutants, the system comprising:
   an adapter conforming to and capable of being fixed in an opening leading to a cavity in a catch basin for receiving stormwater; and
   a removable catch basin filter insert capable of being suspended by the adapter and inserted into the catch basin, wherein the removable catch basin filter insert includes:
      a frame body having one or more frame elements, interconnected to provide mutual mechanical support and provide a space sized to receive the stormwater containing pollutants;
      a lifting frame secured to and above the frame body and provided with one or more lifting points sized and positioned to be capable of removing the frame body from the catch basin;
      a cover attached to the frame body by a first hinge, wherein the first hinge is configured to pivot the cover to be in an open position or a closed position; and
      a trap door attached to a bottom end of the frame body by a second hinge capable of pivoting the trap door to be in an open position or a closed position, and
      wherein the frame body forms a filter basket sufficiently porous to be capable of draining out the stormwater while capturing therein certain ones of the pollutants from the stormwater.

2. The system of claim 1, wherein the adapter is configured to receive and hold the removable catch basin filter insert rigidly within the catch basin.

3. The system of claim 1, further comprising at least one deflector for deflecting the stormwater and the pollutants into the filter basket.

4. The system of claim 3, wherein the at least one deflector is supported by a means selected from securement to a wall of the catch basin, integral formation with the removable catch basin filter insert, and removable attachment to the removable catch basin filter insert.

5. The system of claim 1, wherein the filter basket is porous due to penetration thereof by a plurality of holes.

6. The system of claim 1, wherein the frame body has a predefined shape, the predefined shape being selected from circular, conical, rectangular, square, elliptical, diamond, trapezoidal, and triangular.

7. The system of claim 1, wherein the removable catch basin filter insert is made from one or more of: (i) steel, (ii) metal, (iii) plastic, (iv) high-density polyethylene (HDPE), (v) recycled material, (vi) stainless steel, (vii) concrete, (viii) fiberglass, (ix) ferric material, (x) synthetic material, and (xi) natural material.

8. The system of claim 1, wherein the one or more lifting points includes one or more of: (i) a hook, (ii) a pin, (iii) a slot, and (iv) a magnetic element, the one or more lifting points configured to accommodate a lifting device.

9. The system of claim 1, wherein the removable catch basin filter insert further includes at least one latch capable of maintaining the trap door in a closed position.

10. The system of claim 9, wherein the at least one latch is arranged on the frame body, the at least one latch point is arranged on the trap door, and an engagement of the at least one latch and the at least one latch point selectively retains the trap door in the closed position.

11. The system of claim 1, wherein the removable catch basin filter insert further includes a locking mechanism configured to lock the cover in the closed position.

12. The system of claim 1, wherein the removable catch basin filter insert further includes at least one suspender spacing apart the lifting frame or cover and the filter basket to form space for overflow.

13. The system of claim 1, wherein the cover has a plurality of holes to allow the stormwater to flow into the removable catch basin filter insert when the cover is in the closed position.

14. The system of claim 1, wherein relative vertical positions of the removable catch basin filter insert and the adapter are adjustable.

15. The system of claim 1, wherein the system includes at least one sensor positioned to sense a condition existing in an environment of the removable catch basin filter insert.

16. The system of claim 15, comprising at least one communication system operably connected to communicate to a remote location information from the at least one sensor.

17. The system of claim 16, wherein the system comprises at least one rotating element, operably connected to at least one of the sensor and communication system and selected from (i) a power system, (ii) a pollutant capture device, and (iii) a flow meter.

18. The system of claim 16, wherein the system includes one or more solar panels operably connected to at least one of the sensor and the communication system and capable of generating power for one or more components requiring power in support of operation of the removable catch basin filter insert.

19. The system of claim 1, wherein the system includes one or more power generating and power storage devices for delivering power to one or more components of the system requiring power in support of operation of the removable catch basin filter insert.

20. The system of claim 1, wherein the removable catch basin filter insert further includes at least one pollutant capture medium.

21. The system of claim 1, wherein the system includes a buoyancy device connected to a component of the system proximate an upper end of the frame body and capable of floating in the stormwater to maintain the component thereabove.

22. The system of claim 1, wherein the removable catch basin filter insert further includes one or more magnetic elements operably connected to do at least one of lifting a portion of the system and capturing a pollutant susceptible to magnetic attraction.

23. The system of claim 1, further comprising a pollution filtration system lining the frame body and treated to be capable of removing toxins from the stormwater.

24. The system of claim 1, further comprising a net or liner system that is made from one or more of: (i) carbon, (ii) metal, (iii) plastic, (iv) fabric, (v) recycled material, (vi) mesh, (vii) poly blend, (viii) natural material, and (ix) synthetic material.

25. The system of claim 1, further comprising an energy dissipater positioned in an opening proximate an upper end of the frame body to dissipate energy corresponding to the mass and velocity of the stormwater striking the dissipater.

26. The system of claim 1, further comprising a sucrose derived filtration medium selected to be hydrophobic and oleophilic.

27. The system of claim 1, wherein the removable catch basin filter insert further includes a means of identifying the tare weight of the removable catch basin filter insert thereby allowing an operator to calculate a total weight of captured pollutants.

28. A removable catch basin filter insert insertable into a catch basin, the removable catch basin filter insert comprising:
- a frame body having one or more frame elements, structurally interconnected to be mutually reinforcing and supporting;
- a lifting frame mechanically connected to and above the frame body, and providing one or more lifting points capable of lifting the catch basin filter from the catch basin;
- a cover attached to one of the lifting frame and the frame body by a first hinge to pivot the cover to be in an open position or a closed position;
- a trap door attached to a bottom end of the frame body by a second hinge capable of pivoting the trap door to be in an open position or a closed position; and
- the frame body forming a filter basket, porous to be capable of draining the stormwater therethrough while capturing pollutants from the stormwater.

* * * * *